United States Patent
Kamakari et al.

(10) Patent No.: US 9,660,991 B2
(45) Date of Patent: *May 23, 2017

(54) RELATIONAL ENCRYPTION

(71) Applicant: FUJITSU LIMITED, Kawasaki-shi, Kanagawa (JP)

(72) Inventors: Ryota Kamakari, Toshima (JP); Takeshi Shimoyama, Shinagawa (JP); Hiroshi Tsuda, Fujisawa (JP); Yoshinori Yaginuma, Kokubunji (JP); Avradip Mandal, San Jose, CA (US); Arnab Roy, Santa Clara, CA (US); Hart Montgomery, Redwood City, CA (US); Toshiyuki Ishiguro, Ota (JP); Kouhei Shigeta, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/040,950

(22) Filed: Feb. 10, 2016

(65) Prior Publication Data

US 2017/0085382 A1    Mar. 23, 2017

Related U.S. Application Data

(63) Continuation-in-part of application No. 14/797,025, filed on Jul. 10, 2015, which is a continuation-in-part (Continued)

(51) Int. Cl.
*H04L 29/06* (2006.01)
(52) U.S. Cl.
CPC .......... *H04L 63/0884* (2013.01); *H04L 63/06* (2013.01)
(58) Field of Classification Search
CPC .. H04L 63/0861; H04L 63/0884; G06F 21/32
See application file for complete search history.

(56) References Cited

U.S. PATENT DOCUMENTS

| 2011/0113241 A1* | 5/2011 | Umezawa | G06F 21/606 713/156 |
| 2011/0179289 A1* | 7/2011 | Guenther | G06F 21/32 713/189 |

(Continued)

OTHER PUBLICATIONS

N. K. Ratha, J. H. Connell, and R. M. Bolle, "Enhancing security and privacy in biometrics-based authentication systems," IBM systems Journal, vol. 40, pp. 614-634, 2001.

(Continued)

*Primary Examiner* — Mohammed Waliullah
(74) *Attorney, Agent, or Firm* — Maschoff Brennan

(57) ABSTRACT

A method includes receiving biometric data, the biometric data non-uniformly distributed and processing the biometric data to a level of randomness as a plaintext vector, the level of randomness associated with a security level. The method also includes encrypting the plaintext vector using a relational linearity encryption scheme to generate a linearity ciphertext representative of the plaintext vector, encrypting the plaintext vector using a relational proximity encryption scheme to generate a proximity ciphertext representative of the plaintext vector, and communicating the linearity ciphertext and the proximity ciphertext to an authentication server. The method further includes receiving from the authentication server an authentication signal for the security level indicative of a linearity relationship between the linearity ciphertext and a registration linearity ciphertext discovered using a relational linearity key and of a proximity relationship between the proximity ciphertext and a registration proximity ciphertext detected using a relational proximity key.

18 Claims, 23 Drawing Sheets

Related U.S. Application Data of application No. 14/287,051, filed on May 25, 2014, now Pat. No. 9,503,266.

(56) References Cited

U.S. PATENT DOCUMENTS

| | | | | |
|---|---|---|---|---|
| 2013/0174243 | A1* | 7/2013 | Inatomi | H04L 9/3231 726/7 |
| 2013/0212645 | A1* | 8/2013 | Takahashi | H04L 9/3231 726/3 |

OTHER PUBLICATIONS

R. Belguechi, E. Cherrier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security , vol. 39, Sec, 3.3.

A. Juels and M. Sudan, "A fuzzy vault scheme," IEEE International Symposium on Information Theory, pp. 408, 2002.

Ari Juels and Martin Wallenberg. A fuzzy commitment scheme. In ACM CCS 99, pp. 28-36. ACM Press, Nov. 1999.

Ari Juels and Madhu Sudan. A fuzzy vault scheme. Cryptology ePrint Archive, Report 2002/093, 2002. http://eprint.acr.org/2002/093.

R. Belguechi, C. Rosenberger, and S. Aoudia, "Biohashing for securing minutiae template," in Proceedings of the 20th International Conference on Pattern Recognition, Washington, DC, USA, 2010, pp. 1168-1171.

Yevgeniy Dodis, Leonid Reyzin, and Adam Smith. Fuzzy extractors: How to generate strong keys from biometrics and other noisy data. in Christian Chachin and Jan Camenisch, editors, EUROCRYPT 2004, vol. 3027 of LNCS, pp. 523-540. Springer, May 2004.

Yevgeniy Dodis and Adam Smith. Correcting errors without leaking partial information. In Harold N. Gabow and Ronald Fagin, editors, 37th ACM STOC, pp. 654{663. ACM Press, May 2005.

P. Paillier, "Public-Key Cryptosystems Based on Composite Degree Residuosity Classes," Advances in Cryptology—EUROCRYPT '99 Lecture Notes in Computer Science vol. 1592, 1999, pp. 223-238. Apr. 15, 1999.

Yasuda, M., Shimoyama, T., Kogure, J., Yokoyama, K., Koshiba, T.: Practical packing method in somewhat homomorphic encryption. In: Data Privacy Management and Autonomous Spontaneous Security. Lecture Notes in Computer Science, pp. 34-50. Springer, Mar. 2014.

C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.

S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/2013/77.

Shafi Goldwasser, Vipul Goyal, Abhishek Jain, and Amit Sahai. Multi-input functional encryption. Cryptology ePrint Archive, Report 2013/727, 2013. http://eprint.iacr.org/2013/727.

Ran Canetti. Towards realizing random oracles: Hash functions that hide all partial information. In Burton S. Kaliski Jr., editor, CRYPTO'97, vol. 1294 of LNCS, pp. 455{469. Springer, Aug. 1997.

Boaz Barak, Yevgeniy Dodis, Hugo Krawczyk, Olivier Pereira, Krzysztof Pietrzak, François-Xavier Standaert, and Yu Yu. Leftover hash lemma, revisited. In Phillip Rogaway, editor, CRYPTO 2011, vol. 6841 of LNCS, pp. 1{20. Springer, Aug. 2011.

Russell Impagliazzo, Leonid A. Levin, and Michael Luby. Pseudorandom generation from one-way functions (extended abstracts). In 21st ACM STOC, pp. 12{24. ACM Press, May 1989.

Dabbah, M.A., Dlay, S. S., & Woo, W. L. (Apr. 2008). PCA Authentication of Facial Biometric in the Secure Randomized Mapping Domain. In Information and Communication Technologies: From Theory to Applications, 2008 ICTTA 2008. 3rd International Conference on (pp. 1-5). IEEE.

Office Action mailed on Jun. 3, 2016 issued with respect to the related U.S. Appl. No. 14/797,025.

* cited by examiner

*FIG.22*

|  |  |  | Verification Key | | |
|---|---|---|---|---|---|
|  |  |  | Ux | Uy | Uz |
|  |  |  | Kx | Ky | Kz |
| Verification Key | Ua | Ka | Ka-x | Ka-y | Ka-z |
|  | Ub | Kb | Kb-x | Kb-y | X |
|  | Uc | Kc | Kc-x | Kc-y | Kc-z |

Table labeled 1800.

RELATIONAL ENCRYPTION

CROSS-REFERENCE TO RELATED APPLICATIONS

This application is a Continuation-In-Part application of U.S. patent application Ser. No. 14/797,025 filed on Jul. 10, 2015, which is a Continuation-In-Part of U.S. patent application Ser. No. 14/287,051 filed on May 25, 2014. The entire contents of the foregoing applications are incorporated herein by reference.

FIELD

The embodiments discussed herein are related to relational encryption.

BACKGROUND

A form of user authentication may include biometric authentication. Biometric authentication generally includes measuring a biometric characteristic of a user that is unique to the user. The measured biometric characteristic, or a representation thereof, is then used as a basis of authenticating an identity of the user. Biometric characteristics may include a user's fingerprints, irises, veins, a section of deoxyribonucleic acid (DNA), and the like. Biometric authentication may have an advantage of allowing the user to be authenticated without having to remember a password. Because the biometric characteristic may be unchangeable, privacy is important in biometric authentication systems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one aspect of an embodiment, a method of proximity verification using relational encryption, includes receiving a linearity ciphertext that represents information processed to a level of randomness associated with a security parameter and encrypted using a relational linearity encryption scheme; determining a linearity relationship between the linearity ciphertext and a registration linearity ciphertext using a linearity relational secret key; receiving a proximity ciphertext that represents the information processed to the level of randomness and encrypted using a relational proximity encryption scheme; determining a proximity relationship between the proximity ciphertext and a registration proximity ciphertext using a proximity relational secret key; determining an approximate similarity between the proximity ciphertext and the registration proximity ciphertext based upon the security parameter, the linearity relationship, and the proximity relationship; and communicating to a user device from one of a plurality of authentication servers an authentication signal indicative of whether there is the approximate similarity between the proximity ciphertext and the registration proximity ciphertext in a case in which a combination of a first verification key assigned to the user device and a second verification key assigned to the one of the plurality of authentication servers permits access to a result of the determining the approximate similarity, and not communicating the authenticating signal to the user device in a case in which the combination of the first and second verification keys denies access to the result of the determining the approximate similarity, regardless of whether the authentication signal indicates that there is the approximate similarity between the proximity ciphertext and the registration proximity ciphertext.

According to another aspect of an embodiment, a method includes receiving medical and biological information, and processing the medical and biological information to a level of randomness as a plaintext vector, the level of randomness associated with a security level. The method also includes encrypting the plaintext vector using a relational linearity encryption scheme to generate a linearity ciphertext representative of the plaintext vector, encrypting the plaintext vector using a relational proximity encryption scheme to generate a proximity ciphertext representative of the plaintext vector, and communicating the linearity ciphertext and the proximity ciphertext to an authentication server. The method further includes receiving from the authentication server an authentication signal for the security level indicative of a linearity relationship between the linearity ciphertext and a registration linearity ciphertext discovered using a relational linearity key and of a proximity relationship between the proximity ciphertext and a registration proximity ciphertext that represents medical and biometrical information and is detected using a relational proximity key.

The object and advantages of the embodiments will be realized and achieved at least by the elements, features, and combinations particularly pointed out in the claims.

It is to be understood that both the foregoing general description and the following detailed description are exemplary and explanatory and are not restrictive of the claims.

BRIEF DESCRIPTION OF THE DRAWINGS

Example embodiments will be described and explained with additional specificity and detail through the use of the accompanying drawings in which:

FIG. 22 illustrates an example of an access restricting table;

DESCRIPTION OF EMBODIMENTS

Figure 1:
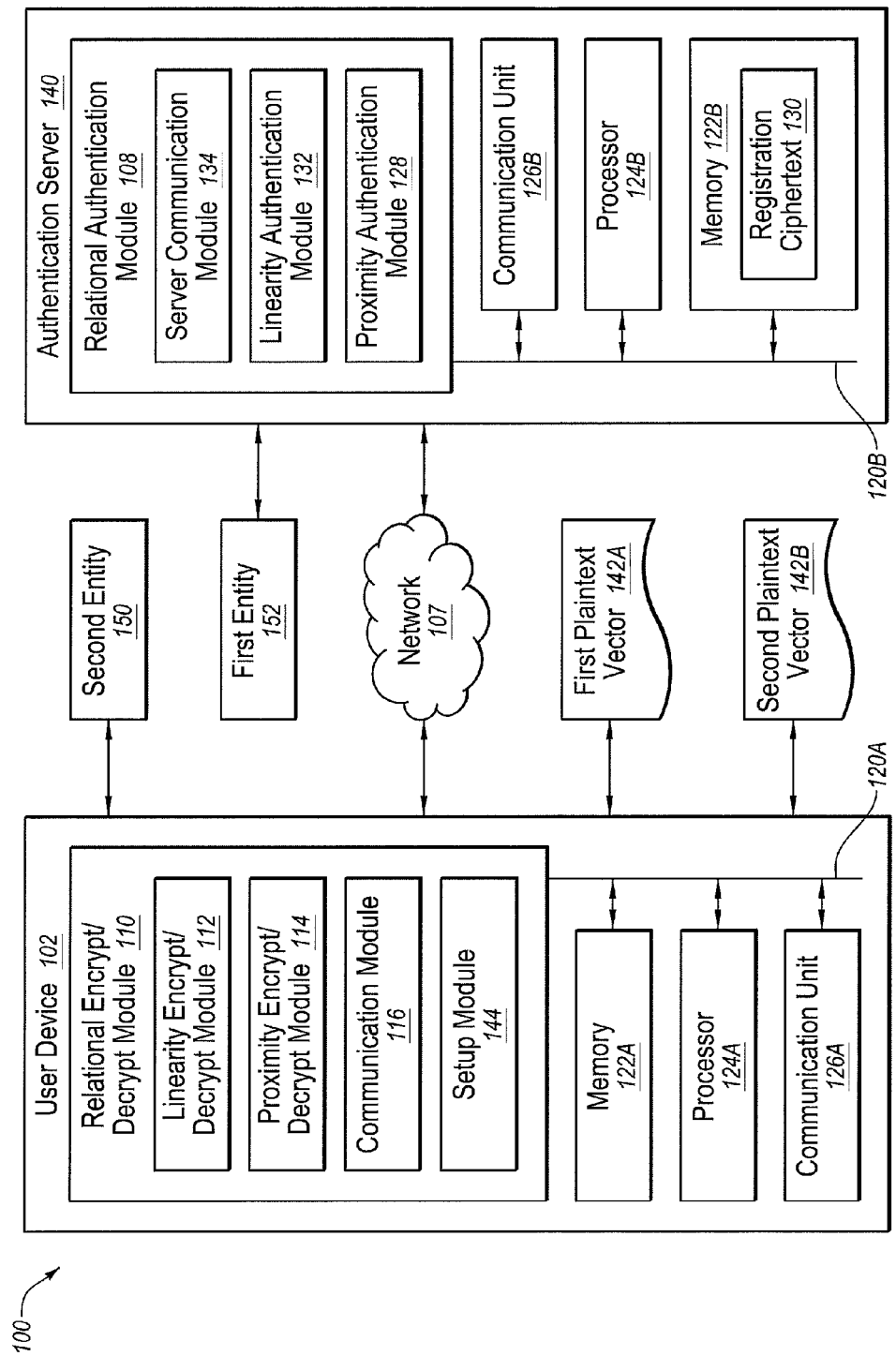
FIG. 1 is a block diagram of an example operating environment.

A challenge of biometric authentication may be that a user may not change a biometric characteristic used as a basis for authentication. For example, the user may register a biometric template including biometric data describing one or more unique characteristics of the user such as a fingerprint of the user or an iris pattern of the user. If the biometric template is compromised, then the user may not be able to change the unique characteristics described by the biometric template. Thus, once compromised, another biometric template may be registered or a biometric template of another biometric characteristic may be registered. For at least this reason, biometric authentication systems may benefit from a strong privacy guarantee. For real life biometric data, the biometric data may be highly non-uniform.

In some biometric authentication systems various approaches have been implemented to attempt to provide a secure biometric authentication system. For example, some biometric authentication systems implement a "feature transformation approach," a "biometric cryptosystem approach," and/or a "homomorphic encryption approach." However, each of these approaches provides limited privacy and security due at least partially to the communication of information such as biometric templates, the client-specific keys, public keys, and the like, each of which may be compromised.

Accordingly, some embodiments discussed herein relate to privacy-preserving biometric authentication. The privacy-preserving biometric authentication may be based upon relational encryption. The relational encryption may enable an authenticator to discover relationships between ciphertexts without enabling the authenticator to recover the plaintext or to generate a fraudulent ciphertext having particular relationships with a genuine ciphertext. For example, an example embodiment includes a method of biometric authentication. The method may include receiving a registration input. The registration input may include a first biometric template of a user. The first biometric template may be representative of unique features of a biometric characteristic of the user. The method may include generating a first linearity ciphertext and a first proximity ciphertext according to a relational encryption scheme. The method may include communicating the first linearity ciphertext and the first proximity ciphertext to an authentication server. The method may include receiving a challenge input. The challenge input may include a second biometric template. The second biometric template may be representative of the one or more unique features of the biometric characteristic of the user. The method may include generating a second linearity ciphertext and a second proximity ciphertext according to the relational encryption scheme. The method may include communicating the second linearity ciphertext and the second proximity ciphertext to the authentication server. The authentication server may discover a linearity relationship between the first and second linearity ciphertexts and detect a proximity between the first and second proximity ciphertexts. The method may include receiving a signal indicative of an authentication decision from the authentication server. The authentication decision may be based on the presence or absence of the linearity relationship and/or proximity.

In some embodiments, the underlying data may first be subjected to processing prior to generating the linearity or the proximity ciphertext. For example, the underlying data may be subject to a linear extractor which may provide a level of randomness in the underlying plaintext. Embodiments of the present disclosure will be explained with reference to the accompanying drawings.

FIG. 1 illustrates a block diagram of an example operating environment 100, arranged in accordance with at least one embodiment described herein. In the operating environment 100 relational encryption may be performed. Relational encryption may include a cryptographic primitive which enables a first entity 152 to determine one or more relationships among two or more ciphertexts provided by a second entity 150. In particular, the relational encryption enables the first entity 152 to discover a linearity relationship between two or more of the ciphertexts and to detect a proximity between two or more of the ciphertexts. Additionally, the relational encryption may not allow the first entity 152 to recover the plaintexts from the ciphertexts or to construct a fraudulent ciphertext having a particular relationship with a particular, genuine ciphertext.

The relational encryption may be implemented in various environments. For example, the relational encryption may be implemented in a social environment in which individuals wish to keep their locations private, but a semi-trusted service may enable detection of proximity between the locations. Additionally, the relational encryption may be implemented in an image comparison environment. The proximity may be detected between images from a database to determine similarity between the images. Privacy of the images may be maintained. Users may search the images using relational encryption without being exposed to the images on the database. Additionally still, the relational encryption may be implemented in a private data storage environment. A user may encrypt its data and communicate the encrypted data to a database. Analytics (e.g., storage, clustering, etc.) may be performed on the encrypted data without a risk of the encrypted data being decrypted.

For example, the second entity 150 may receive a first plaintext vector 142A and a second plaintext vector 142B (generally, plaintext vector 142 or plaintext vectors 142). The plaintext vectors 142 may include any set of data such as biometric templates, locational information, etc. The second entity 150 may communicate a first ciphertext, which includes an encrypted version of the first plaintext vector 142A, to the first entity 152. Later, the second entity 150 may communicate a second ciphertext, which includes an encrypted version of the second plaintext vector 142B, to the first entity 152. The first entity 152 may discover whether there is a linearity relationship between the first ciphertext and the second ciphertext and may detect a proximity between the first ciphertext and the second ciphertext. The proximity may be in terms of Hamming distance in some embodiments.

However, the relational encryption may not allow the first entity 152 to construct the plaintext vectors 142 from the first and second ciphertexts. Moreover, the relational encryption may not allow the first entity 152 to construct a third ciphertext that includes a particular linearity relationship and/or a particular proximity with the first ciphertext and/or the second ciphertext. FIG. 1 depicts embodiments including two plaintext vectors 142 and, accordingly, two ciphertexts. In some embodiments more than two plaintext vectors 142 and, accordingly, more than two ciphertexts may be included in the operating environment 100.

The relational encryption may include one or more relational keys. The relational keys may be similar to public and/or signature keys and may be provided to or generated by the first entity 152. The relational keys may enable determination of the relationships between the ciphertext, but may not allow decryption of the ciphertext or recovery of the plaintext vectors 142. Additionally, the relational keys may not allow construction of ciphertext having a particular relationship with a particular ciphertext.

In some embodiments, the relational encryption may be defined according to a relational encryption scheme for a relation that includes a tuple of algorithms. The algorithms may include a key generation algorithm, a first encryption algorithm, a first decryption algorithm, a second encryption algorithm, a second decryption algorithm, and a verification algorithm. The relation may be defined as a subset of three sets. Additionally, the relation and the algorithms may satisfy one or more correctness conditions. For example, the relation may satisfy example correctness conditions:

$R \subseteq X \times Y \times Z$
$(pkx, skx, pky, sky, skR) \leftarrow KeyGen\ (1^\lambda)$
$cx \leftarrow EncX(pkx, x)$
$cy \leftarrow EncY(pky, y)$
$b \leftarrow Verify(skR, cx, cy, z)$
$b \cong R(x, y, z)$ In the correctness conditions, R represents the relation. The operator $\subseteq$ represents a subset operator. The parameters X, Y, and Z represent sets. The parameter x represents the first plaintext vector 142A. The parameter y represents the second plaintext vector 142B. KeyGen represents a key generation algorithm. EncX represents a first encryption algorithm. EncY represents a second encryption algorithm. Verify represents a verification algorithm. The operator $\leftarrow$ represents an output operator. The parameter pkx represents a first public key. The parameter pky represents a second public key. The parameter skx represents a first secret key. The parameter sky represents a second secret key. The parameter skR represents a relational secret key. The parameter cx represents a first ciphertext. The parameter cy represents a second ciphertext. The parameter b represents an output by the verification algorithm. The parameter $\lambda$ represents a security parameter. The parameter z represents an particular value that may be chosen by a verifier entity. The operator $\cong$ represents a congruency operator. In the correctness conditions, the output from the verification algorithm is congruent with the relation with an overwhelming probability.

The relational encryption scheme may be secure in the sense that the relational keys may not allow construction of a ciphertext having a particular relationship with a particular ciphertext and may not allow recovery of the plaintext vectors 142 from the particular ciphertext. For example, the relational encryption scheme may be secure if the following expressions hold:

1. Let $Kx(1^\lambda)$ be an algorithm that runs KeyGen $(1^\lambda)$, then takes the output (pkx, skx, pky, sky, skR) and outputs (pkx, skx). Then (Kx, EncX, DecX) is IND-CPA secure.
2. Let $Ky(1^\lambda)$ be an algorithm that runs KeyGen $(1^\lambda)$, then takes the output (pkx, skx, pky, sky, skR) and outputs (pky, sky). Then (Ky, EncY, DecY) is IND-CPA secure.
3. Let $KR(1^\lambda)$ be an algorithm that runs KeyGen $(1^\lambda)$, then takes the output (pkx, skx, pky, sky, skR) and outputs (pkx, skx, skR). Then EncX(pkx, •) and EncY (pky, •) are one-way functions given a knowledge of skR.

In the above expressions, pkx, skx, pky, sky, skR, KeyGen, EncX( ) $\lambda$, and EncY( ) are as described above. DecX represents a first decryption algorithm. DecY represents a second decryption algorithm. Kx( ) Ky( ) and KR( ) are as described in the expressions. The symbol • indicates any value. The term "IND-CPA" represents shorthand for indistinguishability under chosen-plaintext attack. In some other embodiments, (Ky, EncY, DecY) and/or (Kx, EncX, DecX) may be secure according to another computational security metric such as indistinguishability under chosen ciphertext attack (e.g., IND-CCA1 or IND-CCA2) or any other suitable security metric.

Additionally, in some embodiments, the relational encryption scheme may include a relational linearity encryption scheme. The relational linearity encryption scheme may define a relation according to an example linearity relationship expression:

$R = \{(x, y, z) | x + y = z \char`\^ x,\ y,\ Z \in F_p^n\}$

In the linearity relationship expression, R, x, y, and z are as described above. The operator $\in$ represents a membership operator. The operator | represents a such that operator. The operator $\char`\^$ represents a logical conjunction operator. The parameter F represents a field. The superscript n may generally represent a dimension of the field. The dimension of the field may include a length of one or more of the keys as discussed elsewhere herein. The subscript p represents a base-number of the field. For example, in $F_3^{10}$ the field includes a dimension of 10 and a base-number of three. The base-number of three indicates each element of the field is a zero, one, or two.

Additionally, in some embodiments, the relational encryption scheme may include a relational proximity encryption scheme that defines a relation according to an example proximity expression:

$R\delta = \{(x, y) | dist(x, y) \leq \delta \char`\^ x,\ y \in F_p^k\}$

In the proximity expression, R, x, $\char`\^$, $\in$, and y are as described above. Parameter a represents a distance that defines closeness. An operator dist represents a Hamming distance. As in the linearity relationship expression, the parameter F represents a field. However, the field in the proximity expression may include a different dimension than the field in the linearity relationship expression. The dimension of the field in the proximity expression may be related to a linear error correcting code.

The relational encryption schemes discussed herein may be implemented in the operating environment 100 of FIG. 1. The relational encryption scheme may enable the second entity 150 to communicate encrypted information to the first entity 152 and allow the first entity 152 to discover a linearity relationship among the encrypted information and/or determine a proximity between the encrypted information.

The operating environment 100 may include a user device 102 associated with the second entity 150 and an authentication server 140 associated with the first entity 152. The user device 102 and the authentication server 140 may be implemented in the operating environment 100 to perform the relational encryption.

The user device 102 and the authentication server 140 may generally include any computing device that enables generation and communication of information and/or data (e.g., ciphertext, keys, plaintext vectors 142, etc.) related to relational encryption via a network 107. Some examples of the user device 102 may include a mobile phone, a scanning device, a smartphone, a tablet computer, a laptop computer, a desktop computer, a set-top box, or a connected device (e.g., a smartwatch, smart glasses, a smart pedometer, or any other connected device). Some examples of the authentication server 140 may include a hardware server or another processor-based computing device configured to function as a server.

The network 107 may be wired or wireless. The network 107 may include numerous configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes BLUETOOTH® communication networks or a cellular communications network for sending and receiving data including via short messaging service (SMS), multimedia messaging service (MMS), hypertext transfer protocol (HTTP), direct data connection, wireless application protocol (WAP), e-mail, etc.

The user device 102 may include a relational encrypt/decrypt module (enc/dec module) 110, a processor 124A, a memory 122A, and a communication unit 126A. The enc/dec module 110, the processor 124A, the memory 122A, and the communication unit 126A may be coupled via a bus 120A. The authentication server 140 may include a relational authentication module 108, a processor 124B, a memory 122B, and a communication unit 126B. The relational authentication module 108, the processor 124B, the memory 122B, and the communication unit 126B may be coupled via a bus 120B.

The processors 124A and 124B are referred to generally herein as the processor 124 or the processors 124, the memories 122A and 122B are referred to generally herein as the memory 122, the communication units 126A and 126B are referred to generally herein as the communication unit 126 or the communication units 126, and the buses 120A and 120B are referred to generally herein as the bus 120 or the buses 120.

The processors 124 may include an arithmetic logic unit (ALU), a microprocessor, a general-purpose controller, or some other processor array to perform computations and privacy preservation. The processors 124 may be coupled to the buses 120 for communication with the other components (e.g., 108, 110, 122, and 126). The processors 124 generally process data signals and may include various computing architectures including a complex instruction set computer (CISC) architecture, a reduced instruction set computer (RISC) architecture, or an architecture implementing a combination of instruction sets. In FIG. 1 the user device 102 and the authentication server 140 may each include a single processor 124. However, the user device 102 and/or the authentication server 140 may include multiple processors. Other processors, operating systems, and physical configurations may also be possible.

The memory 122 may be configured to store instructions and/or data that may be executed by one or more of the processors 124. The memory 122 may be coupled to the buses 120 for communication with the other components. The instructions and/or data may include code for performing the techniques or methods described herein. The memory 122 may include a DRAM device, an SRAM device, flash memory, or some other memory device. In some embodiments, the memory 122 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication units 126 may be configured to transmit and receive data to and from one or more of the user device 102 and/or the authentication server 140. The communication unit 126 may be coupled to the buses 120. In some embodiments, the communication unit 126 includes a port for direct physical connection to the network 107 or to another communication channel. For example, the communication unit 126 may include a USB, SD, CAT-5, or similar port for wired communication with the components of the operating environment 100 of FIG. 1. In some embodiments, the communication unit 126 includes a wireless transceiver for exchanging data via communication channels using one or more wireless communication methods, including IEEE 802.11, IEEE 802.16, BLUETOOTH®, or another suitable wireless communication method.

In some embodiments, the communication unit 126 includes a cellular communications transceiver for sending and receiving data over a cellular communications network including via SMS, MMS, HTTP, direct data connection, WAP, e-mail, or another suitable type of electronic communication. In some embodiments, the communication unit 126 includes a wired port and a wireless transceiver. The communication unit 126 may also provide other connections to the network 107 for distribution of files and/or media objects using standard network protocols including transmission control protocol/internet protocol (TCP/IP), HTTP, HTTP secure (HTTPS), and simple mail transfer protocol (SMTP), etc.

The enc/dec module 110 may be configured to set up a relational encryption scheme such as the relational encryption scheme defined above or having one or more of the characteristics discussed above. The enc/dec module 110 may then receive the plaintext vectors 142, encrypt the plaintext vectors 142, and communicate the ciphertexts to the authentication sever 140 via the network 107. Additionally, the enc/dec module 110 may be configured to decrypt ciphertext in order to construct one or more of the plaintext vectors 142. In embodiments in which the enc/dec module 110 is configured to perform encryption and/or decryption processes, the enc/dec module 110 may perform the encryption and/or decryption processes using the encryption/decryption algorithms and/or the encryption/decryption keys discussed herein.

In some embodiments in which the enc/dec module 110 is configured to set up the relational encryption scheme, the enc/dec module 110 may be configured to communicate one or more relational secret keys and/or one or more verification algorithms to the relational authentication module 108 of the authentication server 140. In other embodiments, the relational authentication module 108 may locally generate the relational secret keys and/or the verification algorithms and/or may obtain the relational secret keys or the verification algorithms from another source.

The relational authentication module 108 may be configured to receive the ciphertexts, the relational secret keys, the verification algorithms, or some combination thereof from the enc/dec module 110 or another source. The relational authentication module 108 may then discover a linearity relationship between ciphertexts and/or may detect a proximity between the ciphertexts. The relational authentication module 108 may use the relational secret keys and/or the verification algorithms to discover the linearity relationship and to detect the proximity between the ciphertext.

In the operating environment 100 of FIG. 1, the enc/dec module 110 may include a linearity encrypt/decrypt module 112, a proximity encrypt/decrypt module 114, a communication module 116, and a setup module 144. Additionally, the relational authentication module 108 may include a server communication module 134, a linearity authentication module 132, and a proximity authentication module 128. In some embodiments, the setup module 144 or a module configured to perform one or more operations attributed to the setup module 144 may be included in the relational authentication module 108.

The enc/dec module 110, the linearity encrypt/decrypt module 112, the proximity encrypt/decrypt module 114, the communication module 116, the setup module 144, the relational authentication module 108, the server communication module 134, the linearity authentication module 132, and the proximity authentication module 128 may be referred to collectively as the relational modules. One or more of the relational modules may be implemented as software including one or more routines configured to perform one or more operations described herein. The relational modules may include a set of instructions executable by the processors 124 to provide the functionality described herein. In some instances, the relational modules may be stored in or at least temporarily loaded into the memory 122 and may be accessible and executable by one or more of the processors 124. One or more of the relation modules may be adapted for cooperation and communication with one or more of the processors 124 via one or more of the buses 120.

Referring generally to the relational modules, the communication module 116 and/or the server communication module 134 may be configured to handle communications between the enc/dec module 110 or the relational authentication module 108, respectively, and other components of the user device 102 or the authentication server 140 (e.g., 122, 124, and 126). The communication module 116 and/or the server communication module 134 may be configured to send and receive data, via the communication unit 126, to and from the user device 102 or the authentication server 140. In some instances, the communication module 116 and/or the server communication module 134 may cooperate with the other relational modules to receive and/or forward, via the communication unit 126, data from the user device 102 or the authentication server 140.

The linearity encrypt/decrypt module 112 may be configured to perform one or more operations associated with encrypting the plaintext vectors 142 to construct linearity ciphertexts and/or associated with decrypting linearity ciphertexts. The linearity authentication module 132 may be configured to perform one or more operations associated with the linearity ciphertexts. For example, the linearity authentication module 132 may be configured to discover a linearity relationship between two or more of the linearity ciphertexts.

The proximity encrypt/decrypt module 114 may be configured to perform one or more operations associated with encrypting the plaintext vectors 142 to construct proximity ciphertext and/or associated with decrypting proximity ciphertext. The proximity authentication module 128 may be configured to perform one or more operations associated with the proximity ciphertext. For example, the proximity authentication module 128 may be configured to detect a proximity between two or more proximity ciphertexts.

The setup module 144 may be configured to generate one or more keys (e.g., public keys, secret keys, relational secret keys) and/or one or more algorithms (e.g., encryption algorithms, decryption algorithms, and verification algorithms). The setup module 144 may then communicate one or more of the keys and algorithms to the relational authentication module 108 via the communication module 116 and the server communication module 134 or to the linearity encrypt/decrypt module 112 and the proximity encrypt/decrypt module 114.

In the following sections, a relational linearity encryption scheme is described followed by a relational proximity encryption scheme. The relational linearity encryption scheme is described with reference to bit vectors then with reference to p-ary vectors. In each of the descriptions, the setup module 144 generates keys, which is described first. Using the keys, one of the linearity encrypt/decrypt module 112 or the proximity encrypt/decrypt module 114 performs an encryption, which is described next. Ciphertexts (e.g., linearity ciphertext or proximity ciphertexts) may then be communicated to one of the linearity authentication module 132 and the proximity authentication module 128 where a linearity relationship is discovered or a proximity is detected. Finally, decryptions of the ciphertexts that may be performed by the linearity encrypt/decrypt module 112 or the proximity encrypt/decrypt module 114 are described.

Relational Linearity Encryption Schemes

In one or more operations included in discovering a linearity relationship between ciphertexts, the setup module 144 may output keys that may be based at least partially on a base-number of elements of the plaintext vectors 142 and/or the ciphertexts. For example, the base-number of the elements may include two (e.g., a binary or bit vector). Accordingly, the plaintext vectors 142 and the ciphertexts may include elements that include either a zero or a one. Alternatively, the base-number of the elements may include three (e.g., tri-ary vectors). Accordingly, the plaintext vectors 142 and the ciphertexts may include elements that include a zero, a one, or a two. Generally, the base-number may be represented by a variable "p" (e.g., a p-ary vector). The p-ary vectors may include elements that may include a zero, a one . . . a p-2, and a p-1. The relational linearity encryption schemes are slightly different based on whether the plaintext vectors 142 and/or the ciphertexts are bit vectors or p-ary vectors. The relational linearity encryption scheme of bit vectors is discussed first, which is followed by the relational linearity encryption scheme of p-ary vectors.

In the relational linearity encryption scheme of bit vectors and of p-ary vectors, the setup module 144 may be configured to generate keys of the relational linearity encryption scheme. In the depicted embodiment, the setup module 144 may generate a first linearity secret key, a second linearity secret key, a first linearity public key, a second linearity public key, and a linearity relational secret key (collectively, "linearity keys"). The linearity keys may be used to encrypt the plaintext vectors 142 to generate linearity ciphertexts, to decrypt the linearity ciphertexts, and to discover a linearity relationship between the linearity ciphertexts.

For example, the first linearity public key may be used by the linearity encrypt/decrypt module 112 to encrypt the first plaintext vector 142A to generate a first linearity ciphertext. The first linearity ciphertext may be communicated to the authentication server 140 by the communication module 116, where it may be stored as a registration ciphertext 130. The second linearity public key may be used by the linearity encrypt/decrypt module 112 to encrypt the second plaintext vector 142B to generate a second linearity ciphertext. The second linearity ciphertext may be communicated to the authentication server 140 by the communication module 116. The linearity relational secret key may be used at the authentication server 140, in particular by the linearity authentication module 132, to discover a linearity relationship between the second linearity ciphertext and the first linearity ciphertext, which is stored as the registration ciphertext 130.

The first and second linearity secret keys may be used by the linearity encrypt/decrypt module 112 to decrypt one or more of the linearity ciphertexts. For example, a first linearity ciphertext may be decrypted using a first secret key. Additionally, the first and second linearity secret keys may be used by the setup module 144 to generate the relational linearity key. Some additional details of the linearity keys and the above operations are provided below for bit vectors and for p-ary vectors.

Bit Vector Relational Linearity Encryption Scheme

In embodiments in which bit vectors are implemented, the linearity keys may be generated for a security parameter. Generally, the security parameter as used herein may refer to a key length. To generate the keys, the setup module 144 may generate three bilinear groups of a prime order. The prime order may be exponential in the security parameter. The setup module 144 may sample a first generator of a first bilinear group of the three bilinear groups and sample a second generator of a second bilinear group of the three bilinear groups.

The setup module 144 may generate the first linearity secret key by randomly sampling a particular number of elements from a set of integers. The set of integers may include zero to a value of the prime order minus one. The setup module 144 may generate the second linearity secret key by randomly sampling the particular number of elements from the set of integers.

The setup module 144 may define the first linearity public key. The first linearity public key may include an element that is the first generator. The first linearity public key may further include one or more other elements that include the first generator raised to the power of a corresponding element of the first linearity secret key. In some embodiments, the element that is the first generator may be the first element of the first linearity public key, which may not be accounted for in the correspondency between the elements of the first linearity public key and the first linearity secret key. For example, in these and other embodiments, the "sixth" element (e.g., accounting for the first element) of the first linearity public key may include the first generator raised to the power of the fifth element of the first linearity secret key. Throughout this application, a similar convention may be implemented for correspondency between elements.

The setup module 144 may define the second linearity public key. The second linearity public key may include an element that is the second generator. The second linearity public key may further include one or more other elements that may include the second generator raised to the power of a corresponding element of the second linearity secret key. In some embodiments, the element that is the second generator may be the first element of the second linearity public key, which may not be accounted for in the correspondency between the elements of the second linearity public key and the second linearity secret key.

The setup module 144 may define the linearity relational secret key. Each element of the linearity relational secret key may include a sum of the corresponding element of the second linearity secret key and the corresponding element of the first linearity secret key. For example, a fifth element of the linearity relational secret key may include a sum of a fifth element of the first linearity secret key and a fifth element of the second linearity secret key.

In some embodiments, generation of the linearity keys may be according to example linearity bit vector key expressions:

Given $\lambda$, generate $G_1$, $G_2$, $G_T$ of q $g_0 \leftarrow G_1$ $h_0 \leftarrow G_2$ $pkxlin := g_0, \langle g_i \rangle_{i=1}^n;$ where $(g_i = g_0^{a_i})$ $pkylin := h_0, \langle h_i \rangle_{i=1}^n;$ where $(h_i = h_0^{b_i})$ $skxlin := \langle a_i \rangle_{i=1}^n = \text{random}\_ \in Z_q$ $skylin := \langle b_i \rangle_{i=1}^n = \text{random}\_ \in Z_q$ $skRlin := \sum_{i=1}^n a_i b_i$ $g_i = g_0^{a_i}$ $h_i = h_0^{b_i}$ In the linearity bit vector key expressions, ← and $\lambda$ are generally as described above. In addition, in the linearity bit vector key expressions, pkxlin represents a first linearity public key, skxlin represents a first linearity secret key, pkylin represents a second linearity public key, skylin represents a second linearity secret key, and skRlin represents a relational linearity key. Additionally, the parameters skylin, and skRlin may represent at least a linearity portion of the output of the key generation algorithm (KeyGen) discussed above.

The parameter $G_1$ represents a first bilinear group. The parameter $G_2$ represents a second bilinear group. The parameter $G_T$ represents a third bilinear group. The parameter q represents a prime order. The parameter $g_0$ represents a first generator and an element of the first linearity public key. The parameter $h_0$ represents a second generator and an element of the second linearity public key. The parameter $g_i$ represents other elements of the first linearity public key. The parameter $h_i$ represents other elements of the second linearity public key. The parameter n represents a particular number (e.g., the particular number of elements). The parameter i represents an indexing variable. In the linearity bit vector key expressions, the indexing variable includes the range from one to the particular number. The parameter $Z_q$ represents a set of integers including zero up to one less than the prime order. The parameter $a_i$ represents an element of the first linearity secret key. The element of the first linearity secret key may be the random value of the set of integers. The parameter $b_i$ represents an element of the second linearity secret key. The element of the second linearity secret key may be the random value of the set of integers. The operator $\langle \ \rangle$ represents a shorthand notation. For example, $\langle b_i \rangle_{i=1}^n$ represents $b_1, b_2, \ldots b_n$.

The linearity encrypt/decrypt module 112 may encrypt the plaintext vectors 142. The linearity encrypt/decrypt module 112 may receive the plaintext vectors 142. Additionally or alternatively, the communication module 116 may receive the plaintext vectors 142 and communicate the plaintext vectors 142 to the linearity encrypt/decrypt module 112.

The plaintext vectors 142 may include a member of a first field. The first field may include elements of zero and one and a dimension of the particular number. The elements of a field may be determined by the base-number of the elements. For instance, in bit vectors the first field may include elements of zero and one, while in p-ary vectors, a field may include elements of zero, one . . . p-1.

The linearity encrypt/decrypt module 112 may sample a random number from the set of integers. The linearity encrypt/decrypt module 112 may then construct the first linearity ciphertext and the second linearity ciphertext. The first linearity ciphertext may include a first element that is the first generator raised to the power of the random number. The first linearity ciphertext may further include one or more elements that include a corresponding element of the first linearity public key raised to a linearity encryption power. The linearity encryption power for the first linearity ciphertext may include the random number multiplied by negative one raised to the power of a corresponding element of the first plaintext vector 142A. In some embodiments, the first element of the first linearity ciphertext may not be accounted for in the correspondencies.

The second linearity ciphertext may include a first element that is the second generator raised to the power of the random number. The second linearity ciphertext may further include one or more elements that include a corresponding element of the second linearity public key raised to the linearity encryption power. The linearity encryption power for the second linearity ciphertext may include the random number multiplied by negative one raised to the power of a corresponding element of the second plaintext vector 142B. In some embodiments, the first element of the second linearity ciphertext may not be accounted for in the correspondencies.

In some embodiments, the linearity encrypt/decrypt module 112 may encrypt the plaintext vectors 142 according to example linearity bit vector encryption expressions:

$$m1 = \langle m1_i \rangle_{i=1}^n \in F_2^n$$

$$m2 = \langle m2_i \rangle_{i=1}^n \in F_2^n$$

$$cx := g_0^r, \left\langle g_i^{(-1)^{m1_i} r} \right\rangle_{i=1}^n$$

$$cy := h_0^r, \left\langle h_i^{(-1)^{m2_i} r} \right\rangle_{i=1}^n$$

In the linearity bit vector encryption expressions, $\langle \ \rangle$, cx, cy, $g_0$, $h_0$, $g_i$, $h_i$, i, and n are as described above. In addition, in the linearity bit vector encryption expressions, the parameter cx represents a first linearity ciphertext and the parameter cy represents a second linearity ciphertext. The parameter m1 represents the first plaintext vector 142A. The parameter $m1_i$ represents an element of the first plaintext vector 142A. The parameter m2 represents the second plaintext vector 142B. The parameter $m2_i$ represents an element of the second plaintext vector 142B. The parameter F represents a first field. The subscript 2 next to the field represents the base-number of the first field. The superscript n next to the first field represents the dimension of the first field.

The linearity bit vector encryption expressions may define the first encryption algorithm (EncX) and the second encryption algorithm (EncY) discussed above. For example, the first encryption algorithm may be defined as: given the first plaintext vector 142A and the first linearity public key, the first encryption algorithm samples the random number and constructs the first linearity ciphertext as $$cx := g_0^r, \left\langle g_i^{(-1)^{m1_i} r} \right\rangle_{i=1}^n.$$

Likewise, the second encryption algorithm may be defined as: given the first plaintext vector 142A and the second linearity public key, the second encryption algorithm samples the random number and constructs the second linearity ciphertext as $$cy := h_0^r, \left\langle h_i^{(-1)^{m2_i} r} \right\rangle_{i=1}^n.$$

The first linearity ciphertext and the second linearity ciphertext may be communicated to the linearity authentication module 132. Additionally or alternatively, the first linearity ciphertext and the second linearity ciphertext may be communicated to the authentication server via the network 107. The server communication module 134 may receive the first linearity ciphertext and the second linearity ciphertext and communicate the first linearity ciphertext and the second linearity ciphertext to the linearity authentication module 132.

In some embodiments, the first linearity ciphertext may be communicated to the linearity authentication module 132 prior to communication of the second linearity ciphertext. The linearity authentication module 132 may store the first linearity ciphertext in the memory 122B as the registration ciphertext 130. After communicating the first linearity ciphertext, the second linearity ciphertext may be communicated to the linearity authentication module 132. Additionally, the setup module 144 may communicate the relational linearity key to the linearity authentication module 132.

In some embodiments in which relational encryption are used for authentication the first linearity ciphertext may be stored as the registration ciphertext 130. The registration ciphertext 130 may be used as a basis of comparison against the second linearity ciphertext or any other subsequent linearity ciphertext. In other embodiments implementing relational encryption, the first linearity ciphertext may not be stored as the registration ciphertext 130. For example, the first linearity ciphertext and the second linearity ciphertext may analyze without storing them or may both be stored.

The linearity authentication module 132 may be configured to discover a linearity relationship between the first linearity ciphertext and the second linearity ciphertext. To discover the linearity relationship, the linearity authentication module 132 may define a particular vector. The particular vector may be a member of the first field. An authentication problem determined by the linearity authentication module 132 may be to decide if the particular vector is the sum of the first plaintext vector 142A and the second plaintext vector 142B.

The linearity authentication module 132 may calculate a first value as a pairing function of the first element (e.g., the first generator raised to the power of the random number) of the first linearity ciphertext and the first element (e.g., the second generator raised to the power of the random number) of the second linearity ciphertext raised to the power of the linearity relational secret key.

The linearity authentication module 132 may also calculate a second value as a product of the pairing function of each element of the first linearity ciphertext and a corresponding element in the second linearity ciphertext of the second linearity ciphertext raised to the power of negative one raised to the power of a corresponding element of the particular vector.

The linearity authentication module 132 may determine whether the first value is equal to the second value. In response to the first value being equal to the second value, the linearity authentication module 132 may conclude that the first linearity ciphertext is linearly related to the second linearity ciphertext and the defined vector.

In some embodiments, the linearity authentication module 132 discovers the linearity relationship between the first linearity ciphertext and the second linearity ciphertext according to example linearity bit vector verification expressions:

$z := \langle z_i \rangle_{i=1}^{n} \in F_2^n$
$cx_0 := g_0^r$ $$cx_i := \langle g_i^{(-1)^{m1_i} r} \rangle_{i=1}^{n}$$

$cx := cx_0, \langle cx_i \rangle_{i=1}^{n}$
$cy_0 := h_0^r$ $$cy_i := \langle h_i^{(-1)^{m1_i} r} \rangle_{i=1}^{n}$$

$cy := cy_0, \langle cy_i \rangle_{i=1}^{n}$ $$e(cx_0, cy_0)^{skR} \stackrel{?}{=} \prod_{i=1}^{n} e(cx_i, cy_i)^{(-1)^{z_i}}$$

In the linearity bit vector verification expressions, $\langle \rangle$, cx, cy, $g_0$, $h_0$, $g_i$, $h_i$, i, n, F, skR, and rare as described above. The parameter $cx_0$ represents a first element of the first linearity ciphertext. The parameter $cy_0$ represents a first element of the second linearity ciphertext. The parameter $cx_i$ represents other elements of the first linearity ciphertext. The parameter $cy_i$ represents other elements of the second linearity ciphertext. The parameter z represents the particular vector. The parameter $z_i$ represents an element of the particular vector. The operator e represents a pairing function. The pairing function may be related to the bilinear groups. The operator $\pi$ represents a product operator. The linearity bit vector verification expressions may define the verification algorithm (Verify) discussed above. For example, the verification algorithm may be defined as checking the equality $$e(cx_0, cy_0)^{skR} \stackrel{?}{=} \prod_{i=1}^{n} e(cx_i, cy_i)^{(-1)^{z_i}}$$

given the ciphertexts, the particular vector, and the relational linearity key.

Additionally, in some embodiments, the linearity encrypt/decrypt module 112 may decrypt the first and/or second linearity ciphertexts. The linearity encrypt/decrypt module 112 may determine each element of a resulting plaintext vector 142 based on values of the linearity ciphertext. For example, a value may be determined for each element of a first plaintext vector (e.g., the first plaintext vector 142A) that is constructed by decrypting the first linearity ciphertext.

For each element, the linearity encrypt/decrypt module 112 may determine whether: (1) a corresponding element in the first linearity ciphertext is equal to the first element of the first linearity ciphertext raised to a corresponding element of the first linearity secret key; (2) the corresponding element in the first linearity ciphertext is equal to the first element of the first linearity ciphertext raised to negative one multiplied by the corresponding element of the first linearity secret key; or (3) the corresponding element in the first linearity ciphertext is equal to another value.

In response to the corresponding element in the first linearity ciphertext being equal to the first element of the first linearity ciphertext raised to the corresponding element of the first linearity secret key (e.g., (1) from the immediately preceding paragraph), the linearity encrypt/decrypt module 112 may set the element of the first plaintext vector 142A to zero. In response to the corresponding element in the first linearity ciphertext being equal to the first element of the first linearity ciphertext raised to negative one multiplied by the corresponding element of the first linearity secret key (e.g., (2) from the immediately preceding paragraph), the linearity encrypt/decrypt module 112 may set the element of the first plaintext vector 142A to one. In response to the corresponding element in the first linearity ciphertext being equal to another value (e.g., (3) from the immediately preceding paragraph), the linearity encrypt/decrypt module 112 may return an error. The second linearity ciphertext may be similarly decrypted using the second linearity secret key and the second linearity ciphertext.

In some embodiments, the linearity encrypt/decrypt module 112 may decrypt the linearity ciphertexts according to example linearity bit vector decryption expressions:

$$m1_i := \begin{cases} 0, & \text{if } cx_i = cx_0^{a_i} \\ 1, & \text{if } cx_i = cx_0^{-a_i} \\ \bot, & \text{else} \end{cases}$$

$$m2_i := \begin{cases} 0, & \text{if } cy_i = cy_0^{b_i} \\ 1, & \text{if } cy_i = cy_0^{-b_i} \\ \bot, & \text{else} \end{cases}$$

In the linearity bit vector decryption expressions, $cx_i$, $cy_i$, $cx_0$, $cy_0$, $a_i$, $b_i$, $m1_i$, and $m2_i$ are as above. The parameter $\perp$ represents an error.

The linearity bit vector decryption expressions may define the first decryption algorithm (DecX) and the second decryption algorithm (DecY) discussed above. For example, the first decryption algorithm may be defined as: given the first linearity ciphertext and the first linearity secret key, the first decryption algorithm may construct the first plaintext vector 142 bit by bit according to an expression:

$$m1_i := \begin{cases} 0, & \text{if } cx_i = cx_0^{a_i} \\ 1, & \text{if } cx_i = cx_0^{-a_i} \\ \perp, & \text{else} \end{cases}$$

Likewise, the second decryption algorithm may be defined as: given the second linearity ciphertext and the second linearity secret key, the second decryption algorithm may construct the second plaintext vector 142B bit by bit according to an expression:

$$m2_i := \begin{cases} 0, & \text{if } cy_i = cy_0^{b_i} \\ 1, & \text{if } cy_i = cy_0^{-b_i} \\ \perp, & \text{else} \end{cases}$$

P-Ary Vector Relational Linearity Encryption Scheme

In embodiments in which p-ary vectors are implemented (e.g., the plaintext vectors 142 and/or the ciphertexts are p-ary vectors), the linearity keys may be generated for a security parameter. To generate the keys, the setup module 144 may generate three bilinear groups of a prime order. The prime order may be exponential in the security parameter and equal to one modulo the base-number (p). Accordingly, in these embodiments, a subgroup may exist in the set of integers with zero omitted. The subgroup may have the order of the base-number. The setup module 144 may select an arbitrary generator of the subgroup.

The setup module 144 may sample the first generator and the second generator. The first generator may be sampled from the first bilinear group and the second generator may be sampled from the second bilinear group. The first linearity secret key and the second linearity secret key may be generated as described above with reference to embodiments implementing bit vectors.

The setup module 144 may define the first linearity public key, which may include an element that is the first generator. The first linearity public key may further include one or more other elements that include the first generator raised to the power of a corresponding element of the first linearity secret key. Additionally, an element of the first linearity public key may include the arbitrary generator. In some embodiments, the first element of the first linearity public key may be the arbitrary generator and the second element of the first linearity public key may be the first generator. The first and second elements of the second linearity public key may not be accounted for in the correspondencies.

The setup module 144 may define the second linearity public key. The second linearity public key may include an element that is the second generator. The second linearity public key may further include one or more other elements that may include the second generator raised to the power of a corresponding element of the second linearity secret key.

Additionally, an element of the second linearity public key may include the arbitrary generator. In some embodiments, the first element of the second linearity public key may be the arbitrary generator and the second element of the second linearity public key may be the second generator. The first and second elements of the second linearity public key may not be accounted for in the correspondencies.

The setup module 144 may define the linearity relational secret key. Each element of the linearity relational secret key may include a sum of the corresponding element of the second linearity secret key and the corresponding element of the first linearity secret key.

In some embodiments, generation of the linearity keys may be according to example linearity p-ary vector key expressions:

Given: $\lambda$, generate $G_1$, $G_2$, $G_T$, of q exponential in the $\lambda$ and equal to 1(mod p)

$$J_p \subseteq Z_q^*$$

$$\varpi \leftarrow J_p$$

$$g_0 \leftarrow G_1$$

$$h_0 \leftarrow G_2$$

$$pkxlin := \varpi, g_0, \langle g_i \rangle_{i=1}^n; \text{ where } (g_i = g_0^{a_i})$$

$$pkylin := \varpi, h_0, \langle h_i \rangle_{i=1}^n; \text{ where } (h_i = h_0^{b_i})$$

$$skxlin := \langle a_i \rangle_{i=1}^n = \text{random}\_ \in Z_q$$

$$skylin := \langle b_i \rangle_{i=1}^n = \text{random}\_ \in Z_q$$

$$skRlin := \sum_{i=1}^n a_i b_i$$

$$g_i = g_0^{a_i}$$

$$h_i = h_0^{b_i}$$

In the linearity p-ary vector key expressions, $\langle \ \rangle$, $g_0$, $h_0$, $g_i$, $h_i$, $a_i$, $b_i$, i, n, Z, F, skR, r, $G_1$, $G_2$, $G_T$, q, pkxlin, skxlin, pkylin, skylin, skRlin, $\leftarrow$, and $\lambda$ are generally as described above. The parameters pkxlin, skxlin, pkylin, skylin, and skRlin may represent at least a linearity portion output of the key generation algorithm discussed above.

The parameter p represents the base-number. The parameter $J_p$ represents a subgroup of order p. The parameter $\omega$ represents an arbitrary generator. The operator mod represents the modulo function. The "*" next to Z represents that zero is omitted from the set of integers.

The linearity encrypt/decrypt module 112 may receive the plaintext vectors 142. Additionally or alternatively, the communication module 116 may receive the plaintext vectors 142 and may communicate the plaintext vectors 142 to the linearity encrypt/decrypt module 112. The plaintext vectors 142 may include a member of a second field. The second field may include elements having a value of zero up to a value of the base-number minus one (e.g., 0, 1, . . . p-1).

The linearity encrypt/decrypt module 112 may sample a random number from the set of integers. The linearity encrypt/decrypt module 112 may then construct the first linearity ciphertext and the second linearity ciphertext. The first linearity ciphertext may include a first element that is the first generator raised to the power of the random number. Additionally, the first linearity ciphertext may include one or more other elements including a corresponding element of the first linearity public key raised to a linearity encryption power. The linearity encryption power for the first linearity ciphertext may include the random number multiplied by the arbitrary generator raised to the power of a corresponding element of the first plaintext vector 142A. In some embodiments, the first element of the first linearity ciphertext may not be accounted for in the correspondencies.

The second linearity ciphertext may include a first element that is the second generator raised to the power of the random number. Additionally, the second linearity ciphertext may include one or more other elements including a corresponding element of the second linearity public key raised to a linearity encryption power. The linearity encryption power for the second linearity ciphertext may include the random number multiplied by the arbitrary generator raised to the power of a corresponding element of the second plaintext vector 142B. In some embodiments, the first element of the second linearity ciphertext may not be accounted for in the correspondencies.

In some embodiments, the linearity encrypt/decrypt module 112 may encrypt the plaintext vectors 142 according to example linearity p-ary vector encryption expressions:

$$m1 = \langle m1_i \rangle_{i=1}^n \in F_2^n$$
$$m2 = \langle m2_i \rangle_{i=1}^n \in F_2^n$$

$$cx := g_0^r, \langle g_i^{\varpi^{m1_i} r} \rangle_{i=1}^n$$

$$cy := h_0^r, \langle h_i^{\varpi^{m2_i} r} \rangle_{i=1}^n$$

In the linearity p-ary vector encryption expressions, $\langle \rangle$, , m1, $m1_i$, m2, $m2_i$, cx, cy, $g_0$, $h_0$, $g_i$, $h_i$, i, and n are as described above. The parameter F represents a second field. The subscript p next to the second field represents the base-number of the second field. The superscript n next to the second field represents the dimension of the second field. The dimension of the second field may be the particular number.

The linearity p-ary vector encryption expressions may define the first encryption algorithm (EncX) and the second encryption algorithm (EncY) discussed above. For example, the first encryption algorithm may be defined as: given the first plaintext vector 142A and the first linearity public key, the first encryption algorithm samples the random number and constructs the first linearity ciphertext as $$cx := g_0^r, \langle g_i^{\varpi^{m1_i} r} \rangle_{i=1}^n .$$

Likewise, the second encryption algorithm may be defined as: given the first plaintext vector 142A and the second linearity public key, the second encryption algorithm samples the random number and constructs the second linearity ciphertext as $$cy := h_0^r, \langle h_i^{\varpi^{m2_i} r} \rangle_{i=1}^n .$$

The first linearity ciphertext and the second linearity ciphertext may be communicated to the linearity authentication module 132. Additionally or alternatively, the first linearity ciphertext and the second linearity ciphertext may be communicated to the authentication server via the network 107. The server communication module 134 may receive the first linearity ciphertext and the second linearity ciphertext and communicate the first linearity ciphertext and the second linearity ciphertext to the linearity authentication module 132.

To discover the linearity relationship, the linearity authentication module 132 may define a particular vector. The particular vector may be a member of a second field. The particular vector may be defined as a sum of the first plaintext vector 142A and the second plaintext vector 142B. The linearity authentication module 132 may calculate a first value as a pairing function of the first element (e.g., the first generator raised to the power of the random number) of the first linearity ciphertext and the first element (e.g., the second generator raised to the power of the random number) of the second linearity ciphertext raised to the power of the linearity relational secret key.

The linearity authentication module 132 may also calculate a second value as a product of the pairing function of each element of the first linearity ciphertext and a corresponding element of the second linearity ciphertext raised to the power of the arbitrary generator raised to the power of a product of negative one and a corresponding element of the particular vector.

The linearity authentication module 132 may determine whether the first value is equal to the second value. In response to the first value being equal to the second value, the linearity authentication module 132 may conclude that the first linearity ciphertext is linear to the second linearity ciphertext.

In some embodiments, the linearity authentication module 132 discovers the linearity relationship between the first linearity ciphertext and the second linearity ciphertext according to example linearity p-ary vector verification expressions:

$$z = \langle z_i \rangle_{i=1}^n \in F_2^n$$
$$cx_0 := g_0^r$$

$$cx_i := \langle g_i^{(-1)^{m1_i} r} \rangle_{i=1}^n$$

$$cx := cx_0, \langle cx_i \rangle_{i=1}^n$$
$$cy_0 := h_0^r$$

$$cy_i := \langle h_i^{(-1)^{m1_i} r} \rangle_{i=1}^n$$

$$cy := cy_0, \langle cy_i \rangle_{i=1}^n$$

$$e(cx_0, cy_0)^{skR} \stackrel{?}{=} \prod_{i=1}^n e(cx_i, cy_i)^{\varpi^{-z_i}}$$

In the linearity p-ary vector verification expressions the parameters and operators are as described above.

The linearity p-ary vector verification expressions may define the verification algorithm (Verify) discussed above.

For example, the verification algorithm may be defined as checking the equality $$e(cx_0, cy_0)^{skR} \stackrel{?}{=} \prod_{i=1}^{n} e(cx_i, cy_i)^{\varpi^{-z_i}}$$

given the ciphertexts, the particular vector, and the relational linearity key.

Additionally, in some embodiments, the linearity encrypt/decrypt module 112 may decrypt the first and/or second linearity ciphertexts. The linearity encrypt/decrypt module 112 may determine each element of a resulting plaintext vector 142 based on values of the linearity ciphertext. For example, a value may be determined for each element of a first plaintext vector (e.g., the first plaintext vector 142A) that is constructed by decrypting the first linearity ciphertext.

To decrypt the ciphertext, a particular element value may be determined. The particular element value may be bounded by a polynomial in the security parameter. Additionally, the particular element value may be a member of a field having elements including the base-number. For each element of the first plaintext vector 142A, the linearity encrypt/decrypt module 112 may determine whether there exists a particular element value such that a corresponding element in the first linearity ciphertext is equal to the first element of the first linearity ciphertext raised to a product of the arbitrary generator raised to the particular element value and corresponding element of the first linearity secret key.

In response to a particular element value existing such that the corresponding element in the first linearity ciphertext is equal to the first element of the first linearity ciphertext raised to the product of the arbitrary generator raised to the particular element value and corresponding element of the first linearity secret key, the linearity encrypt/decrypt module 112 may set the element to the particular element value.

In response to no such particular element value existing, the linearity encrypt/decrypt module 112 may output an error. The second linearity ciphertext may be similarly decrypted using the second linearity secret key and the second linearity ciphertext.

In some embodiments, the linearity encrypt/decrypt module 112 may decrypt the linearity ciphertexts according to the linearity p-ary vector decryption expressions:

$$m1_i := \begin{cases} \mu, & \text{if } cx_i = cx_0^{\varpi^{\mu} a_i} \text{for some } \mu \in F_p \\ \bot, & \text{if no such } \mu \text{ exists} \end{cases}$$

$$m2_i := \begin{cases} \mu, & \text{if } cy_i = cy_0^{\varpi^{\mu} b_i} \text{for some } \mu \in F_p \\ \bot, & \text{if no such } \mu \text{ exists} \end{cases}$$

In the linearity p-ary vector decryption expressions, $cx_i$, $cy_i$, $cx_0$, $cy_0$, $a_i$, $b_i$, $m1_i$, and $m2_i$ are as above. The parameter $\bot$ represents an error. The parameter $\mu$ represents the particular element value.

The linearity p-ary vector decryption expressions may define the first decryption algorithm (DecX) and the second decryption algorithm (DecY) discussed above. For example, the first decryption algorithm may be defined as: given the first linearity ciphertext and the first linearity secret key, the first decryption algorithm may construct the first plaintext vector 142A bit by bit according to an expression:

$$m1_i := \begin{cases} \mu, & \text{if } cx_i = cx_0^{\varpi^{\mu} a_i} \text{for some } \mu \in F_p \\ \bot, & \text{if no such } \mu \text{ exists} \end{cases}$$

Likewise, the second decryption algorithm may be defined as: given the second linearity ciphertext and the second linearity secret key, the second decryption algorithm may construct the second plaintext vector 142B bit by bit according to an expression:

$$m2_i := \begin{cases} \mu, & \text{if } cy_i = cy_0^{\varpi^{\mu} b_i} \text{for some } \mu \in F_p \\ \bot, & \text{if no such } \mu \text{ exists} \end{cases}$$

Relational Proximity Encryption Scheme

A relational proximity encryption scheme may be used to determine a closeness between proximity ciphertexts. In some embodiments, the proximity may be provided in terms of a Hamming distance. In the relational proximity encryption scheme, the setup module 144 generates keys. Using the keys the proximity encrypt/decrypt module 114 performs an encryption and/or a decryption of the plaintext vectors 142. Proximity ciphertexts may then be communicated to the proximity authentication module 128 where a proximity between the proximity ciphertexts may be detected.

For example, the setup module 144 may generate an output of a chosen-plaintext attack (CPA) key generation algorithm and a linearity key generation algorithm. For example, the setup module 144 may run the linearity keys as described elsewhere herein. The CPA key generation algorithm may output a CPA public key and a CPA secret. The linearity key generation algorithm may output the pkxlin, skxlin, pkylin, skylin, and skRlin discussed above.

Additionally, the setup module 144 may choose an error correcting code (ECC). The ECC may be a linear error correcting code scheme. The ECC may include a length, a rank, and a distance. Additionally, the ECC may also include an ECC encoding operator (ENCODE) and an ECC decoding operator (DECODE). The setup module 144 may then generate a first proximity secret key, a second proximity secret key, a first proximity public key, a second proximity public key, and a proximity relational secret key (collectively, "proximity keys"). The proximity keys are used in the relational encryption to encrypt the plaintext vectors 142 to generate proximity ciphertexts, decrypt the proximity ciphertexts, and to detect a proximity between the proximity ciphertexts.

The first proximity secret key may be defined based on the CPA secret key and the first linearity secret key. The second proximity secret key may be defined based on the CPA secret key and the second linearity secret key. The first proximity public key may be defined based on the ENCODE, the DECODE, the CPA public key, and the first linearity public key. The second proximity public key may be defined based on the ENCODE, the DECODE, the CPA public key, and the second linearity public key. The proximity relational secret key may be defined based on the CPA secret key and the linearity relational secret key.

In some embodiments, the setup module 144 may generate the proximity keys according to example proximity key generation expressions:

(pkCPA, skCPA)←KeyGenCPA
(pkxlin, pkylin, skxlin, skylin, skRlin)←KeyGenLinear
pkxprox:=(ENCODE, DECODE, pkcpa, pkxlin, X)

pkyprox:=(ENCODE, DECODE, pkcpa, pkylin, X)
skxprox:=(skCPA, skxlin)
skyprox:=(skCPA, skylin)
skRprox:=(skCPA, skRlin)
$X \in Z_2^{m/4 \times m}$ In the proximity key generation expressions, pkxlin, pkylin, skxlin, skylin, skRlin, ←, Z, m, and n are as above. The parameter pkCPA represents a CPA public key. The parameter skCPA represents a CPA secret key. The parameter KeyGenCPA represents a CPA key generation algorithm. The parameter pkxprox represents a first proximity public key. The parameter pkyprox represents a second proximity public key. The parameter skxprox represents a first proximity secret key. The parameter skyprox represents a second proximity secret key. The parameter skRprox represents a proximity relational secret key. Additionally, the parameters pkxprox, skRprox, pkyprox, skRprox, and skRprox may represent at least a proximity portion of the output of the key generation algorithm (KeyGen) discussed above. The parameter X represents a linear extractor. While a specific iteration is described above, any linear extractor may be used.

The first proximity public key may be used by the proximity encrypt/decrypt module 114 to encrypt the first plaintext vector 142A to generate a first proximity ciphertext. The proximity encrypt/decrypt module 114 may receive the plaintext vectors 142. Additionally or alternatively, the communication module 116 may receive the plaintext vectors 142 and communicate the plaintext vectors 142 to the proximity encrypt/decrypt module 114. The plaintext vectors 142 may include a member of the first or second fields.

The proximity encrypt/decrypt module 114 may sample a proximity random number from a third field. The third field may include a base-number and a dimension that may be the rank of the ECC. The proximity encrypt/decrypt module 114 may then construct the first proximity ciphertext and the second proximity ciphertext. Each of the first proximity ciphertext and the second proximity ciphertext may include two parts. The first part of the first proximity ciphertext may include a CPA encryption algorithm receiving as inputs the CPA public key and a sum of the first plaintext vector 142A and ENCODE receiving the proximity random number as an input. The second part of the first proximity ciphertext may include the first linearity encryption algorithm that receives the first linearity public key and the proximity random number.

The first part of the second proximity ciphertext may include a CPA encryption algorithm receiving as inputs the CPA public key and a sum of the second plaintext vector 142B and ENCODE receiving the proximity random number as an input. The second part of the second proximity ciphertext may include the second linearity encryption algorithm that receives as inputs the second linearity public key and the proximity random number.

In some embodiments, the proximity ciphertexts may be generated according to example proximity encryption expressions:

cxp1:=EncCPA(pkcpa,m1+ENCODE(r))
cxp2:=EncXLinear (pkxlin, X·r)
cxp:=(cxp1,cxp2)
cyp1:=EncCPA(pkcpa,m2+ENCODE(r))
cyp2:=EncYLinear (pkylin, X·r)
cyp:=(cyp1, cyp$^2$)

In the proximity encryption expression, ENCODE, m1, m2, pkcpa, pkxlin, and pkylin are as described above. The EncCPA represents the CPA encryption algorithm. The parameter cxp1 represents a first part of a first proximity ciphertext. The parameter cxp2 represents a second part of the first proximity ciphertext. The parameter cxp represents the first proximity ciphertext. The parameter cyp1 represents a first part of a second proximity ciphertext. The parameter cyp2 represents a second part of the second proximity ciphertext. The parameter cyp represents the second proximity ciphertext. The parameter EncXL/near represents a first linearity encryption algorithm. The parameter EncYLinear represents a second linearity encryption algorithm.

The first proximity ciphertext may be communicated to the authentication server 140 by the communication module 116, where it may be stored as the registration ciphertext 130. The second proximity public key may be used by the proximity encrypt/decrypt module 114 to encrypt the second plaintext vector 142B to generate a second proximity ciphertext. The second proximity ciphertext may be communicated to the authentication server 140 by the communication module 116. The proximity relational secret key may be used at the authentication server 140, in particular by the proximity authentication module 128, to detect the proximity between the second proximity ciphertext and the first proximity ciphertext, which is stored as the registration ciphertext 130.

The proximity authentication module 128 may be configured to detect proximity between the first proximity ciphertext and the second proximity ciphertext. To detect the proximity, the proximity authentication module 128 may access the DECODE, which may be available in public key information. The proximity authentication module 128 may also recover a randomness sum for the first proximity ciphertext. The randomness sum for the first proximity ciphertext may be defined as the DECODE that receives as input a CPA decryption algorithm that further receives as inputs the CPA secret key and a sum of the first part of the first proximity ciphertext and the CPA decryption algorithm that receives as inputs the CPA secret key and the first part of the second proximity ciphertext.

If the DECODE returns an error then the proximity authentication module 128 may return a rejection. Additionally, the proximity authentication module 128 may output the linearity verification algorithm that receives as inputs the linearity relational secret key, the first part of the second proximity ciphertext, the second part of the second proximity ciphertext, and the randomness sum.

Thus, the proximity verification algorithm may be defined to receive the first proximity ciphertext, the second proximity ciphertext, and the proximity secret key. The proximity verification algorithm may recover the randomness sum and output either a rejection or the linearity verification algorithm that receives as inputs the linearity relational secret key, the first part of the second proximity ciphertext, the second part of the second proximity ciphertext, and the randomness sum. For example, the proximity authentication module 128 may perform one more operations according to example proximity verification algorithms:

$$Z_{rs} := \text{DECODE}\bigl(DecCPA(skcpa, cx1) + DecCPA(skcpa, cy1)\bigr)$$

$$\text{Output} = \left\{ \begin{array}{l} \text{reject, if DECODE returns } \bot \\ VerifyLinear(skRlin, cx2, cy2, X \cdot Z) \end{array} \right\}$$

In the proximity verification algorithm, skcpa, cx1, cx2, cy1, cy2, ⊥, skRlin, X, and DECODE are as described above. The parameter Output indicates an output of the proximity authentication module 128. The parameter $Z_{rs}$, represents the randomness sum. The parameter DecCPA represents the CPA decryption algorithm. The VerifyLinear represents the linearity verification algorithm.

The relational proximity encryption scheme described herein may be secure if the following conditions are true:
  ECC is a (n, k,2δ) linear error correction scheme
  (KeyGenCPA, EncCPA, DecCPA) is a IND-CPA secure encryptionscheme
  (KeyGenLinear, EncXLinear, DecXLinear, EncYLinear, EncYLinear, VerifyLinear) is a relational encyption scheme for linearity in $F_2^k$ In the conditions, KeyGenCPA, EncCPA, DecCPA, KeyGenLinear, EncXLinear, DecXLinear, EncYLinear, DecYbear, Verifybear, and F are as described above. ECC represents the ECC. The parameter n represents the length, k represents the rank and 2δ represents the distance.

Figure 2:
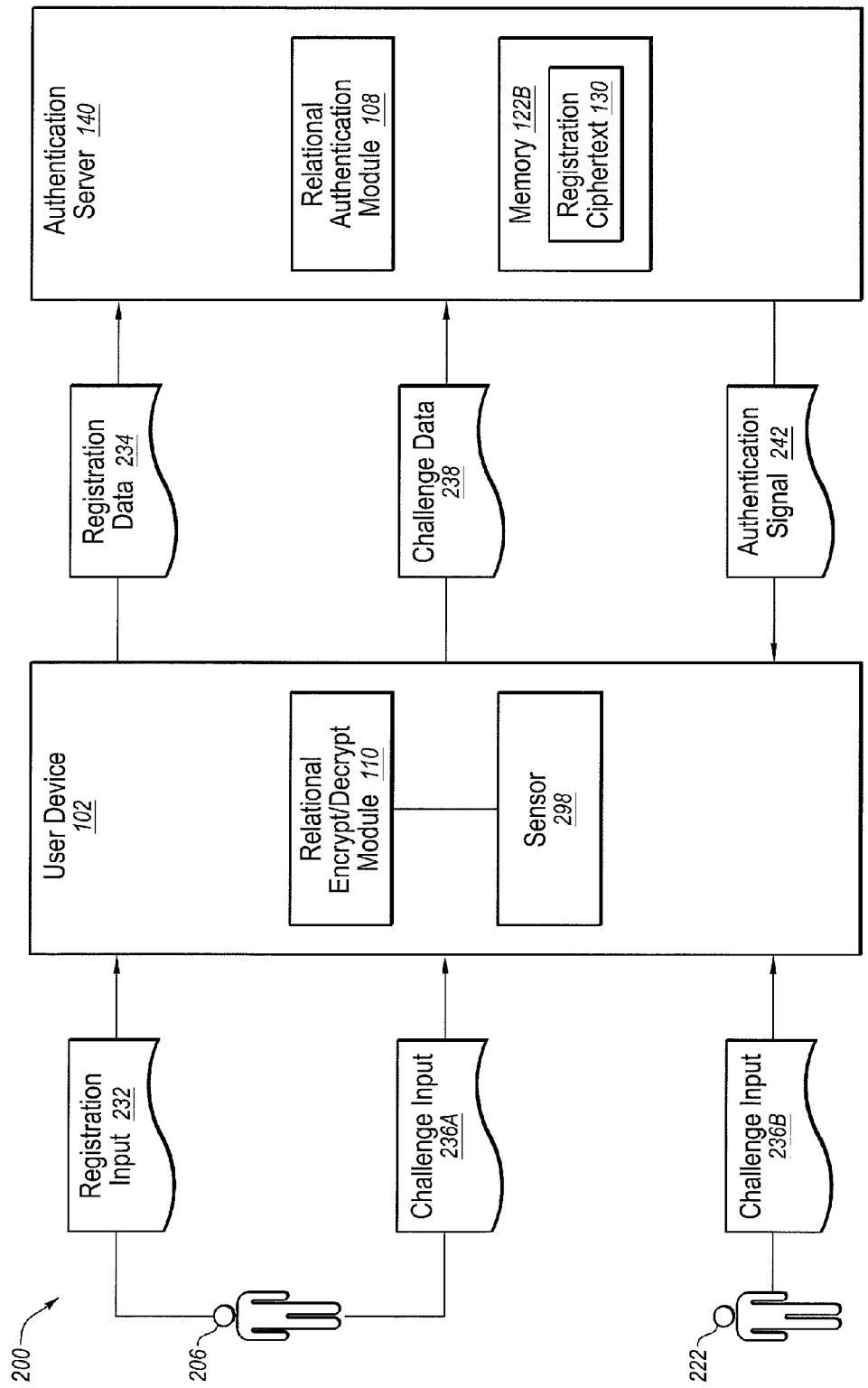
FIG. 2 is a block diagram of an example biometric authentication environment.

FIG. 2 illustrates a block diagram of a biometric authentication system (biometric system) 200, arranged in accordance with at least one embodiment described herein. The biometric system 200 may be included in or include an example of the operating environment 100 of FIG. 1 in which an authentication service is provided. In the biometric system 200 authentication of a user 206 may be performed by the authentication server 140. In the biometric system 200, the relational encryption discussed with reference to FIG. 1 may be used to authenticate the identity of the user 206.

The authentication service may include a registration process and an authentication process. The registration process may include obtaining information and data from the user 206 that may be used in the authentication process. The authentication process may occur later in time (e.g., subsequent to the registration process). In the authentication process, the identity of the user 206 may be authenticated using one or more of the relational encryption operations discussed with reference to FIG. 1. Generally, the identity of the user 206 may be authenticated by discovering linearity between a first linearity ciphertext and a second linearity ciphertext and detecting the proximity between a first proximity ciphertext and a second proximity ciphertext as described herein. The first linearity ciphertext and the first proximity ciphertext may be provided by the user 206 in the form of a first biometric template. The first biometric template may be included in the first plaintext vector 142A of FIG. 1 and/or the registration input 232 of FIG. 2.

The user 206 and/or an imposter 222 (discussed below) may include an individual that has one or more biometric characteristics. The biometric characteristics may include one or more unique features. For example, the biometric characteristics may include a fingerprint of the user 206 that includes patterns of ridges and/or furrows. The user 206 may be associated with the user device 102 in some embodiments. For example, the user 206 may own or regularly operate the user device 102. In some embodiments, the user 206 may not be specifically associated with the user device 102. For example, the user device 102 may be publicly accessible to multiple users including the user 206. In some embodiments, the imposter 222 may include an entity that supplies input that may represent biometric characteristics.

In some embodiments, the user device 102 may include a sensor 298. The sensor 298 may include a hardware device, for instance, that is configured to measure or otherwise capture a biometric characteristic used to authenticate the user 206. When the biometric characteristic of the user 206 is measured or otherwise captured, the user device 102 may generate the biometric template. The biometric template may be representative of the biometric characteristic and may include at least some of the unique features of the biometric characteristic of the user 206. The biometric template may include a graphical representation and/or algorithmic representation of the biometric characteristic, for example.

Some examples of the sensor 298 may include: a fingerprint scanner; a camera configured to capture an image of an iris; a device configured to measure DNA; a heart rate monitor configured to capture heart rate; a wearable electromyography sensor configured to capture electrical activity produced by skeletal muscles; or any other sensor 298 configured to measure or otherwise capture a biometric characteristic.

In the illustrated biometric system 200, the sensor 298 is included in the user device 102. In other embodiments, the sensor 298 may be communicatively coupled to the user device 102 or a processor included therein. For example, the sensor 298 may be configured to communicate a signal to the user device 102 via a network such as the network 107 of FIG. 1. Although only one sensor 298 is depicted in FIG. 2, in some embodiments the user device 102 may include one or more sensors 298.

The enc/dec module 110 may generate the first linearity ciphertext and the first proximity ciphertext from the registration input 232. The enc/dec module 110 may then communicate the first linearity ciphertext and the first proximity ciphertext as registration data 234 to the authentication server 140.

The relational authentication module 108 may store the first linearity ciphertext and the first proximity ciphertext as the registration ciphertext 130. The registration ciphertext 130 may be associated with the user 206. For example, the user 206 may have associated therewith a user identifier. The registration ciphertext 130 may be stored in the memory 122B in some embodiments.

The enc/dec module 110 may then receive a first challenge input 236A or a second challenge input 236B (generally, challenge input 236). The first challenge input 236A and the second challenge input 236B may be an attempt by the user 206 or the imposter 222 to have their identity authenticated. The first challenge input 236A and/or the second challenge input 236B may include a second biometric template read by the sensor 298, for instance. The second biometric template may be representative of the unique features of the biometric characteristic of the user 206 or the imposter 222.

The enc/dec module 110 may generate the second linearity ciphertext and the second proximity ciphertext from the challenge input 236. The enc/dec module 110 may then communicate the second linearity ciphertext and the second proximity ciphertext as challenge data 238 to the authentication server 140.

The relational authentication module 108 may receive the challenge data 238. The relational authentication module 108 may then retrieve the registration ciphertext 130 for the user 206.

The relational authentication module 108 may determine a linearity relationship between the first linearity ciphertext stored as the registration ciphertext 130 and the second linearity ciphertext received from the user device 102. Additionally, the relational authentication module 108 may determine a proximity relationship between the first proximity ciphertext stored as the registration ciphertext 130 and the second proximity ciphertext received from the user device 102.

In response to the first linearity ciphertext having a linearity relationship with the second linearity ciphertext and there being a particular proximity between the first proximity ciphertext and the second proximity ciphertext, the authentication server 140 may determine that an approximate similarity exists between the first biometric template and the second biometric template.

Thus, if the first challenge input 236A that is provided by the user 206 is the basis of the second linearity ciphertext and the second proximity ciphertext, then there may be a linearity relationship between the first linearity ciphertext and the second linearity ciphertext and there may be a proximity between the first proximity ciphertext and the second proximity ciphertext.

However, if the second challenge input 236B that is provided by the imposter 222 is the basis of the second linearity ciphertext and second proximity ciphertext, then there may not be a linearity relationship between the first linearity ciphertext and the second linearity ciphertext and there may not be a proximity between the first proximity ciphertext and the second proximity ciphertext.

Based on the linear relation and/or the proximity, the relational authentication module 108 may make an authentication decision. For example, the relational authentication module 108 may determine whether the challenge data 238 originates at the user 206 or the imposter 222. The relational authentication module 108 may communicate an authentication signal 242 based on discovery of the linearity relationship and/or detection of the proximity. The enc/dec module 110 may receive the authentication signal 242.

Modifications, additions, or omissions may be made to the biometric system 200 without departing from the scope of the present disclosure. Specifically, embodiments depicted in FIG. 2 include one user 206, one user device 102, and one authentication server 140. However, the present disclosure applies to the biometric system 200 that may include one or more users 206, one or more user devices 102, one or more authentication servers 140, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments, the enc/dec module 110 and/or one or more functionalities attributed thereto may be performed by a module on the authentication server 140.

The relational authentication module 108 and/or the enc/dec module 110 may include code and routines for biometric authentication. In some embodiments, the relational authentication module 108 and/or the enc/dec module 110 may act in part as a thin-client application that may be stored on the user device 102 or another computing device, and in part as components that may be stored on the authentication server 140, for instance. In some embodiments, the relational authentication module 108 and/or the enc/dec module 110 may be implemented using hardware including a field-programmable gate array (FPGA) or an application-specific integrated circuit (ASIC). In some other instances, the relational authentication module 108 and/or the enc/dec module 110 may be implemented using a combination of hardware and software.

Figure 3:
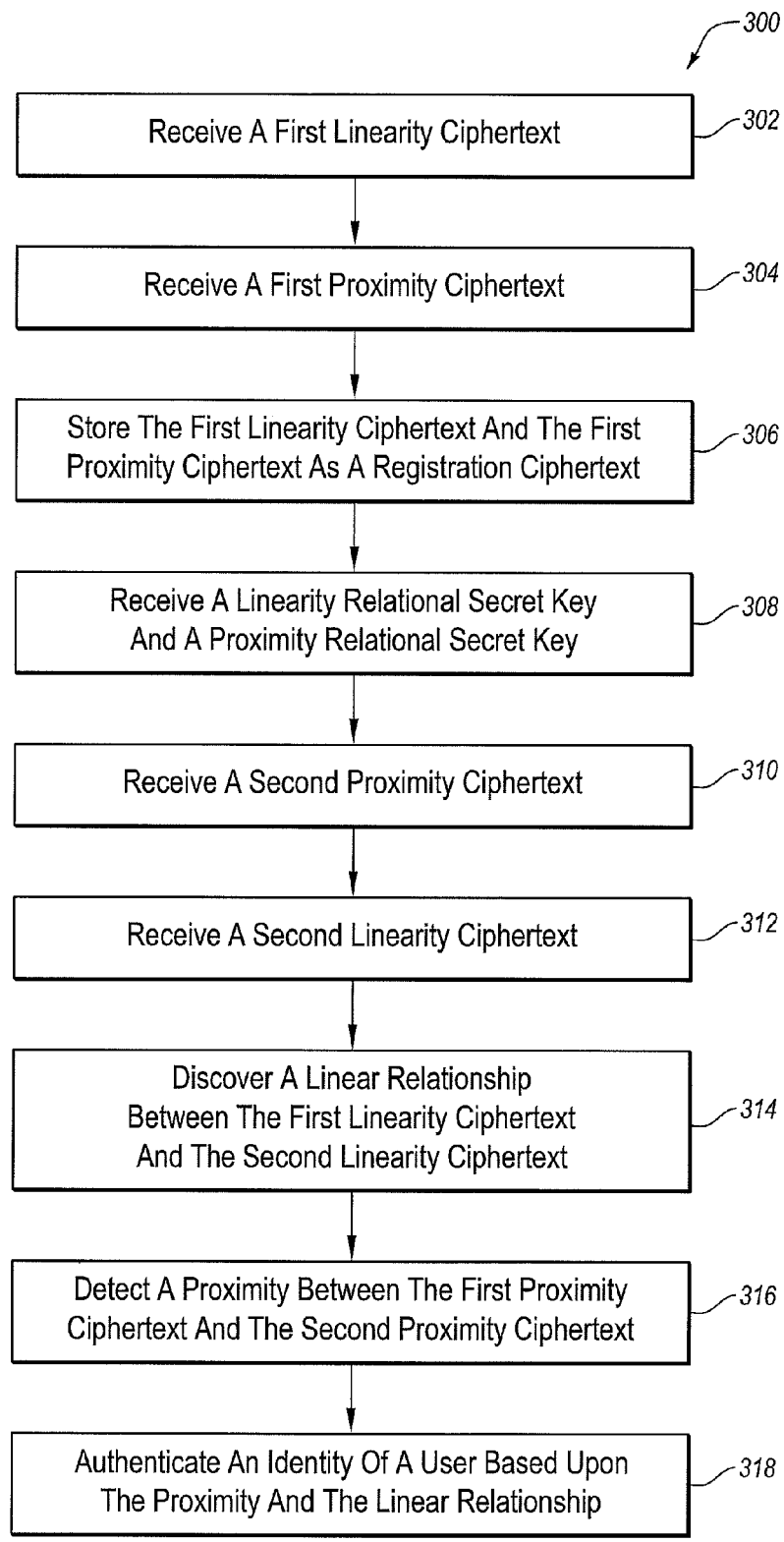
FIG. 3 is a flow diagram of an example method of biometric authentication.

FIG. 3 is a flow diagram of an example method 300 of biometric authentication, arranged in accordance with at least one embodiment described herein. The method 300 may be performed in a biometric authentication system such as may be implemented in the biometric system 200 of FIG. 2 or in the operating environment 100 of FIG. 1. The method 300 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 300. Additionally or alternatively, the authentication server 140 may include a processor (e.g., the processor 124B of FIG. 1) that is configured to execute computer instructions to perform or control performance of the method 300. Although illustrated as discrete blocks, various blocks may be divided into additional blocks, combined into fewer blocks, or eliminated, depending on the desired implementation.

The method 300 may begin at block 302. At block 302, a first linearity ciphertext may be received. The first linearity ciphertext may represent a first biometric template encrypted using a relational linearity encryption scheme. At block 304, a first proximity ciphertext may be received. The first proximity ciphertext may represent the first biometric template encrypted using a relational proximity encryption scheme.

At block 306, the first linearity ciphertext and the first proximity ciphertext may be stored as a registration ciphertext. At block 308, a linearity relational secret key and a proximity relational secret key may be received. At block 310, a second proximity ciphertext may be received. The second proximity ciphertext may represent a second biometric template encrypted using the relational proximity encryption scheme. At block 312, a second linearity ciphertext may be received. The second linearity ciphertext may represent the second biometric template encrypted using the relational linearity encryption scheme.

At block 314, a linearity relationship between the first linearity ciphertext and the second linearity ciphertext may be discovered using a linearity relational secret key. At block 316, a proximity between the first proximity ciphertext and the second proximity ciphertext may be detected using a proximity relational secret key. The proximity may be determined in terms of a Hamming distance. At block 318, an identity of a user may be authenticated based upon the proximity and the linearity relationship.

For any of the procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 4A:
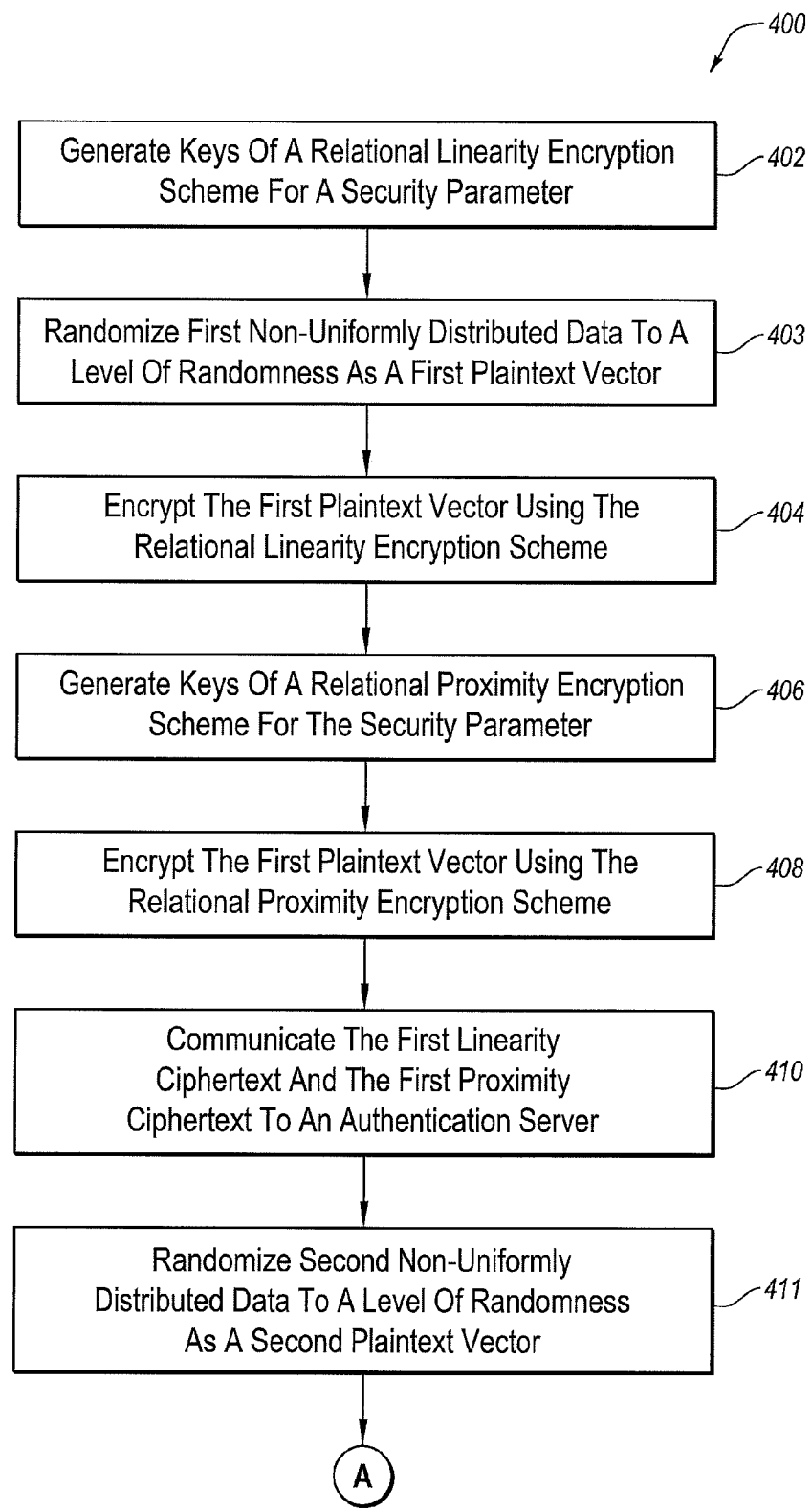
FIGS. 4A and 4B are a flow diagram of an example method of relational encryption.
Figure 4B:
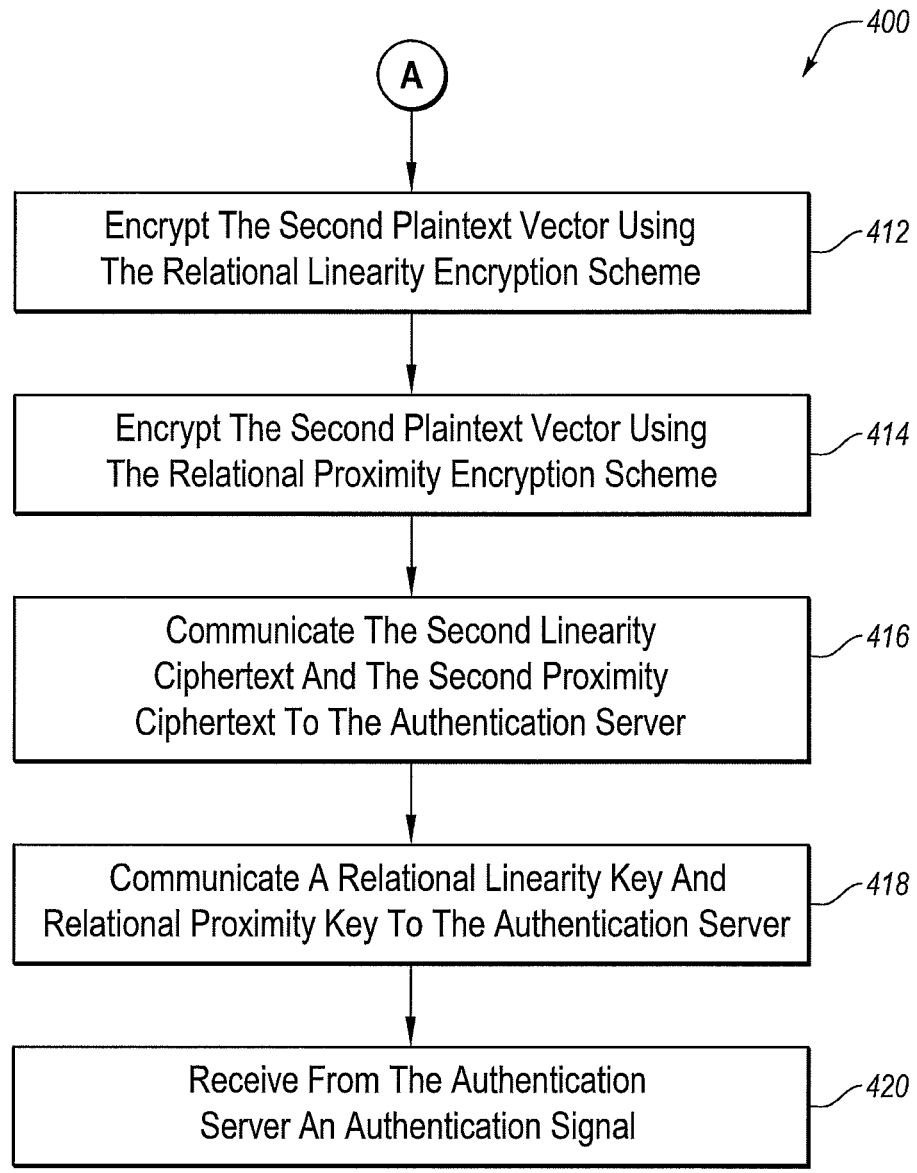

FIGS. 4A and 4B are a flow diagram of an example method 400 of relational encryption, arranged in accordance with at least one embodiment described herein. The method 400 may be performed in a biometric authentication system such as may be implemented in the biometric system 200 of FIG. 2 or in the operating environment 100 of FIG. 1. The method 400 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 400. Additionally or alternatively, the user device 102 may include a processor (e.g., the processor 124A of FIG. 1) that is configured to execute computer instructions to perform or control performance of the method 400. Although illustrated as discrete blocks, various blocks may be divided into additional blocks, combined into fewer blocks, or eliminated, depending on the desired implementation.

With reference to FIG. 4A, the method 400 may begin at block 402. At block 402, keys of a relational linearity encryption scheme may be generated. The keys of the relational linearity encryption scheme may be generated for a security parameter. At block 403, first non-uniformly distributed data may be randomized to an appropriate level of randomness as a first plaintext vector. The non-uniformly distributed data may be biometric data. The appropriate level of randomness is described in greater detail below. At block 404, the first plaintext vector may be encrypted using the relational linearity encryption scheme. Encrypting the first plaintext vector may generate a first linearity ciphertext representative of the first plaintext vector. At block 406, keys of a relational proximity encryption scheme may be generated. The keys of the relational proximity encryption scheme may be generated for the security parameter. At block 408, the first plaintext vector may be encrypted using the relational proximity encryption scheme. Encrypting the first plaintext vector using the relational proximity encryption scheme may generate a first proximity ciphertext representative of the first plaintext vector. At block 410, the first linearity ciphertext and the first proximity ciphertext may be communicated to an authentication server.

At block 411, second non-uniformly distributed data may be randomized to the appropriate level of randomness as a second plaintext vector. The non-uniformly distributed data may be biometric data. The appropriate level of randomness is described in greater detail below. At block 412, the second plaintext vector may be encrypted using the relational linearity encryption scheme. Encrypting the second plaintext vector may generate a second linearity ciphertext representative of the second plaintext vector. With reference to FIG. 4B, at block 414, the second plaintext vector may be encrypted using the relational proximity encryption scheme. Encrypting the second plaintext vector using the relational proximity encryption scheme may generate a second proximity ciphertext. At block 416, the second linearity ciphertext and the second proximity ciphertext may be communicated to the authentication server. At block 418, the keys of the relational linearity encryption scheme generated at block 402 may be communicated to the authentication server. The keys may include a relational linearity key and a relational proximity key.

At block 420, an authentication signal may be received from the authentication server. The authentication signal may be indicative of a linearity relationship between the first linearity ciphertext and the second linearity ciphertext discovered using the relational linearity key and of a proximity between the first proximity ciphertext and the second proximity ciphertext detected using the relational proximity key. In some embodiments, the first plaintext vector may include a first biometric template received as registration input from a user. Additionally, the second plaintext vector may include a second biometric template received as challenge input. In these and other embodiments, the authentication signal may indicate whether the second biometric template originated at the user.

Figure 5:
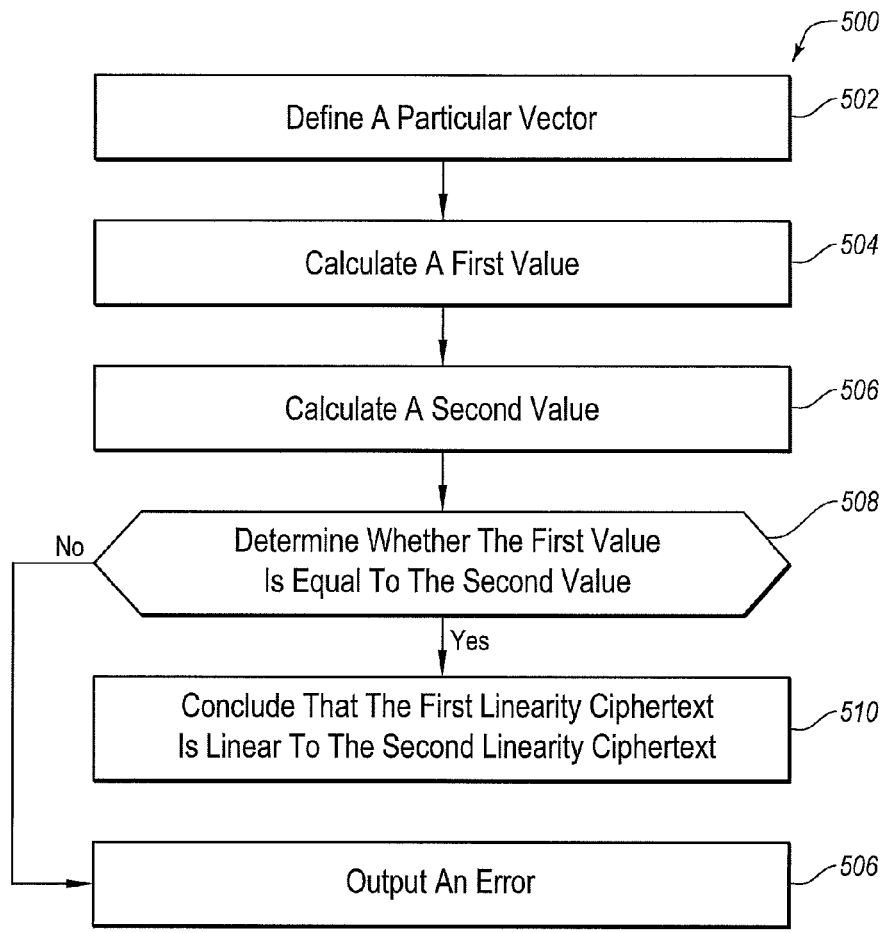
FIG. 5 is a flow diagram of an example method of discovering a linearity relationship in a relational encryption scheme.

FIG. 5 is a flow diagram of an example method 500 of discovering a linearity relationship in a relational encryption scheme, arranged in accordance with at least one embodiment described herein. The method 500 may be performed in a biometric authentication system such as may be implemented in the biometric system 200 of FIG. 2 or in the operating environment 100 of FIG. 1. The method 500 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 500. Additionally or alternatively, the authentication server 140 may include a processor (e.g., the processor 124B of FIG. 1) that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 502. At block 502, a particular vector may be defined. The particular vector may include a member of a first field. The first field may include elements of zero and one and a dimension of a particular number that is a length of linearity secret keys. Additionally or alternatively, the particular vector may include a member of a second field. The second field may include elements of zero to one less than a base-number and a dimension of the particular number.

At block 504, a first value may be calculated. The first value may be calculated as a pairing function of a first element of a first linearity ciphertext and a first element of a second linearity ciphertext raised to the power of a linearity relational secret key. At block 506, a second value may be calculated. In some embodiments, the second value may be a product of the pairing function of each element of the first linearity ciphertext and a corresponding element of the second linearity ciphertext raised to the power of negative one raised to the power of a corresponding element of the particular vector. In some embodiments, the second value may be calculated as a product of the pairing function of each element of the first linearity ciphertext and a corresponding element in the second linearity ciphertext raised to the power of an arbitrary generator raised to the power of a product of negative one and a corresponding element of the particular vector. The arbitrary generator may be selected from a subgroup of a set of integers with zero omitted.

At block 508, it may be determined whether the first value is equal to the second value. In response to the first value being equal to the second value ("Yes" at block 508), the method 500 may proceed to block 510. At block 510, it may be concluded that the first linearity ciphertext is linear to the second linearity ciphertext. In response to the first value not equaling the second value ("No" at block 518), the method 500 may proceed to block 512. At block 512, an error may be output, which may indicate that the first linearity ciphertext is not linear to the second linearity ciphertext.

Figure 6:
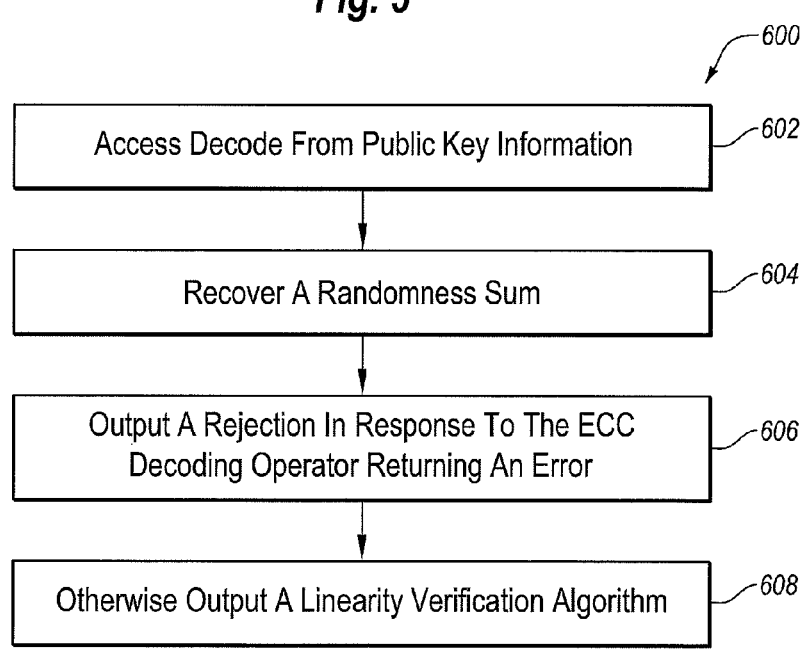
FIG. 6 is a flow diagram of an example method of detecting a proximity in a relational encryption scheme.

FIG. 6 is a flow diagram of an example method 600 of detecting a proximity, arranged in accordance with at least one embodiment described herein. The method 600 may be performed in a biometric authentication system such as may be implemented in the biometric system 200 of FIG. 2 or in the operating environment 100 of FIG. 1. The method 600 may be programmably performed in some embodiments by the authentication server 140 described herein. The authentication server 140 may include or may be communicatively coupled to a non-transitory computer-readable medium (e.g., the memory 122B of FIG. 1) having stored thereon or encoded therein programming code or instructions that are executable by a processor to perform or control performance of the method 600. Additionally or alternatively, the authentication server 140 may include a processor (e.g., the processor 124B of FIG. 1) that is configured to execute computer instructions to perform or control performance of the method 600. Although illustrated as discrete blocks, various blocks may be divided into additional blocks, combined into fewer blocks, or eliminated, depending on the desired implementation.

The method 600 may begin at block 602. At block 602, a DECODE may be accessed from public key information. At block 604, a randomness sum may be recovered. The randomness sum may be received for a first proximity ciphertext. The randomness sum for the first proximity ciphertext may be defined as the DECODE that receives as input a CPA decryption algorithm that further receives as inputs (a) a CPA secret key and (b) a sum of a first part of the first proximity ciphertext and a CPA decryption algorithm that receives as inputs a CPA secret key and a first part of a second proximity ciphertext.

At block 606, a rejection may be output in response to the DECODE returning an error. At block 608, a linearity verification algorithm may otherwise be output. The linearity verification algorithm may receive as inputs a linearity relational secret key, the first part of the second proximity ciphertext, the second part of the second proximity ciphertext, and the randomness sum.

Figure 7:
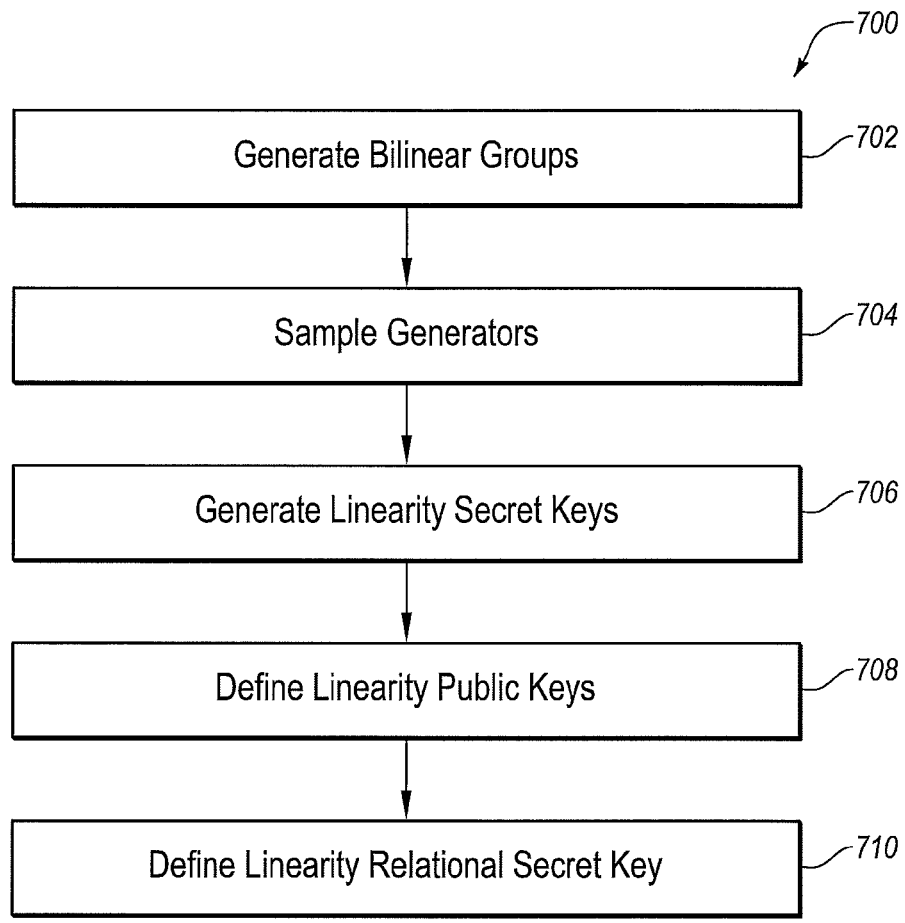
FIG. 7 is a flow diagram of an example method of key generation of a relational linearity encryption scheme.

FIG. 7 is a flow diagram of an example method 700 of key generation of a relational linearity encryption scheme, arranged in accordance with at least one embodiment described herein. The method 700 may be performed in a biometric authentication system such as may be implemented in the biometric system 200 of FIG. 2 or in the operating environment 100 of FIG. 1. The method 700 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 700. Additionally or alternatively, the user device 102 may include a processor (e.g., the processor 124A of FIG. 1) that is configured to execute computer instructions to perform or control performance of the method 700. Although illustrated as discrete blocks, various blocks may be divided into additional blocks, combined into fewer blocks, or eliminated, depending on the desired implementation.

The method 700 may begin at block 702. At block 702, bilinear groups may be generated. In some embodiments, the bilinear groups may be of a prime order. The prime order may be exponential in a security parameter. Additionally or alternatively, the prime order or may be exponential in the security parameter and equal to one module a base-number (p). For example, in embodiments in which a plaintext vector includes bit vectors, the prime order may be exponential in the security parameter. In embodiments in which the plaintext vectors include p-ary vectors, the prime order may be exponential in the security parameter and equal to one module the base-number (p).

At block 704, generators may be sampled. For example, a first generator may be sampled from a first bilinear group and a second generator may be sampled from a second bilinear group. At block 706, linearity secret keys may be generated. For example, a first linearity secret key and a second linearity secret key may be generated by randomly sampling a particular number of elements from a set of integers. The set of integers may include zero to one less than the prime order.

At block 708, linearity public keys may be defined. For example, a first linearity public key may include an element that is the first generator and one or more other elements that are the first generator raised to the power of a corresponding element of the first linearity secret key. In some embodiments, the first linearity public key may further include an arbitrary generator. The arbitrary generator may be selected from a subgroup of the set of integers with zero omitted. Additionally, a second linearity public key may be defined. The second linearity public key may include an element that is the second generator and one or more other elements that are the second generator raised to the power of a corresponding element of the second linearity secret key. In some embodiments, the second linearity public key may further include an element that is the arbitrary generator.

At block 710, a linearity relational secret key may be defined. Each element of the linearity relational secret key may include a sum of a corresponding element of the second linearity secret key and a corresponding element of the first linearity secret key.

Figure 8:
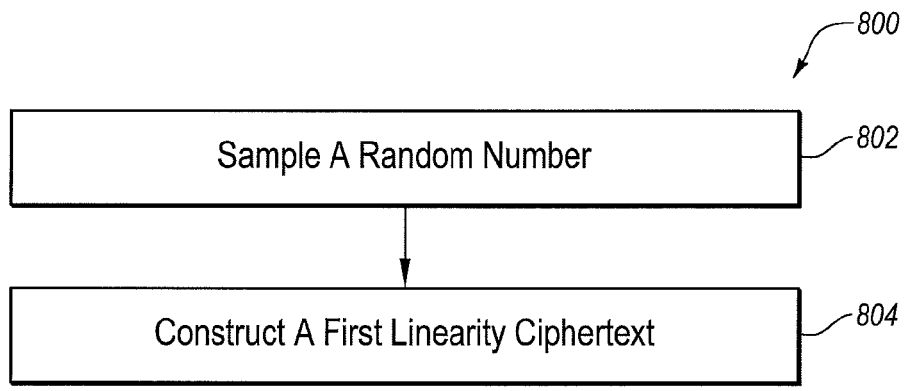
FIG. 8 is a flow diagram of an example method of encrypting a first plaintext vector using a relational linearity encryption scheme.

FIG. 8 is a flow diagram of an example method 800 of encrypting a first plaintext vector using a relational linearity encryption scheme, arranged in accordance with at least one embodiment described herein. The method 800 may be performed in a biometric authentication system such as may be implemented in the biometric system 200 of FIG. 2 or in the operating environment 100 of FIG. 1. The method 800 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 800. Additionally or alternatively, the user device 102 may include a processor (e.g., the processor 124A of FIG. 1) that is configured to execute computer instructions to perform or control performance of the method 800. Although illustrated as discrete blocks, various blocks may be divided into additional blocks, combined into fewer blocks, or eliminated, depending on the desired implementation.

The method 800 may begin at block 802. At block 802, a random number may be a sampled. The random number may be sampled from a set of integers. At block 804, a first linearity ciphertext may be constructed. A first element of the first linearity ciphertext may be a first generator raised to the power of the random number. Additionally, one or more other elements of the first linearity ciphertext may include a corresponding element of a first linearity public key raised to a linearity encryption power. In some embodiments, the linearity encryption power includes a product of the random number and negative one raised to the power of a corresponding element of the first plaintext vector. In some embodiments, the linearity encryption power includes a product of the random number and an arbitrary generator raised to the power of a corresponding element of the first plaintext vector.

Figure 9:
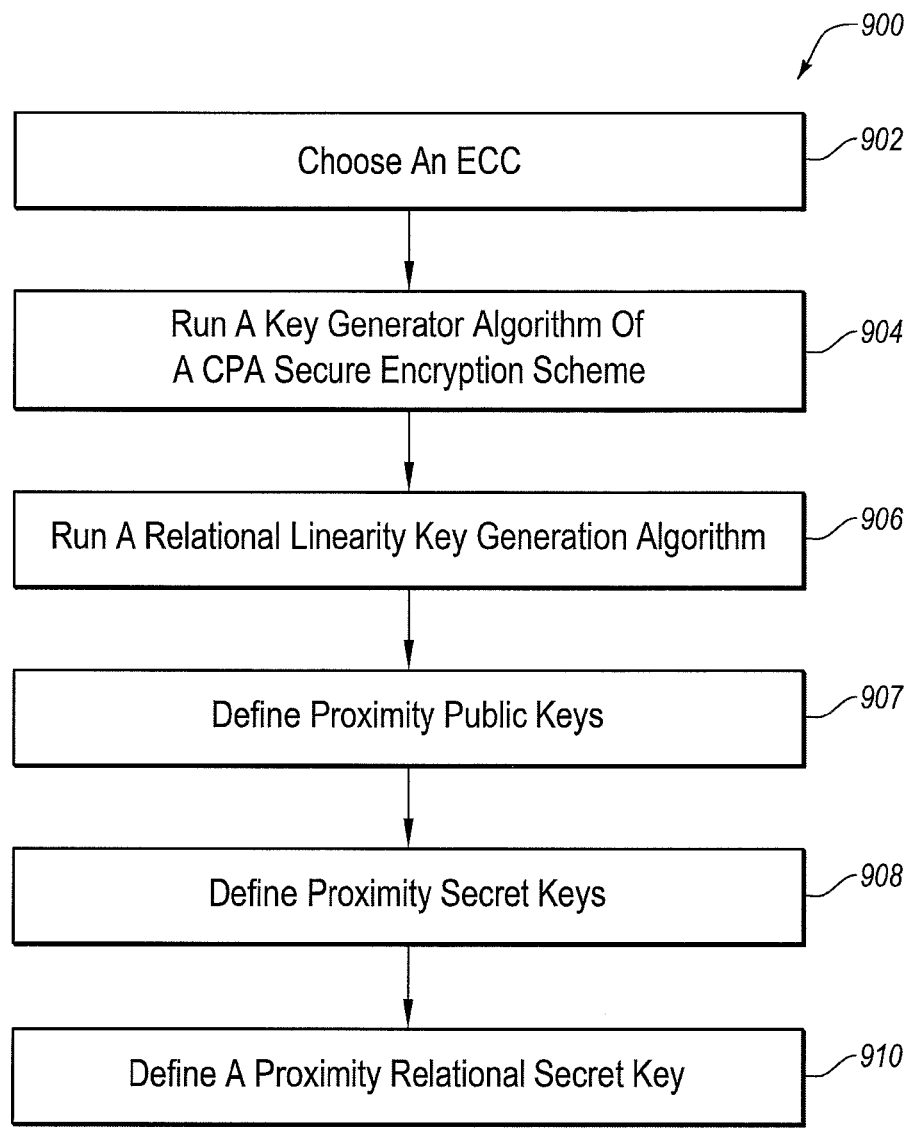
FIG. 9 is a flow diagram of an example method of generating keys of a relational proximity encryption scheme.

FIG. 9 is a flow diagram of an example method 900 of generating keys of a relational proximity encryption scheme, arranged in accordance with at least one embodiment described herein. The method 900 may be performed in a biometric authentication system such as may be implemented in the biometric system 200 of FIG. 2 or in the operating environment 100 of FIG. 1. The method 400 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 900. Additionally or alternatively, the user device 102 may include a processor (e.g., the processor 124A of FIG. 1) that is configured to execute computer instructions to perform or control performance of the method 900. Although illustrated as discrete blocks, various blocks may be divided into additional blocks, combined into fewer blocks, or eliminated, depending on the desired implementation.

The method 900 may begin at block 902. At block 902, an ECC may be chosen. The ECC may include a length, a rank in a same order of a security parameter, and a selected minimum distance. At block 904, a key generator algorithm of a CPA secure encryption scheme may be run. The CPA secure encryption scheme may output a CPA public key and a CPA secret key. At block 906, a relational linearity key generation algorithm may be run. The relational linearity key generation algorithm may output a first linear public key, a second linear public key, a first linear secret key, a second linear secret key, and a relational linear secret key.

At block 907, proximity public keys may be defined. For example, a first proximity public key may be defined based on an ENCODE, a DECODE, the CPA public key, and the first linear public key. Additionally, a second proximity public key may be defined based on the ENCODE, the DECODE, the CPA public key, and the second linear public key. At block 908, proximity secret keys may be defined. For example, a first proximity secret key may be defined based on the CPA secret key and the first linear secret key. In addition, a second proximity secret key may be defined based on the CPA secret key and the second linear secret key. At block 910, a proximity relational secret key may be defined. For example, the proximity relational secret key may be defined based on the CPA secret key and the relational linear secret key.

Figure 10:
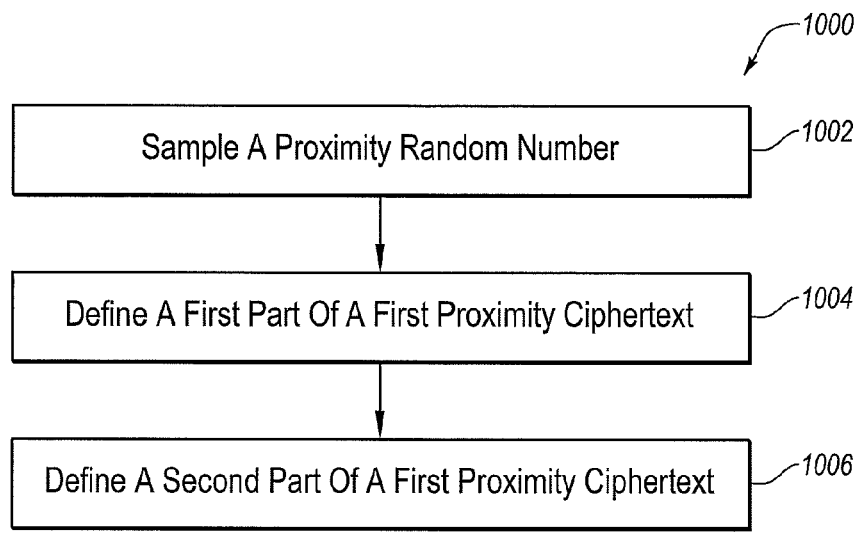
FIG. 10 is a flow diagram of an example method of encrypting a first plaintext vector using a relational proximity encryption scheme.

FIG. 10 is a flow diagram of an example method 1000 of encrypting a first plaintext vector using the relational proximity encryption scheme, arranged in accordance with at least one embodiment described herein. The method 1000 may be performed in a biometric authentication system such as may be implemented in the biometric system 200 of FIG. 2 or in the operating environment 100 of FIG. 1. The method 1000 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1000. Additionally or alternatively, the user device 102 may include a processor (e.g., the processor 124A of FIG. 1) that is configured to execute computer instructions to perform or control performance of the method 1000. Although illustrated as discrete blocks, various blocks may be divided into additional blocks, combined into fewer blocks, or eliminated, depending on the desired implementation.

The method 1000 may begin at block 1002. At block 1002, a proximity random number may be sampled. The proximity random number may be sampled from a third field. The third field may include a base-number and a dimension that is a rank of an ECC. At block 1004, a first part of a first proximity ciphertext may be defined. The first part may be defined as a CPA encryption algorithm that receives as inputs a CPA public key and a sum of a first plaintext vector and an ENCODE receiving the proximity random number as an input.

At block 1006, a second part of the first proximity ciphertext may be defined. The second part may be defined as a first linearity encryption algorithm that receives a first linearity public key and the proximity random number as inputs.

Figure 11:
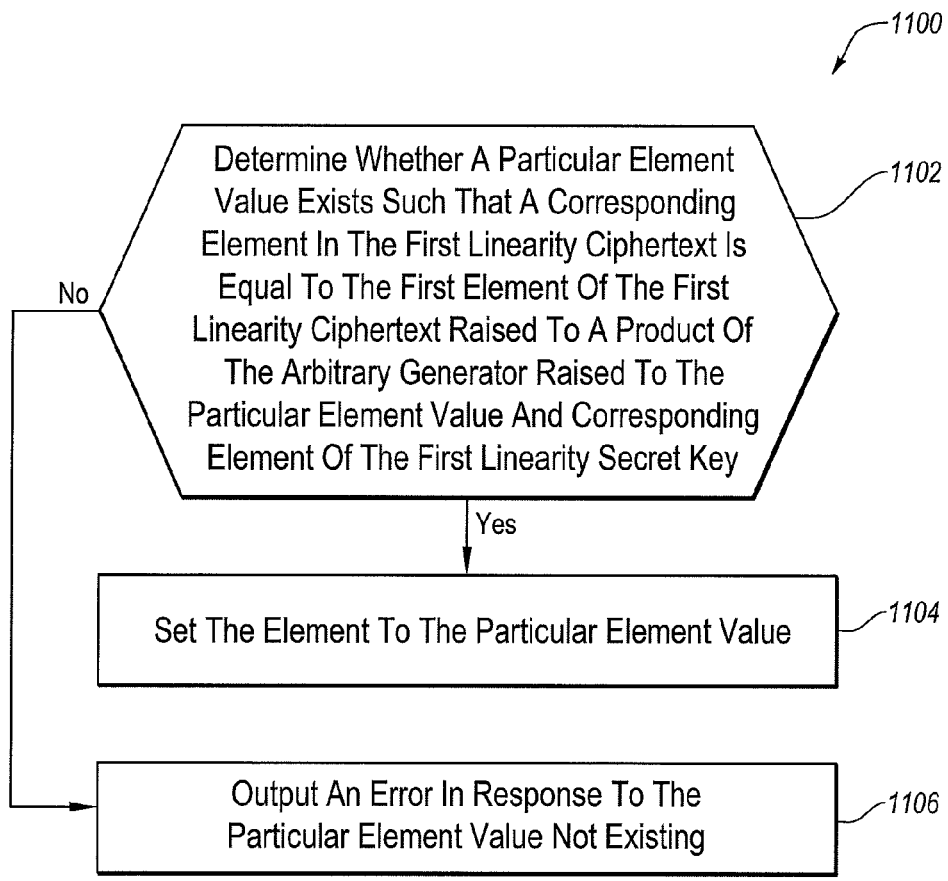
FIG. 11 is a flow diagram of an example method of decrypting a first linearity ciphertext.

FIG. 11 is a flow diagram of an example method 1100 of decrypting a first linearity ciphertext, arranged in accordance with at least one embodiment described herein. The method 1100 may be performed in a biometric authentication system such as may be implemented in the biometric system 200 of FIG. 2 or in the operating environment 100 of FIG. 1. The method 1100 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1100. Additionally or alternatively, the user device 102 may include a processor (e.g., the processor 124A of FIG. 1) that is configured to execute computer instructions to perform or control performance of the method 1100. Although illustrated as discrete blocks, various blocks may be divided into additional blocks, combined into fewer blocks, or eliminated, depending on the desired implementation.

The method 1100 may begin at block 1102. At block 1102, it may be determined whether a particular element value exists such that a corresponding element in a first linearity ciphertext is equal to a first element of the first linearity ciphertext raised to a product of an arbitrary generator raised to the particular element value and a corresponding element of a first linearity secret key. In response to the particular element value existing ("Yes" at block 1102), the element may be set to the particular element value. In response to the particular element not existing ("No" at block 1102), an error may be output.

Figure 12:
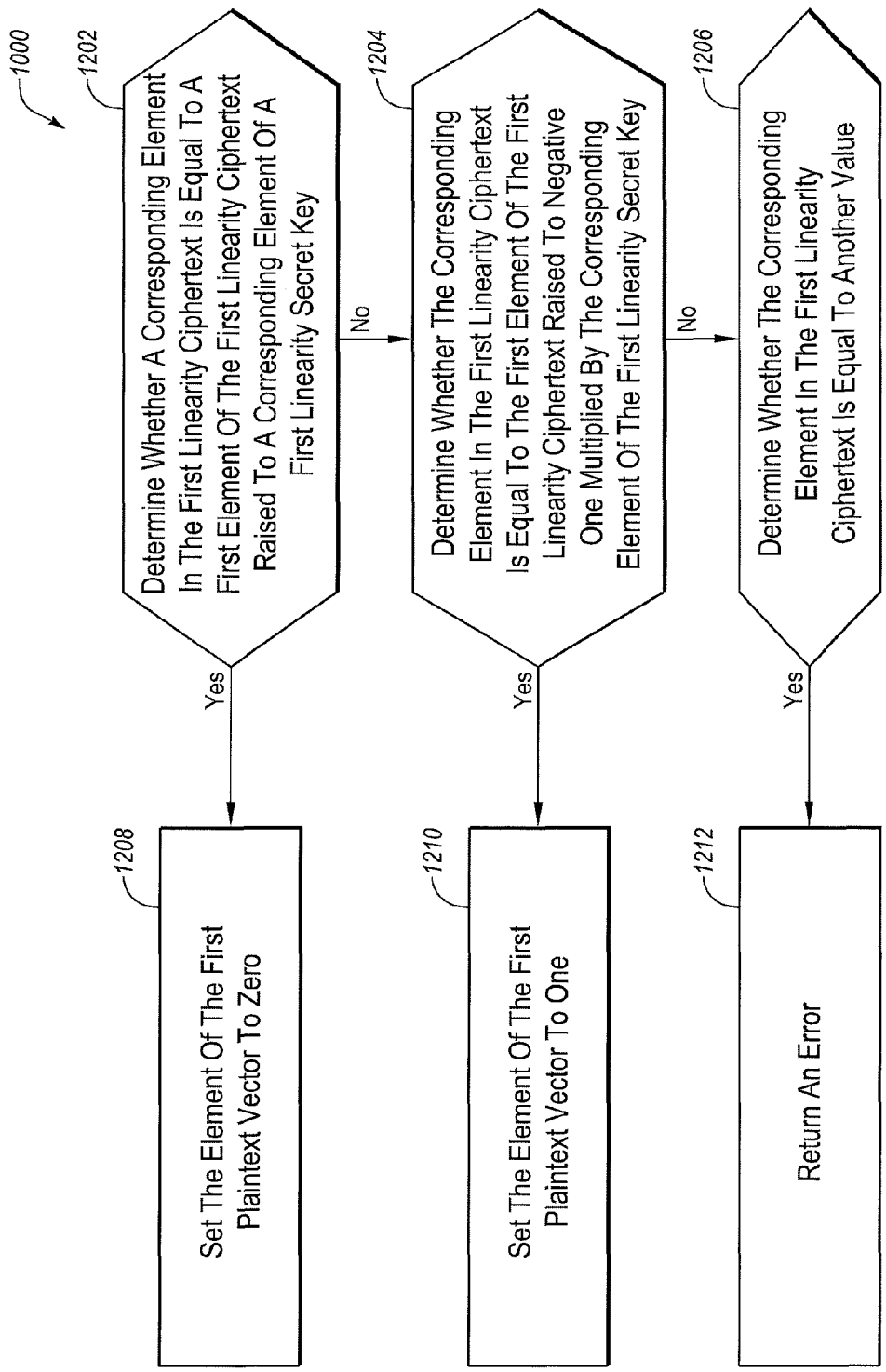
FIG. 12 is a flow diagram of another example method of decrypting a first linearity ciphertext.

FIG. 12 is a flow diagram of another example method 1200 of decrypting a first linearity ciphertext, arranged in accordance with at least one embodiment described herein. The method 1200 may be performed in a biometric authentication system such as may be implemented in the biometric system 200 of FIG. 2 or in the operating environment 100 of FIG. 1. The method 1200 may be programmably performed in some embodiments by the user device 102 described herein. The user device 102 may include or may be communicatively coupled to a non-transitory computer-readable medium (e.g., the memory 122A of FIG. 1) having stored thereon or encoded therein programming code or instructions that are executable by a processor to perform or control performance of the method 1200. Additionally or alternatively, the user device 102 may include a processor (e.g., the processor 124A of FIG. 1) that is configured to execute computer instructions to perform or control performance of the method 1200. Although illustrated as discrete blocks, various blocks may be divided into additional blocks, combined into fewer blocks, or eliminated, depending on the desired implementation.

The method 1200 may begin at block 1202. At block 1202, it may be determined whether a corresponding element in a first linearity ciphertext is equal to a first element of a first linearity ciphertext raised to a corresponding element of a first linearity secret key. In response to the corresponding element in the first linearity ciphertext being equal to the first element of the first linearity ciphertext raised to the corresponding element of a first linearity secret key ("Yes" at block 1202), the method 1200 may proceed to block 1208. At block 1208, the element of the first plaintext vector may be set to zero.

In response to the corresponding element in the first linearity ciphertext not being equal to the first element of the first linearity ciphertext raised to the corresponding element of the first linearity secret key ("No" at block 1202), the method 1200 may proceed to block 1204. At block 1204, it may be determined whether the corresponding element in the first linearity ciphertext is equal to the first element of the first linearity ciphertext raised to negative one multiplied by the corresponding element of the first linearity secret key. In response to the corresponding element in the first linearity ciphertext being equal to the first element of the first linearity ciphertext raised to negative one multiplied by the corresponding element of the first linearity secret key ("Yes" at block 1204), the method 1200 may proceed to block 1210. At block 1210, the element of the first plaintext vector may be set to one. In response to the corresponding element in the first linearity ciphertext not being equal to the first element of the first linearity ciphertext raised to negative one multiplied by the corresponding element of the first linearity secret key ("No" at block 1204), the method may proceed to block 1206. At block 1206, it may be determined whether the corresponding element in the first linearity ciphertext is equal to another value. In response to the corresponding element in the first linearity ciphertext being equal to another value ("Yes" at block 1206), the method 1200 may proceed to block 1212. At block 1212, an error may be returned.

Non-Uniformly Distributed Data

In some embodiments, the present disclosure may also provide relational encryption for underlying data, such as biometric data, which may not be uniformly random. The underlying data may be non-uniformly distributed and/or may have correlations. By way of non-limiting example, a larger subset of the population in the United States may have brown eyes compared to blue eyes, or in other words, the eye color may be non-uniformly distributed across the population. In like manner, an individual with blue eyes may be more likely to have light colored hair than dark colored hair, or in other words, there may exist a correlation between blue eyes and light colored hair. Because of the lack of randomness (including correlations) in biometric data, the present disclosure may include provision to effectively randomize underlying biometric data prior to using the relational encryption scheme described in the present disclosure.

The appropriate level of randomness may depend on a number of characteristics of the data, including entropy of the data, noise threshold, domain of the data, etc. For convenience in describing these characteristics, the example of the biometric characteristic of fingerprints will be used, but any underlying data may be used, including non-biometric data. In some embodiments, the appropriate level of randomness may be achieved by the dot product of X and r, or the dot product of the underlying data r and the matrix X. The matrix X may be a strong linear extractor as known in the art. The characteristics may be inputs in deriving the matrix X. In some embodiments the linear extractor may be used to reduce the original size of the data to one fourth the original size to randomize the data to an appropriate level. The appropriate level of randomness may be dependent on the security parameter $\lambda$. For example, if the security parameter indicates that eighty bits of security are needed, the level of randomness may need eighty bits of randomized data after processing using a strong linear extractor on the raw data. As another example, if the security parameter indicates that one hundred and twenty eight bits of security are needed, the level of randomness may need one hundred and twenty eight bits of randomized data after processing using a strong linear extractor on the raw data.

The characteristic of entropy of the data may refer to the overall variability or randomness inherent in the data itself. By way of example, fingerprints have a certain amount of variability or randomness inherent in the distribution of fingerprints in the human population, which may be referred to as the entropy of the biometric characteristic. As the entropy of the data increases, the amount of processing required to arrive at the appropriate level of randomness may be reduced.

The characteristic of noise threshold may refer to the amount of variability present when reading or acquiring the underlying data. Again using the example of fingerprints, when taking a scan or reading of a fingerprint, there may be some noise or variation in gathering the reading of the fingerprint. Stated another way, each time a reading is taken for a given individual, the exact same biometric data may not be generated, and in fact, the biometric characteristic of the individual may vary slightly such that even in a perfect system there may be some minor variation in the biometric data between two samplings. This may be referred to as the noise threshold. If the noise threshold is high, the system may generate frequent false positives, permitting incorrect data to match the underlying data. Using the fingerprint example, too many fingerprints that are similar but not the same may be recognized as authentic. In contrast, if the noise threshold is low, the system may generate frequent false negatives. Using the fingerprint example, the same person taking a second reading may not be found authentic. As the noise threshold increases, the amount of processing to arrive at an appropriate level of randomness may decrease.

Another characteristic may include the domain of the data, or the mathematical space in which the underlying data resides. Using the example of the fingerprints, the biometric data converted into a bit stream or p-nary vector. For example, a given fingerprint may be represented by a bit stream of three hundred and twenty bits. The format and length of the domain may be related to other factors, for example, the noise level and the noise threshold. In some embodiments, a minimum size or vector length of underlying data may be required. As the size and complexity of the domain of the underlying data increases, the amount of processing may decrease.

The appropriate level of randomness may be proportional to a desired security level of the data. As the desired security level increases, the appropriate level of randomness may increase. The desired security level may dictate what the security parameter $\lambda$ may represent. For example, for a higher desired security level the security parameter may require one hundred and twenty eight bits of security.

Figure 13:
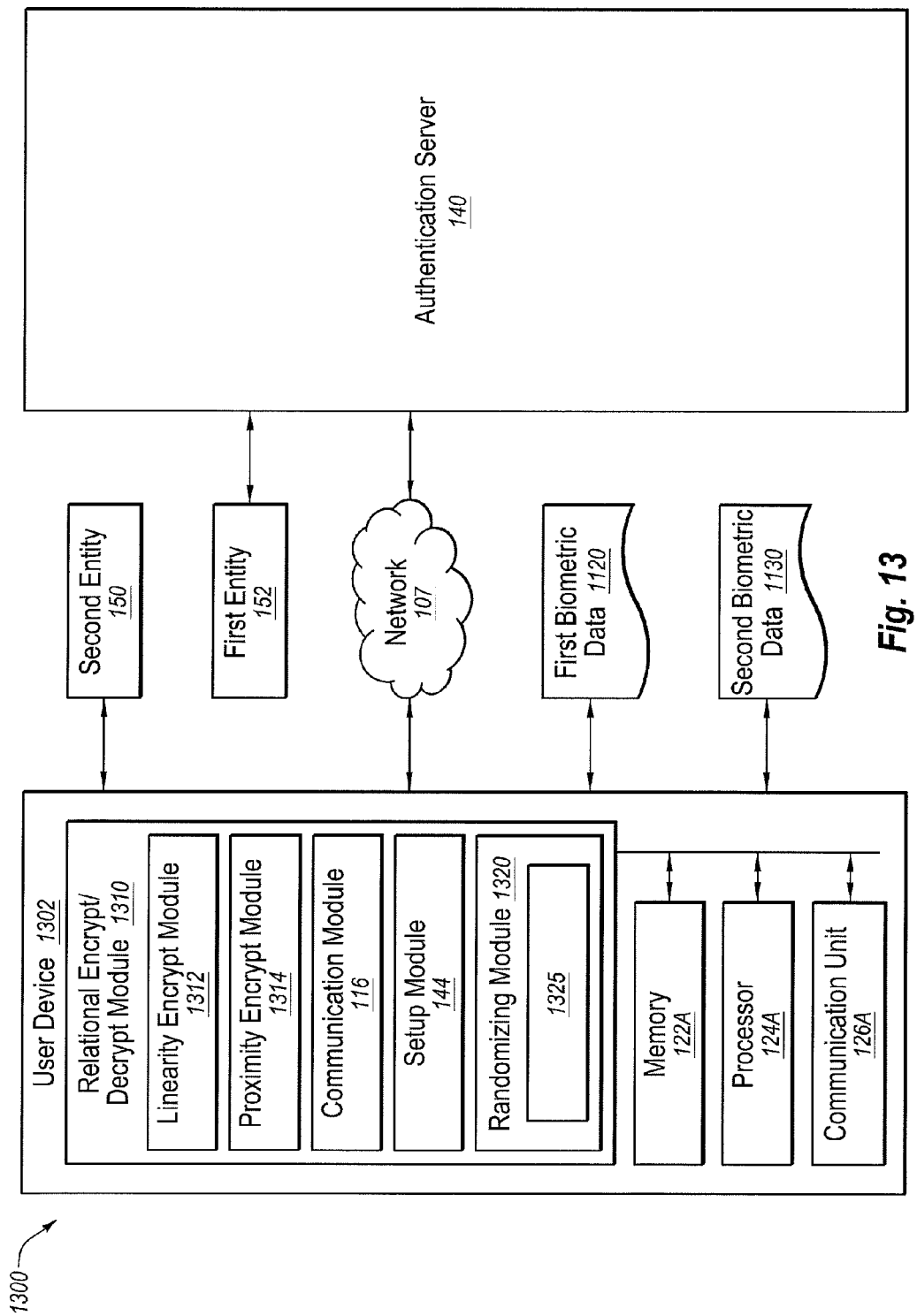
FIG. 13 is a block diagram of an example operating environment.

FIG. 13 is a block diagram of an example operating environment. The network 107, the communication module 116, the setup module 144, the memory 122A, the processor 124A, the communication unit 126A, the first entity 150, the second entity 152, the authentication server 140 may be the same as described in FIG. 1. A user device 1302 may be similar to the user device 102, but maybe modified to include a relational encrypt/decrypt module 1310. A linearity encrypt module 1312 and a proximity encrypt module 1314 may be similar to the linearity encrypt/decrypt module 112 and the proximity encrypt/decrypt module 114, although they may not be configured to decrypt any ciphertexts. In some embodiments using non-uniformly distributed data, the methods and processes described in the present disclosure may be modified to omit any decryption steps. The relational encrypt/decrypt module 1310 may be similar to the relational encrypt/decrypt module 110, but may be modified to include a randomizing module 1320.

The randomizing module 1320 may be implemented as software including one or more routines configured to perform one or more operations described herein. The randomizing module 1320 may include a set of instructions executable by the processors 124 to provide the functionality described herein. In some instances, the randomizing module 1320 may be stored in or at least temporarily loaded into the memory 122 and may be accessible and executable by one or more of the processors 124. The randomizing module 1320 may be adapted for cooperation and communication with one or more of the processors 124 over a bus.

The randomizing module 1320 may be configured to randomize underlying data which may be non-uniformly distributed to an appropriate level of randomness such that the randomized data may be used in a relational encryption scheme as described in the present disclosure. In some embodiments, this may include the randomizing module 1320 utilizing a linear extractor 1325 to extract an appropriately randomized plaintext from non-uniformly distributed data. The linear extractor 1325 may be a strong linear extractor. The linear extractor 1325 may be implemented as a series of mathematical steps or operations as known in the art.

By way of example, the user device 1302 may receive a first biometric data 1120 and a second biometric data 1130 to be used in a relational encryption scheme in accordance with the present disclosure. The first and second biometric data 1120 and 1130 may be non-uniformly distributed and thus, prior to encrypting the underlying data the first and second biometric data 1120 and 1130 may be processed at the randomizing module 1320 using the linear extractor 1325 to arrive at an appropriate level of randomness as a plaintext vector. The plaintext vector may then be encrypted by the linearity encrypt module 1312 and the proximity encrypt module 1314.

Figure 14:
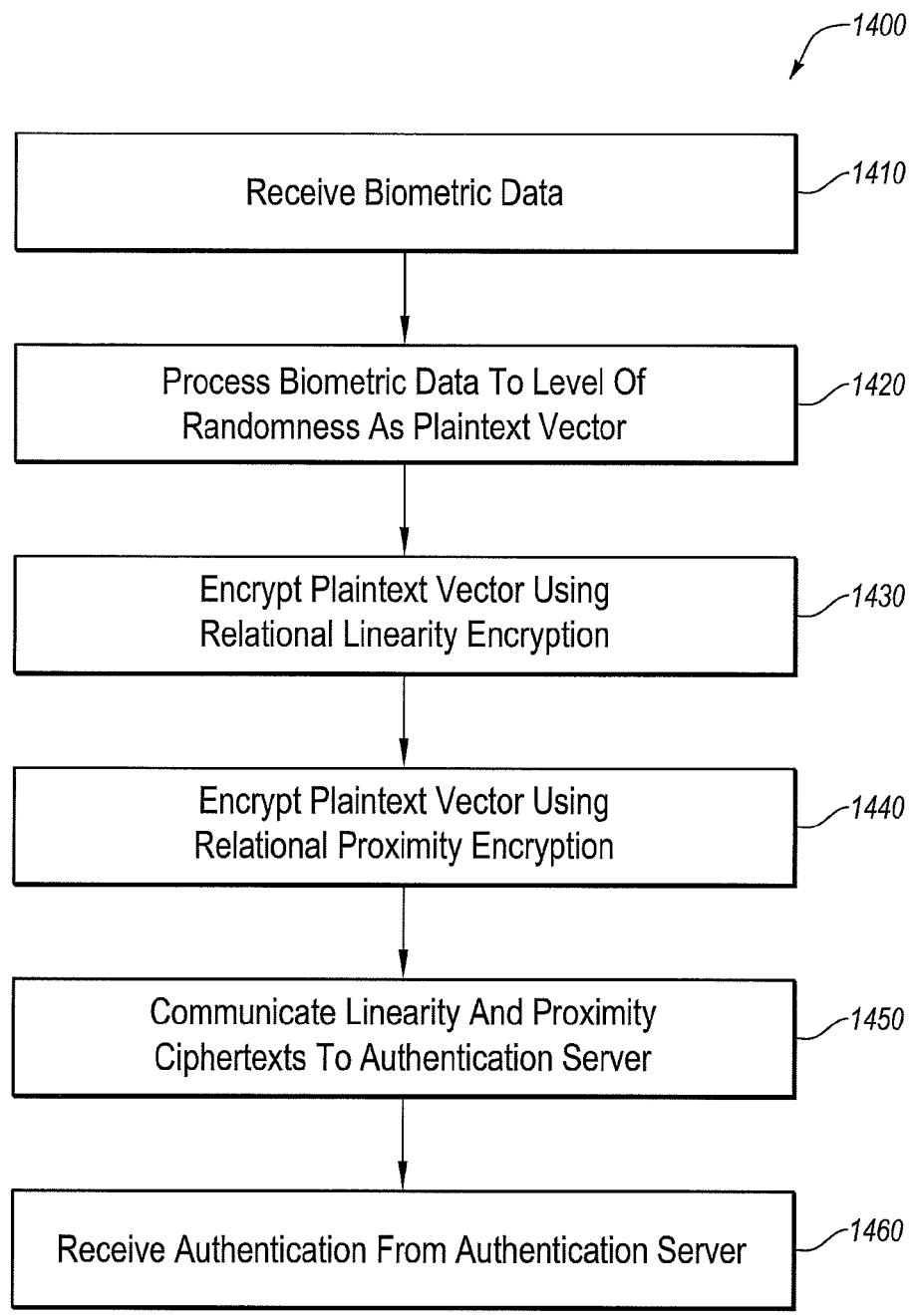
FIG. 14 is a flow diagram of an example method of encrypting non-uniformly distributed data using a relational encryption scheme.

FIG. 14 is a flow diagram of an example method 1400 of encrypting non-uniformly distributed data using a relational encryption scheme. The method 1400 may be performed in an authentication system such as may be implemented in the biometric system 200 of FIG. 2, in the operating environment 100 of FIG. 1, or the operating environment 1300 of FIG. 13. The method 1200 may be programmably performed in some embodiments by the user device 102 of FIG. 1 or the user device 1302 of FIG. 13. The user device 102 or the user device 1302 may include or may be communicatively coupled to a non-transitory computer-readable medium (e.g., the memory 122A of FIG. 1 or FIG. 13) having stored thereon or encoded therein programming code or instructions that are executable by a processor to perform or control performance of the method 1400. Additionally or alternatively, the user device 102 or the user device 1302 may include a processor (e.g., the processor 124A of FIG. 1 or FIG. 13) that is configured to execute computer instructions to perform or control performance of the method 1400. Although illustrated as discrete blocks, various blocks may be divided into additional blocks, combined into fewer blocks, or eliminated, depending on the desired implementation.

At block 1410, a user device may receive biometric data or other non-uniformly distributed data. This may be received using one or more sensors, detectors, etc. At block 1420, the biometric data may be processed to a level of randomness as a plaintext vector. Block 1420 may be further explained in FIG. 15. At block 1430, the plaintext vector may be encrypted using a relational linearity encryption scheme as described in the present disclosure, resulting in a linearity cyphertext. At block 1440, the plaintext vector may be encrypted using a relational proximity encryption scheme as described in the present disclosure, resulting in a proximity cyphertext.

At block 1450, the linearity and proximity cyphertexts may be communicated to an authentication server. Once the linearity and proximity cyphertext have been communicated to the authentication server, the authentication server may perform a comparison and determination as described herein to determine if there is a relation between the cyphertexts and a reference cyphertext. If the server determines that there is a relation, the authentication server may communicate an authentication to the user device. In some embodiments, this may be based on a desired security level to which the underlying data has been appropriately randomized. At block 1460, the user device may receive the authentication from the authentication server indicative of whether there is proximity between the proximity ciphertext and the registration proximity ciphertext. In a case in which the authentication server determines that the approximate similarity exists between the first biometric template and the second biometric template, the authentication or an authentication signal received from the authentication server indicates that there is proximity between the proximity ciphertext and the registration proximity ciphertext.

Figure 15:
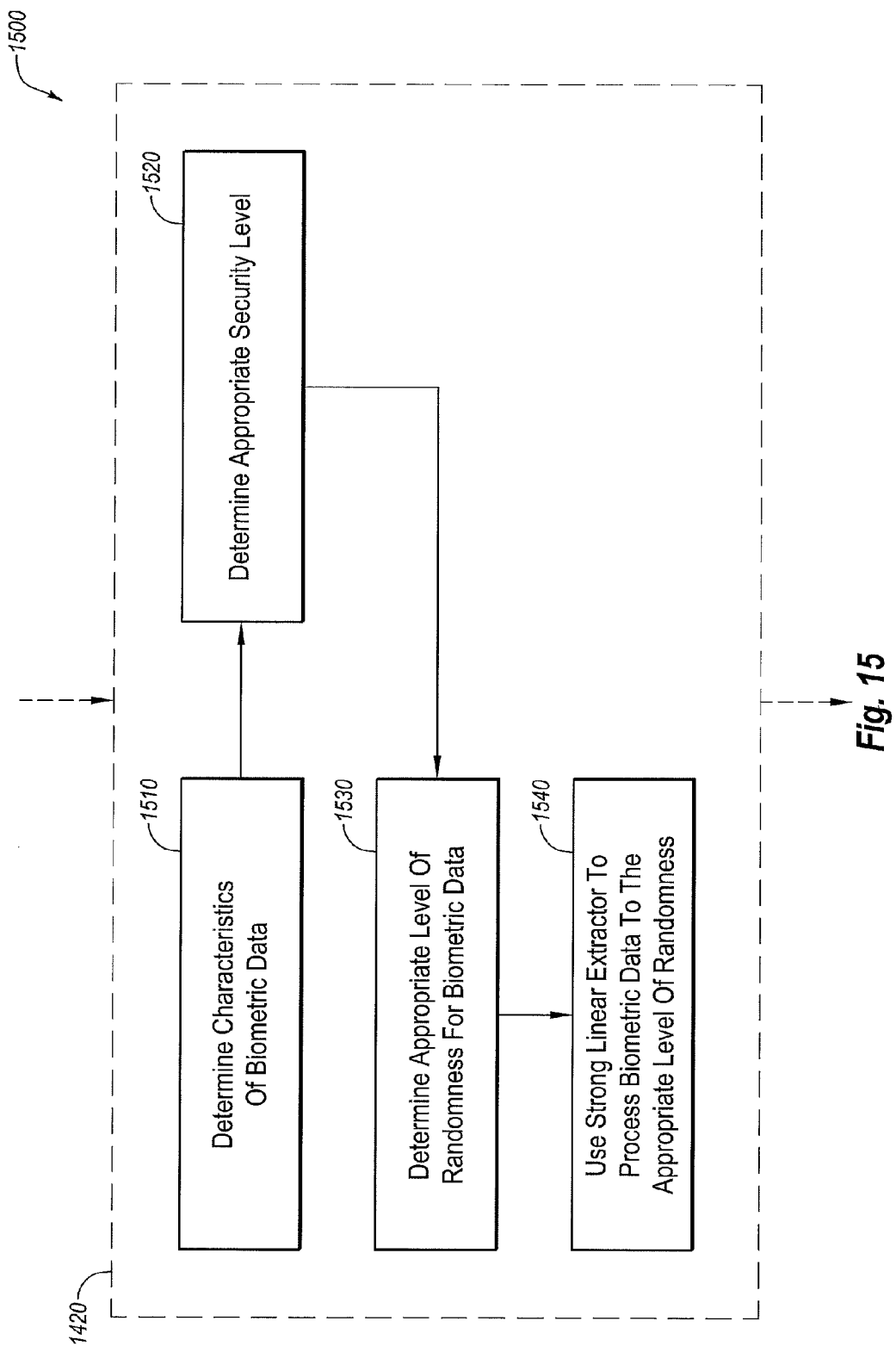
FIG. 15 is a flow diagram of an example method of processing non-uniformly distributed data.

FIG. 15 is a flow diagram of an example method 1500 of processing non-uniformly distributed data. The method 1500 may be a substitution or expansion of block 1420 of FIG. 14. For example, after block 1410 of FIG. 14 method 1500 may be implemented and then return to block 1440 of FIG. 14. The method 1500 may be performed in an authentication system such as may be implemented in the biometric system 200 of FIG. 2, in the operating environment 100 of FIG. 1, or the operating environment 1300 of FIG. 13. The method 1500 may be programmably performed in some embodiments by the user device 102 of FIG. 1 or the user device 1302 of FIG. 13. The user device 102 or the user device 1302 may include or may be communicatively coupled to a non-transitory computer-readable medium (e.g., the memory 122A of FIG. 1 or FIG. 13) having stored thereon or encoded therein programming code or instructions that are executable by a processor to perform or control performance of the method 1500. Additionally or alternatively, the user device 102 or the user device 1302 may include a processor (e.g., the processor 124A of FIG. 1 or FIG. 13) that is configured to execute computer instructions to perform or control performance of the method 1500. Although illustrated as discrete blocks, various blocks may be divided into additional blocks, combined into fewer blocks, or eliminated, depending on the desired implementation. For example, blocks 1510 and 1520 may be performed simultaneously or may be omitted.

After block 1410 of FIG. 14, the method 1500 may begin at block 1510. At block 1510, the characteristics of the biometric data may be determined. This may include determining one or more of the entropy, noise threshold, and domain of the data. In some embodiments, this may be a pre-determined characteristic of the data that is retrieved from storage or from a third party. For example, the variability in distribution of fingerprints may be a known characteristic that is stored and retrieved if the received biometric data is a bit stream representing a fingerprint. In some embodiments, the characteristics may be determined once the biometric data is received, for example, the noise threshold may be based in part on the hardware, sensor or other data-capture technique used to gather the biometric data. The method 1500 may then proceed to block 1520.

At block 1520, the appropriate security level may be determined based on the security parameter λ. The appropriate security level may be based on the sensitivity of the biometric data used, the application for which the authentication is required, etc. The method 1500 may then proceed to block 1530. At block 1530, the appropriate level of randomness may be determined for the biometric data. As described above, this may be based in part on one or more of the characteristics determined at block 1510 or the security parameter used in the determination at block 1520. In some embodiments, the appropriate level of randomness may be proportional to the security parameter. The method 1500 may then proceed to block 1540.

At block 1540, a strong linear extractor may be used to process the biometric data to the appropriate level of randomness as a plaintext vector. This may be mathematically represented as the operation of X·r. Once the biometric data has been randomized, the method 1500 may end by routing the process to block 1430 of FIG. 14.

As described above in conjunction with the embodiments, a proximity verification verifies a proximity relationship between a proximity ciphertext and a registration proximity ciphertext using a proximity relational secret key. The proximity ciphertext and the registration proximity ciphertext are not decrypted for this verifying.

According to the proximity verification using the proximity relationship described above, a user may perform a proximity search to find out whether information in a proximity to certain information is registered in a database. For example, the proximity search may look for documents where two or more separately matching term occurrences are within a specified distance, where the distance is a number of intermediate words or characters, for example. However, the certain information, which may be a search term (or word), a search statement, or the like is transferred in encrypted form and is not decrypted for the search and proximity verification. In addition, the database also contains encrypted information which is not decrypted for the proximity verification. As a result, the user can find out whether the information in the proximity to the certain information is registered in the database, without leaving a search (or browser) log containing the certain information itself in a Web server or the like, and the content of the search can be concealed from a third party. Further, although the user can find out whether the information in the proximity to the certain information is registered in the database, the information in the proximity to the certain information, registered in the database in the encrypted form, can be concealed from the user.

In a case in which the user finds out that the information in the proximity to the certain information is registered in the database, the user may contact an owner or manager of the database, and make necessary arrangements (for example, by way of a contract) to acquire the information in the proximity to the certain information, that is, a content related to the certain information, registered in the database, when the owner or manager agrees to share the content with the user, for example.

In other words, even when the database is made accessible from the general public, for example, the content of the search can be concealed because the information to be searched is transferred in encrypted form and is not decrypted for the search and proximity verification, to provide a searchable encryption. In addition, it is possible to find out, from the result of the proximity verification using the relational encryption, whether information in the proximity to the information being searched is registered in the database, however, the content related to the information, registered in the database in the encrypted form, can be concealed because the database contains encrypted information which is not decrypted for the proximity verification, to provide the searchable encryption.

Hence, in one application of the embodiments described above, one or more first entities may perform a search to find out, from results of the proximity verification using the relational encryption, whether information in a proximity to certain information being searched is registered in one or more databases of one or more second entities. The one or more first entities may acquire the information in the proximity to the certain information, that is, the content related to the certain information, registered in one or more databases, when the one or more second entities agree to share the content with the one or more first entities. As a result, useful information can be shared and utilized efficiently amongst the one or more first entities and the one or more second entities agreeing to the information sharing, while securing confidentiality of the content related to the certain information, registered in the database, from a third party. As will be described later, the third party may include one or more first entities not permitted by the one or more second entities to share the information.

In this case, the encryption may be performed using mutually different first (or search) keys amongst the first entities when performing the search. In addition, the encryption may be performed using mutually different second (or registration) keys amongst the second entities when registering the information in the respective databases, where the second keys are different from the first keys.

The first entities may perform the search to find out, from the results of the proximity verification using the relational encryption, whether information in the proximity to the certain information being searched is registered in one or more databases of one or more second entities in a cloud computing environment which includes one or more processors, for big data analysis, for example.

The plaintext data used in the embodiments described above may be related to various kinds of information, and is not limited to biometric information. Examples of the various kinds of information may include medical and biological information, technical information, financial information, or the like. The medical and biological information may include clinical data, health data, genome data, or the like. The technical information may include analysis data, evaluation data, experimental data, or the like in various technical fields. The financial information may include data related to banking, data related to securities, or the like.

The various kinds of information may be registered in a database in the form of registration ciphertext. As an example, the registration ciphertext including an encryption of the medical and biological information may be registered in the database of an entity such as a hospital, a research facility, a university, an administrative organization, a government institution, or the like.

Figure 16:
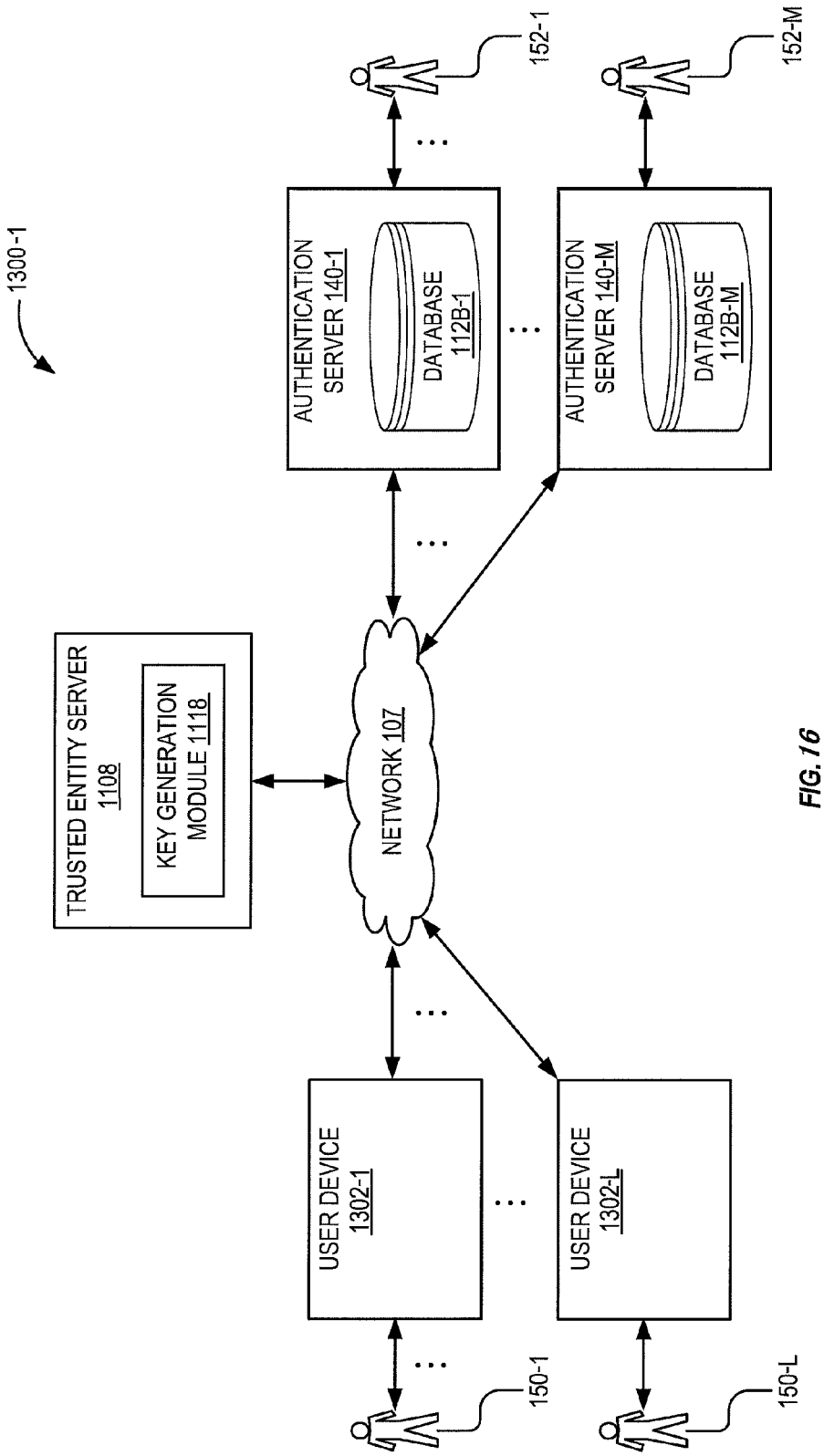
FIG. 16 is a block diagram of another example operating environment.

Next, a description will be given of an example of one application of the embodiments described above, by referring to FIG. 16. FIG. 16 is a block diagram of another example operating environment 1300-1. In FIG. 16, those parts that are the same as those corresponding parts in FIG. 13 are designated by the same reference numerals, and a description thereof will be omitted. In FIG. 16, a plurality of user devices 1302-1, . . . , and 1302-L, and a plurality of authentication servers 140-1, . . . , and 140-M including a plurality of memories 122B-1, . . . , and 122B-M forming databases are provided, where L and M are natural numbers greater than or equal to 2. L may be equal to or different from M. N databases may be provided, and a common database may be provided with respect to two or more authentication servers, where N is a natural number greater than or equal to 2 and may be equal to or different from M. Instead of providing the databases within the authentication servers, the databases may be provided outside the authentication servers and be connected to the network 107. It is assumed for the sake of convenience that the user devices 1302-1, . . . , and 1302-L are used by entities (hereinafter also referred to as "users") 150-1, . . . , and 150-L, respectively. In addition, it is assumed that the authentication servers 140-1, . . . , and 140-M are used by entities (hereinafter also referred to as "users (or operators)") 152-1, . . . , and 152-M, respectively. The network 107 may include one or a plurality of networks, and the network 107 may include the Internet. The operating environment 1300-1 may form a cloud computing environment.

FIG. 16 illustrates the operating environment 1300-1 as including a trusted entity server 1108, however, this trusted entity server 1108 may be omitted. In a case in which the trusted entity server 1108 is provided, this trusted entity server 1108 may include a processor-based computing system. For example, the trusted entity server 1108 may include a hardware server or another processor-based computing system configured to function as a server. The trusted entity server 1108 may include memory and network communication capabilities. In the operating environment 1300-1, the trusted entity server 1108 may be configured to communicate with the user devices 1302-1, . . . , and 1302-L, the authentication servers 140-1, . . . , and 140-M, and the databases 122B via the network 107.

The trusted entity server 1108 may be associated with a trusted entity. For example, the trusted entity may include a non-interested third party such as a certification authority. The users 150-1, . . . , and 150-L, and entities associated with the authentication servers 140-1, . . . , and 140-M may trust, select, and agree upon the trusted entity.

The trusted entity server 1108 may include a key generation module 1118. The key generation module 1118 may be configured to generate keys used in a relational encryption protocol. In some embodiments, the keys may include a public key set, a relational key, and first and second verification keys which will be described later in conjunction with FIGS. 22 and 23. The keys generated by the key generation module 1118 may be communicated to the user devices 1302-1, . . . , and 1302-L, and the authentication servers 140-1, . . . , and 140-M or made available via the network 107.

The method of proximity verification using the relational encryption in the operating environment 1300-1 may be performed from each of the user devices 1302-1, . . . , and 1302-L with respect to each of the databases of each of the authentication servers 140-1, . . . , and 140-M, in a manner described above in conjunction with FIGS. 1 through 15.

Figure 17:
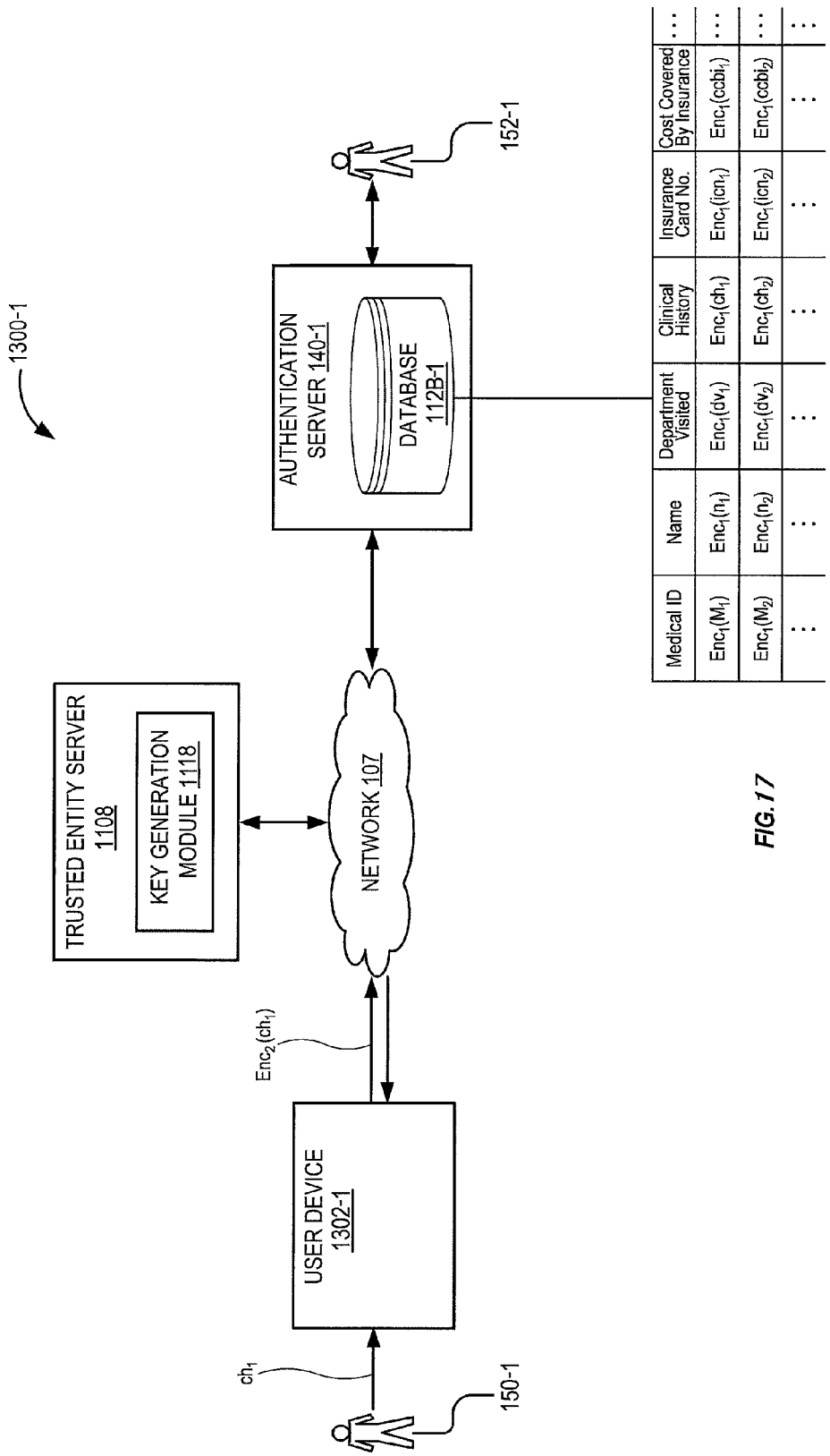
FIG. 17 is a diagram for explaining a first example of the method of proximity verification using the relational encryption.

FIG. 17 is a diagram for explaining a first example of the method of proximity verification using the relational encryption. In this first example, it is assumed for the sake of convenience that the user 150-1 operates the user device 1302-1 to perform a search to find out, from results of the proximity verification using the relational encryption, whether information in a proximity to the information that is being searched is registered in the databases of the authentication servers 140-1, . . . , and 140-M. It is also assumed that the information being searched is registered in the database formed by the memory 122B-1 (hereinafter also referred to as "database 122B-1") of the authentication server 140-1. It is further assumed that the information being searched and registered in the database is clinical data, which is one example of medical and biometrical information.

In a case in which the information being searched is a medical ID assigned to an individual, for example, the user device 1302-1 may be provided in an administrative organization, and the authentication server 140-1 and the database 122B-1 may be provided in a hospital. As illustrated in FIG. 17, the database 122B-1 may register clinical data such as a patient's name (n), a department visited (dv) by the patient, a clinical history (ch), an insurance card number (icn), a cost covered by the insurance (ccbi), or the like for each medical ID, in encrypted form. Hence, a medical ID $M_1$ is registered in encrypted form $Enc_1(M_1)$, and a medical ID $M_2$ is registered in encrypted form $Enc_1(M_2)$, for example. The authentication server 140-1 may be operated by the user (or operator) 152-1 to register the clinical data in the database 122B-1 in the encrypted form.

The user 150-1 of the user device 1302-1 of the administrative organization may wish to know the patients having the clinical history $ch_1$, for example. In this case, the search for the clinical history $ch_1$ is made in encrypted form $Enc_2(ch_1)$, for example, and is not decrypted for the search and proximity verification. The encryption $Enc_2$ used by the user device 1302-1 for the search is different from the encryption $Enc_1$ used at the time of registering the clinical data in the encrypted form in the database 122B-1. In addition, the clinical data in the encrypted form, registered in the database 122B-1, is not decrypted for the proximity verification. As a result, the user 150-1 of the user device 1302-1 can find out whether a clinical history in a proximity to the clinical history $ch_1$, that is, the clinical data related to the clinical history $ch_1$, is registered in the database, without leaving a search (or browser) log containing the clinical history $ch_1$ itself in the Web server or the like, and the content of the search can be concealed from a third party. Further, although the user 150-1 can find out that the clinical history in the proximity to the clinical history $ch_1$ is registered in the database 122B-1, the clinical history in the proximity to the clinical history $ch_1$, registered in the database 122B-1 in the encrypted form, can be concealed from the user 150-1.

In a case in which the user 150-1 finds out that the clinical history in the proximity to the clinical history $ch_1$ is registered in the database 122B-1, the user 150-1 may contact an owner or manager of the database 122B-1, that is, the hospital, and make necessary arrangements (for example, by way of a contract) to acquire at least a part of the content related to the clinical history $ch_1$, registered in the database 122B-1, when the owner or manager agrees to share the content with the user 150-1, for example. Accordingly, the owner of manager may agree to share, with the administrative organization, a part of the clinical data related to the clinical history $ch_1$, that is, the patient having the clinical history similar to the clinical history $ch_1$. On the other hand, the owner of manager may not agree to share, with the administrative organization, another part of the clinical data related to the clinical history $ch_1$, that is, the medical ID of the patient having the clinical history similar to the clinical history $ch_1$, for example.

As a result, in this example, useful information can be shared and utilized efficiently between the administrative organization and the hospital agreeing to the information sharing with the administrative organization, while securing confidentiality of the clinical data related to the clinical history $ch_1$, registered in the database, from a third party. It is also possible to secure confidentiality of a part of the clinical data related to the clinical history $ch_1$, registered in the database, from the administrative organization to protect privacy information of the patient having the clinical history similar to the clinical history $ch_1$.

Figure 18:
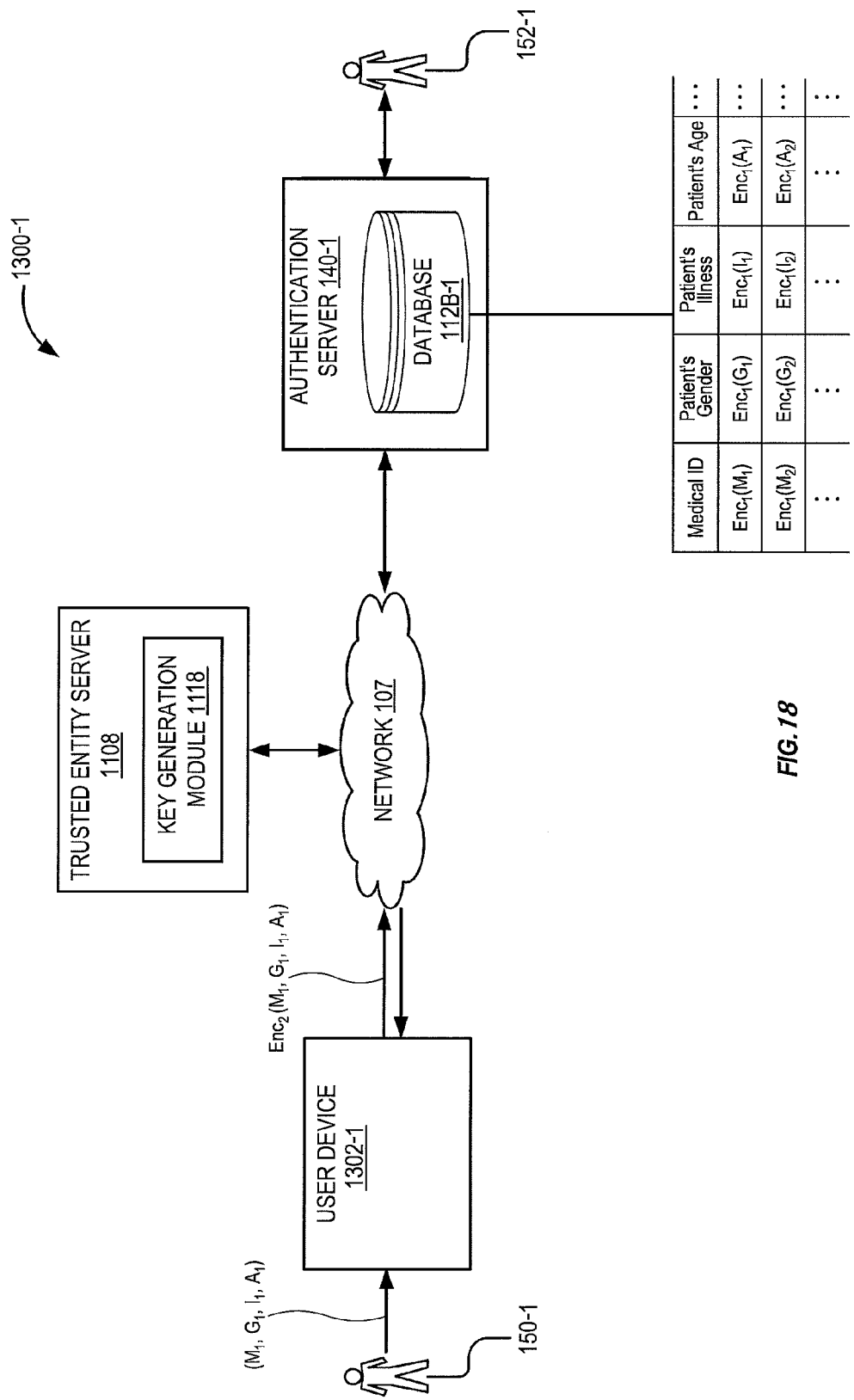
FIG. 18 is a diagram for explaining a second example of the method of proximity verification using the relational encryption.

FIG. 18 is a diagram for explaining a second example of the method of proximity verification using the relational encryption. In FIG. 18, those parts that are the same as those corresponding parts in FIG. 17 are designated by the same reference numerals, and a description thereof will be omitted.

As illustrated in FIG. 18, the database 122B-1 may register clinical data such as a patient's gender, a patient's illness, a patient's age, or the like for each medical ID, in encrypted form. In this example, a combination of a plurality of clinical data of each medical ID corresponds to attribute data of the patient having the medical ID. The user 150-1 of the user device 1302-1 of the administrative organization may wish to know whether the attribute data of the patient having the medical ID $M_1$ is registered in the database. In this case, the search for the attribute data $(M_1, G_1, I_1, A_1)$ is made in encrypted form $Enc_2(M_1, G_1, I_1, A_1)$, for example, and is not decrypted for the search and proximity verification. The encryption $Enc_2$ used by the user device 1302-1 for the search is different from the encryption $Enc_1$ used at the time of registering the clinical data in the encrypted form in the database 122B-1. In addition, the attribute data in the encrypted form, registered in the database 122B-1, is not decrypted for the proximity verification. As a result, the user 150-1 of the user device 1302-1 can find out whether an attribute data in a proximity to the attribute data $(M_1, G_1, I_1, A_1)$ is registered in the database, without leaving a search (or browser) log containing the attribute data $(M_1, G_1, I_1, A_1)$ itself in the Web server or the like, and the content of the search can be concealed from a third party. Further, although the user 150-1 can find out that the attribute data in the proximity to the attribute data $(M_1, G_1, I_1, A_1)$ is registered in the database 122B-1, the attribute data in the proximity to the attribute data $(M_1, G_1, I_1, A_1)$, registered in the database 122B-1 in the encrypted form, can be concealed from the user 150-1.

Figure 19:
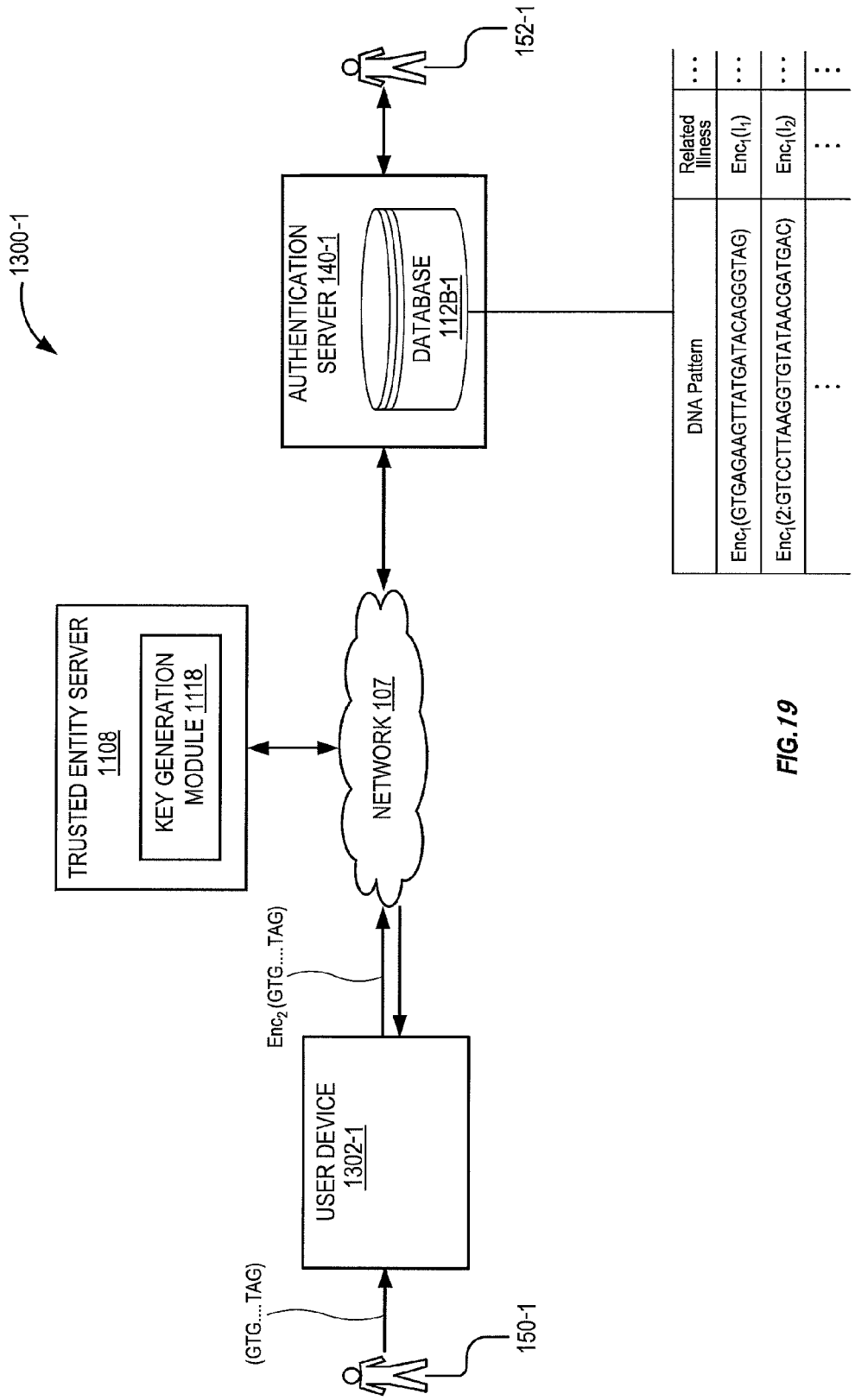
FIG. 19 is a diagram for explaining a third example of the method of proximity verification using the relational encryption.

FIG. 19 is a diagram for explaining a third example of the method of proximity verification using the relational encryption. In FIG. 19, those parts that are the same as those corresponding parts in FIG. 17 are designated by the same reference numerals, and a description thereof will be omitted.

In a case in which the information being searched is a DNA pattern, which is one example of the medical and biometrical information, the user device 1302-1 may be provided in a research facility, and the authentication server 140-1 and the database 122B-1 may be provided in a hospital. As illustrated in FIG. 18, the database 122B-1 may register genome data, such as a DNA pattern, an illness related to the DNA pattern, or the like, in encrypted form. Hence, a DNA pattern GTG . . . TAG and an illness $I_1$ related thereto are registered in encrypted form $Enc_1(GTG . . . TAG)$ and $Enc_1(I_1)$, and a DNA pattern GTC . . . GAC and an illness $I_2$ related thereto are registered in encrypted form $Enc_1(GTC . . . GAC)$ and $Enc_1(I_2)$, for example. The authentication server 140-1 may be operated by the user (or operator) 152-1 to register the genome data in the database 122B-1 in the encrypted form.

The user 150-1 of the user device 1302-1 of the research facility may wish to know the illness related to the DNA pattern GTG . . . TAG, for example. In this case, the search for the DNA pattern GTG . . . TAG is made in encrypted form $Enc_2(GTG . . . TAG)$, for example, and is not decrypted for the search and proximity verification. The encryption $Enc_2$ used by the user device 1302-1 for the search is different from the encryption $Enc_1$ used at the time of registering the genome data in the encrypted form in the database 122B-1. In addition, the genome data in the encrypted form, registered in the database 122B-1, is not decrypted for the proximity verification. As a result, the user 150-1 of the user device 1302-1 can find out whether a DNA pattern in a proximity to the DNA pattern GTG . . . TAG is registered in the database, without leaving a search (or browser) log containing the DNA pattern GTG . . . TAG itself in the Web server or the like, and the content of the search can be concealed from a third party. Further, although the user 150-1 can find out that the DNA pattern in the proximity to the DNA pattern GTG . . . TAG is registered in the database 122B-1, the DNA pattern in the proximity to the DNA pattern GTG . . . TAG, registered in the database 122B-1 in the encrypted form, can be concealed from the user 150-1.

In a case in which the user 150-1 finds out that the DNA pattern in the proximity to the DNA pattern GTG . . . TAG is registered in the database 122B-1, the user 150-1 may contact an owner or manager of the database 122B-1, that is, the hospital, and make necessary arrangements (for example, by way of a contract) to acquire at least a part of the content related to the DNA pattern GTG . . . TAG, that is, the illness registered in the database 122B-1 with respect to the DNA pattern in the proximity to the DNA pattern GTG . . . TAG, when the owner or manager agrees to share the genome data with the user 150-1, for example. Accordingly, the owner of manager may agree to share, with the research facility, a part of the genome data related to the DNA pattern GTG . . . TAG, that is, the illness related to the DNA pattern in the proximity to the DNA pattern GTG . . . TAG in this example. On the other hand, the owner of manager may not agree to share, with the research facility, another part of the genome data related to the DNA pattern in the proximity to the DNA pattern GTG . . . TAG.

As a result, in this example, useful information can be shared and utilized efficiently between the research facility and the hospital agreeing to the information sharing with the research facility, while securing confidentiality of the genome data related to the DNA pattern in the proximity to the DNA pattern GTG . . . TAG, registered in the database, from a third party. It is also possible to secure confidentiality of a part of the genome data related to the DNA pattern in the proximity to the DNA pattern GTG . . . TAG, registered in the database, from the research facility to protect sensitive or secret information related to the DNA pattern in the proximity to the DNA pattern GTG . . . TAG.

Figure 20:
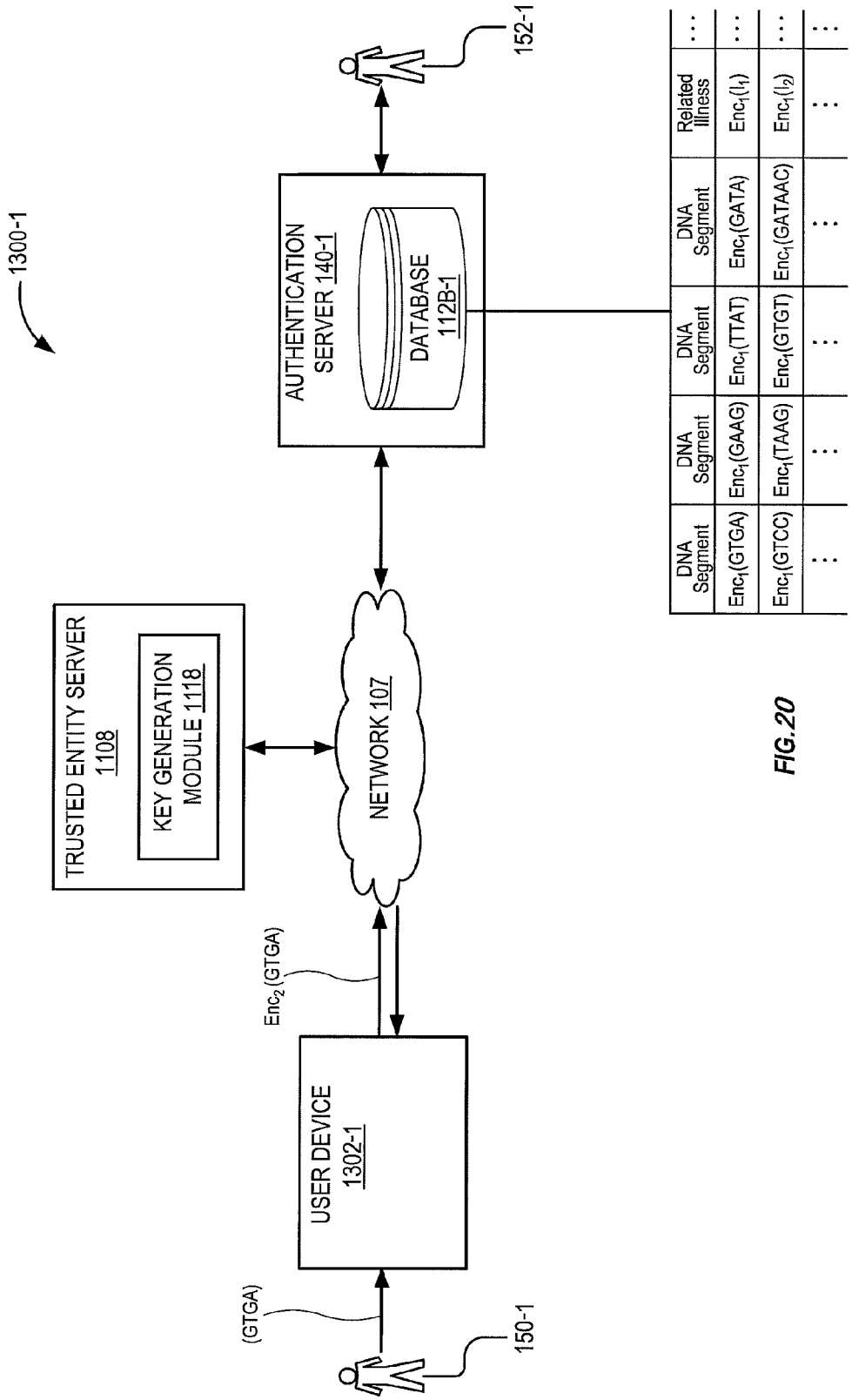
FIG. 20 is a diagram for explaining a fourth example of the method of proximity verification using the relational encryption.

FIG. 20 is a diagram for explaining a fourth example of the method of proximity verification using the relational encryption. In FIG. 20, those parts that are the same as those corresponding parts in FIG. 19 are designated by the same reference numerals, and a description thereof will be omitted.

As illustrated in FIG. 20, the database 116-1 may register the DNA pattern in segments (that is, segments of a single data), which are meaningful units related to an illness or the like, for example. In this example, DNA segments GTGA, GAAG, TTAT, GATA, . . . , an illness $I_1$ related thereto, or the like are registered in encrypted form $Enc_1(GTGA)$, $Enc_1(GAAG)$, $Enc_1(TTAT)$, $Enc_1(GATA)$, $Enc_1(I_1)$, or the like, for example. In addition, DNA segments GTCC, TAAG, GTGT, GATAAC, . . . , an illness $I_2$ related thereto, or the like are registered in encrypted form $Enc_1(GTCC)$, $Enc_1(TAAG)$, $Enc_1(GTGT)$, $Enc_1(GATAAC)$, $Enc_1(I_2)$, or the like, for example. In this case, the user 150-1 of the user device 1302-1 of the research facility can find out whether information related to a DNA segment, such as the illness related to the DNA segment GTGA, for example, is registered in the database.

According to the second example described above, each of the information that is searched and the information that is registered includes a combination of a plurality of data items. On the other hand, according to the fourth example, each of the information that is searched and the information that is registered includes a plurality of segments of a single data item.

Figure 21:
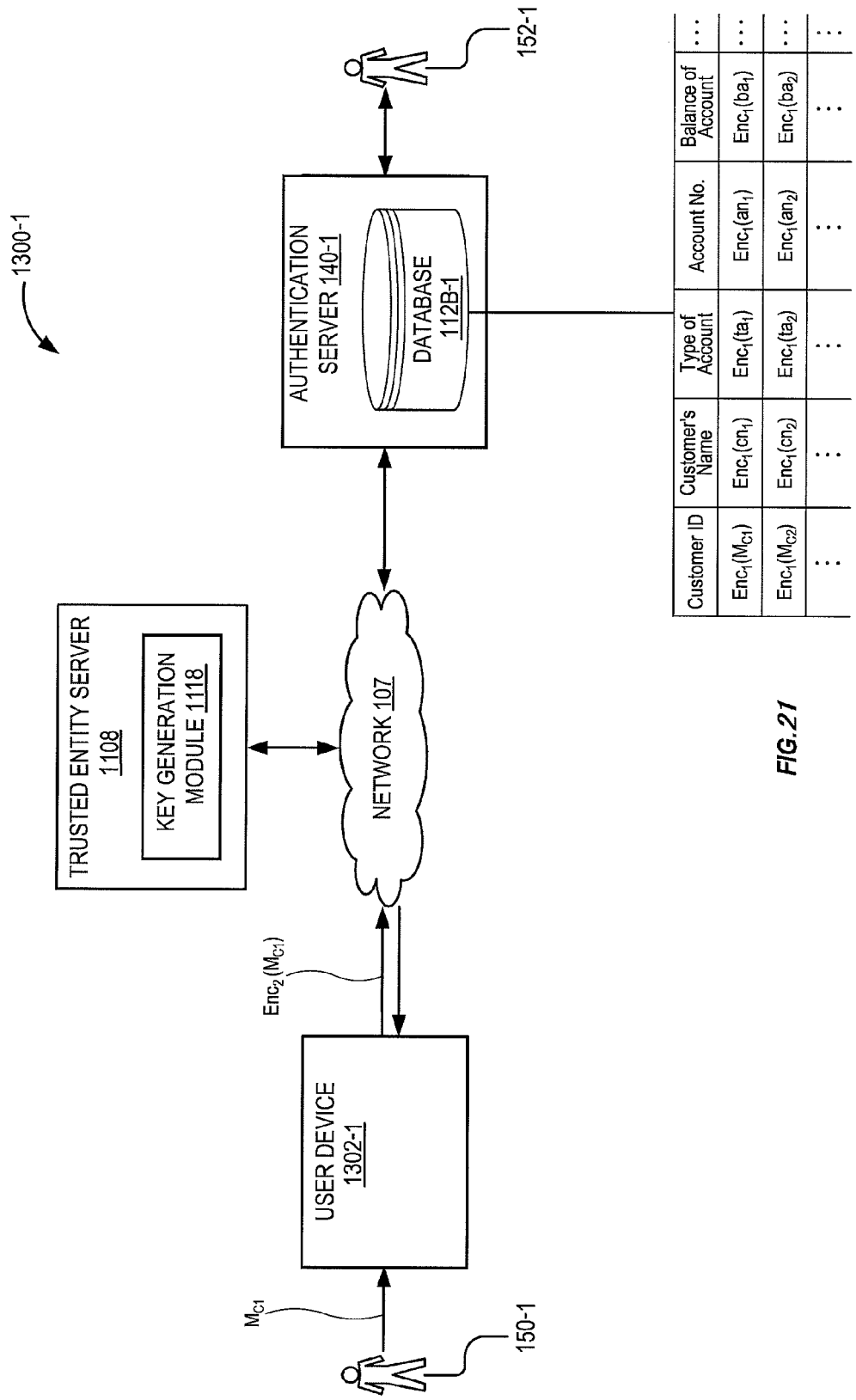
FIG. 21 is a diagram for explaining a fifth example of the method of proximity verification using the relational encryption.

FIG. 21 is a diagram for explaining a fifth example of the method of proximity verification using the relational encryption. In FIG. 21, those parts that are the same as those corresponding parts in FIG. 17 are designated by the same reference numerals, and a description thereof will be omitted.

The first through fourth examples described above perform the proximity verification related to the medical and biometrical information. However, as described above, the information subjected to the proximity verification is not limited to the medical and biometrical information. This fifth example performs the proximity verification related to financial information, as one example of the kind of information to which the proximity verification may be applied.

In a case in which the information being searched is a customer ID assigned to an individual, for example, the user device 1302-1 may be provided in an administrative organization, and the authentication server 140-1 and the database 122B-1 may be provided in a bank. As illustrated in FIG. 21, the database 122B-1 may register data related to banking (hereinafter also referred to as "banking data"), such as a customer's name (cn), a type of account owned by the customer (ta), an account number (an), a balance of the customer's account (ba), or the like for each customer ID, in encrypted form. Hence, a customer ID $M_{C1}$ is registered in encrypted form $Enc_1(M_{C1})$, and a customer ID $M_{C2}$ is registered in encrypted form $Enc_1(M_{C2})$, for example. The authentication server 140-1 may be operated by the user (or operator) 152-1 to register the banking data in the database 122B-1 in the encrypted form.

The user 150-1 of the user device 1302-1 of the administrative organization may wish to know the type of account owned by a customer having a customer ID in a proximity to the customer ID $M_{C1}$, for example. In this case, the search for the customer ID $M_{C1}$ is made in encrypted form $Enc_2(M_{C1})$, for example, and is not decrypted for the search and proximity verification. The encryption $Enc_2$ used by the user device 1302-1 for the search is different from the encryption $Enc_1$ used at the time of registering the banking data in the encrypted form in the database 122B-1. In addition, the banking data in the encrypted form, registered in the database 122B-1, is not decrypted for the proximity verification. As a result, the user 150-1 of the user device 1302-1 can find out whether the banking data of the customer in the proximity to the customer ID $M_{C1}$ is registered in the database, without leaving a search (or browser) log containing the customer ID $M_{C1}$ itself in the Web server or the like, and the content of the search can be concealed from a third party. Further, although the user 150-1 can find out that the banking data of the customer in the proximity to the customer ID $M_{C1}$ is registered in the database 122B-1, the banking data of the customer in the proximity to the customer ID $M_{C1}$, registered in the database 122B-1 in the encrypted form, can be concealed from the user 150-1.

In a case in which the user 150-1 finds out that the banking data of the customer in the proximity to the customer ID $M_{C1}$ is registered in the database 122B-1, the user 150-1 may contact an owner or manager of the database 122B-1, that is, the bank, and make necessary arrangements (for example, by way of a contract) to acquire at least a part of the content related to the customer ID $M_{C1}$, registered in the database 122B-1, when the owner or manager agrees to share the content with the user 150-1, for example. Accordingly, the owner of manager may agree to share, with the administrative organization, a part of the banking data related to the customer ID $M_{C1}$, that is, the type of account owned by the customer having the customer ID in the proximity to the customer ID $M_{C1}$. On the other hand, the owner of manager may not agree to share, with the administrative organization, another part of the banking data related to the customer ID $M_{C1}$, that is, the balance of the customer's account of the customer having the customer ID in the proximity to the customer ID $M_{C1}$, for example.

As a result, in this example, useful information can be shared and utilized efficiently between the administrative organization and the bank agreeing to the information sharing with the administrative organization, while securing confidentiality of the banking data related to the customer ID $M_{C1}$, registered in the database, from a third party. It is also possible to secure confidentiality of a part of the banking data related to the customer ID $M_{C1}$, registered in the database, from the administrative organization to protect privacy information of the customer having the customer ID in the proximity to the customer ID $M_{C1}$.

Figure 23:
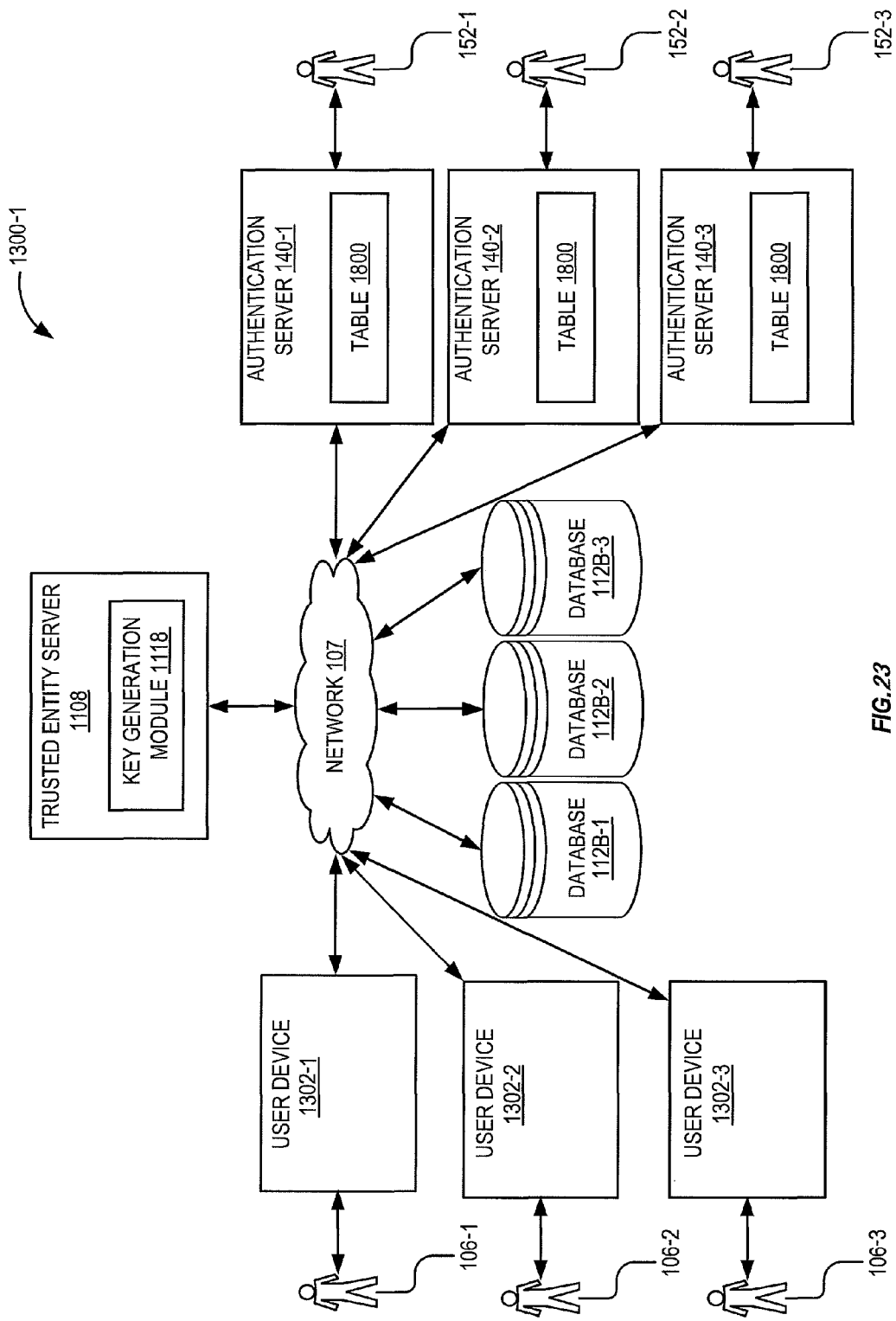
FIG. 23 is a diagram for explaining a sixth example of the method of proximity verification using the relational encryption.

Next, a description will be given of a sixth example of the method of proximity verification using the relational encryption, by referring to FIGS. 22 and 23. FIG. 22 illustrates an example of an access restricting table, and FIG. 23 is a diagram for explaining a sixth example of the method of proximity verification using the relational encryption. In FIG. 23, those parts that are the same as those corresponding parts in FIG. 16 are designated by the same reference numerals, and a description thereof will be omitted. FIG. 23 illustrates a case in which L=M=3 in FIG. 16. In this example, each authentication server may restrict access to the database based on the access restricting table. In addition, the databases are provided outside the authentication servers and connected to the network 107

FIG. 22 illustrates the access restricting table 1800 for a case in which three user devices 1302-1 through 1302-3, three authentication servers 140-1 through 140-3, and three databases 122B-1 through 122B-3 are provided in the operating environment 1300-1 illustrated in FIG. 23. In FIG. 22, Ka, Kb, and Kc denote verification keys that may be communicated from the trusted entity server 1108 and received by the user devices 1302-1, 1302-2, and 1302-3, respectively, at any block preceding block 1460 illustrated in FIG. 14, for example. In addition, Kx, Ky, and Kz denote verification keys that may be communicated from the trusted entity server 1108 and received by the authentication servers 140-1, 140-2, and 140-3, respectively, at a suitable timing prior to communicating the authentication signal from the authentication servers 140-1, 140-2, and 140-3. In this example, the verification keys Ka, Kb, and Kc are assigned to users Ua, Ub, and Uc of the user devices 1302-1, 1302-2, and 1302-3, respectively. In addition, the verification keys Kx, Ky, and Kz are assigned to users (or operators) Ux, Uy, and Uz of the authentication servers 140-1, 140-2, and 140-3, respectively. The access restricting table 1800 may be stored in each of the authentication servers 140-1, 140-2, and 140-3. Alternatively, the access restricting table 1800 may be communicated from the trusted entity server 1108 to each of the authentication servers 140-1, 140-2, and 140-3 at a suitable timing.

The verification key of each user device may be communicated to the authentication server at the suitable timing. The authentication server 140 determines based on the access restricting table 1800 whether the authentication signal is to be invalidated, regardless of whether the authentication signal indicates that there is proximity or approximate similarity between the proximity ciphertext and the registration proximity ciphertext.

In the access restricting table 1800, as an example, Ka-x indicates that the user device 1302-1 having assigned the verification key Ka can access the proximity verification result from the authentication server 140-1 having assigned the verification key Kx. Similarly, as an example, Ka-y indicates that the user device 1302-1 having assigned the verification key Ka can access the proximity verification result from the authentication server 140-2 having assigned the verification key Ky. Hence, in these cases, the user device 1302-1 is permitted to access the proximity verification result and receive, from the authentication servers 140-1 and 140-2, the authentication signal indicative of whether there is proximity or approximate similarity between the proximity ciphertext and the registration proximity ciphertext.

On the other hand, in the access restricting table 1800, X at a combination of the verification keys Kb and Kz indicates that the user device 1302-2 having assigned the verification key Kb is denied access to the proximity verification result from the authentication server 140-3 having assigned the verification key Kz. In this case, the user device 1302-2 is not permitted to receive the authentication signal from the authentication server 140-3, regardless of whether the authentication signal indicates that there is proximity or approximate similarity between the proximity ciphertext and the registration proximity ciphertext.

Accordingly, the accessibility of the database of each authentication server from each user device can be controlled based on the access restricting table.

Figure 24:
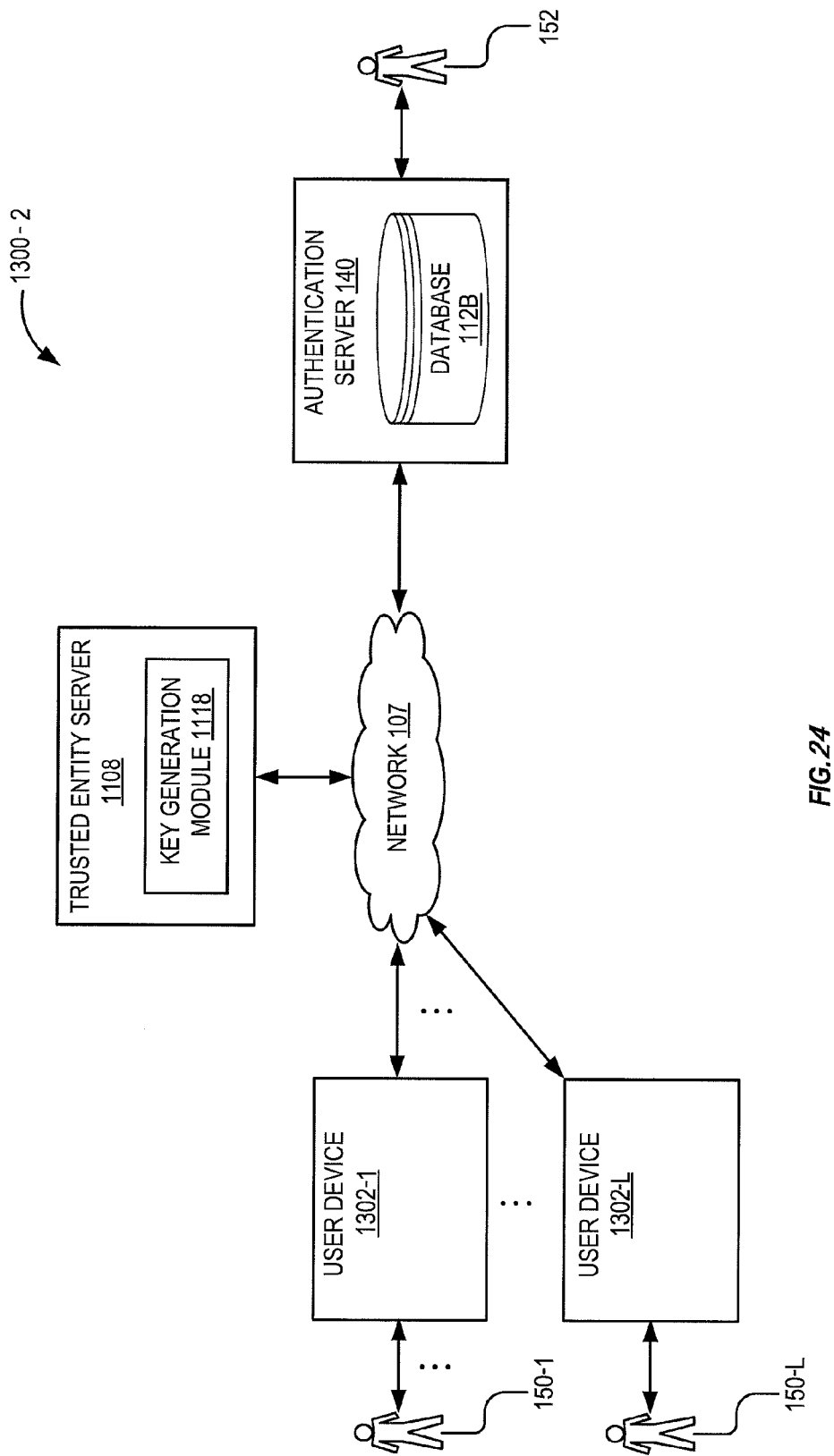
FIG. 24 is a block diagram of still another example operating environment.

FIG. 24 is a block diagram of still another example operating environment. In FIG. 24, those parts that are the same as those corresponding parts in FIG. 16 are designated by the same reference numerals, and a description thereof will be omitted. In an operating environment 1300-2 illustrated in FIG. 24, the functions of the plurality of authentication servers 140-1, . . . , and 140-M illustrated in FIG. 16 are integrated into a single authentication server 140 which may be operated by a user (or operator) 152. In addition, the plurality of databases 112B-1 are integrated into a single database 112B.

Figure 25:
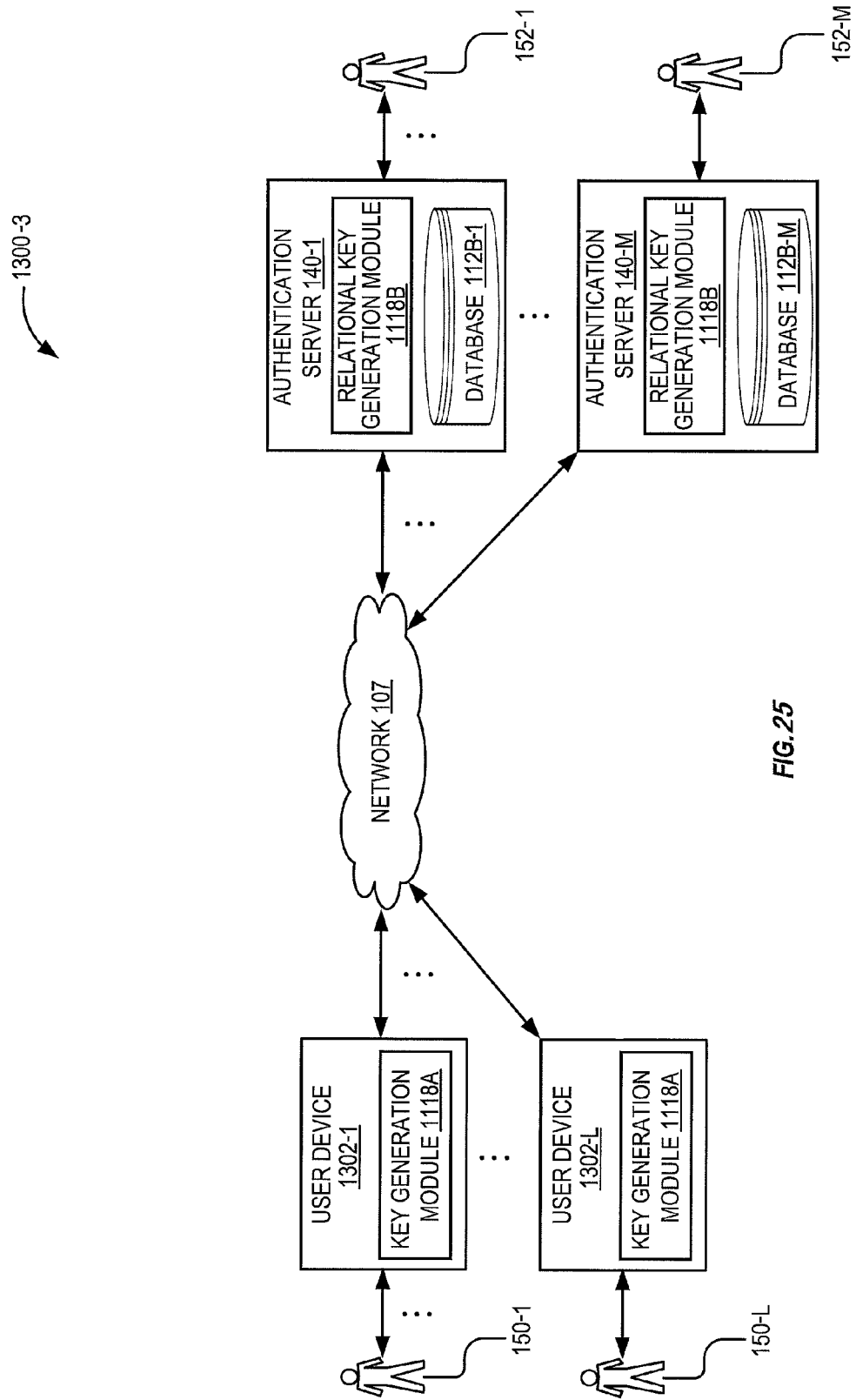
FIG. 25 is a block diagram of a further example operating environment, all arranged in accordance with at least one embodiment described herein.

FIG. 25 is a block diagram of a further example operating environment. In FIG. 25, those parts that are the same as those corresponding parts in FIG. 16 are designated by the same reference numerals, and a description thereof will be omitted. In an operating environment 1300-3 illustrated in FIG. 25, the trusted entity server 1108 illustrated in FIG. 16 is omitted. In addition, each of the user devices 1302-1, . . . , and 1302-L is provided with a key generation module 1118A which may be similar to the key generation module 1118 of the trusted entity server 1108. Further, each of the authentication servers 140-1, . . . , and 140M is provided with a relational key generation module 1118B to generate the relational key.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In the present description, a "computing entity" may be any computing system as previously defined herein, or any module or combination of modulates running on a computing system.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the examples are numbered with, for example, "first," "second," "third," "fourth," "fifth," or "sixth," the ordinal numbers do not imply priorities of the examples. Many other variations and modifications will be apparent to those skilled in the art.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the disclosure.

What is claimed is:

1. A method of proximity verification using relational encryption, the method comprising:
   receiving a linearity ciphertext that represents information processed to a level of randomness associated with a security parameter and encrypted using a relational linearity encryption scheme;
   determining a linearity relationship between the linearity ciphertext and a registration linearity ciphertext using a linearity relational secret key;
   receiving a proximity ciphertext that represents the information processed to the level of randomness and encrypted using a relational proximity encryption scheme;
   determining a proximity relationship between the proximity ciphertext and a registration proximity ciphertext using a proximity relational secret key;
   determining an approximate similarity between the proximity ciphertext and the registration proximity ciphertext based upon the security parameter, the linearity relationship, and the proximity relationship; and
   based on a combination of a first verification key assigned to a user device and a second verification key assigned to one of a plurality of authentication servers permitting access to a result of the determining the approximate similarity, communicating to the user device from the one of the plurality of authentication servers an authentication signal indicative of the result of the determining the approximate similarity, rather than not communicating the authentication signal to the user device based on the combination of the first and second verification keys denying access to the result of the determining the approximate similarity, regardless of whether the authentication signal indicates that there is the approximate similarity between the proximity ciphertext and the registration proximity ciphertext.

2. The method as claimed in claim 1, further comprising:
   receiving a second linearity ciphertext and a second proximity ciphertext;
   storing the second linearity ciphertext as the registration linearity ciphertext;
   storing the second proximity ciphertext as the registration proximity ciphertext; and
   receiving the linearity relational secret key and the proximity relational secret key.

3. The method as claimed in claim 1, further comprising:
   receiving, from a trusted entity server, the first verification key by the user device; and
   receiving, from the trusted entity server, the second verification key.

4. The method as claimed in claim 1, wherein the information includes a combination of a plurality of data items, or a plurality of segments of a single data item.

5. The method as claimed in claim 1, wherein the information is related to one of medical and biological information, technical information, and financial information.

6. The method as claimed in claim 5, wherein the medical and biological information includes one of clinical data, health data, and genome data.

7. A non-transitory computer-readable medium having encoded therein programming code executable by one or a plurality of processors to perform or control performance of operations comprising:
   receiving a linearity ciphertext that represents information processed to a level of randomness associated with a security parameter and encrypted using a relational linearity encryption scheme;
   determining a linearity relationship between the linearity ciphertext and a registration linearity ciphertext using a linearity relational secret key;
   receiving a proximity ciphertext that represents the information processed to the level of randomness and encrypted using a relational proximity encryption scheme;
   determining a proximity relationship between the proximity ciphertext and a registration proximity ciphertext using a proximity relational secret key;
   determining an approximate similarity between the proximity ciphertext and the registration proximity ciphertext based upon the security parameter, the linearity relationship, and the proximity relationship; and
   based on a combination of a first verification key assigned to a user device and a second verification key assigned to one of a plurality of authentication servers permitting access to a result of the determining the approximate similarity, communicating to the user device from the one of the plurality of authentication servers an authentication signal indicative of the result of the determining the approximate similarity, rather than not communicating the authentication signal to the user device based on the combination of the first and second verification keys denying access to the result of the determining the approximate similarity, regardless of whether the authentication signal indicates that there is the approximate similarity between the proximity ciphertext and the registration proximity ciphertext.

8. The non-transitory computer-readable medium as claimed in claim 7, wherein the operations further comprise:
   receiving a second linearity ciphertext and a second proximity ciphertext;
   storing the second linearity ciphertext as the registration linearity ciphertext;
   storing the second proximity ciphertext as the registration proximity ciphertext; and
   receiving the linearity relational secret key and the proximity relational secret key.

9. The non-transitory computer-readable medium as claimed in claim 7, wherein the operations further comprise:
   receiving the first and second verification keys from a trusted entity server.

10. The non-transitory computer-readable medium as claimed in claim 7, wherein the information includes a combination of a plurality of data items, or a plurality of segments of a single data item.

11. The non-transitory computer-readable medium as claimed in claim 7, wherein the information is related to one of medical and biological information, technical information, and financial information.

12. The non-transitory computer-readable medium as claimed in claim 11, wherein the medical and biological information includes one of clinical data, health data, and genome data.

13. A method comprising:
receiving a linearity ciphertext that represents medical and biological data processed to a level of randomness associated with a security parameter and encrypted using a relational linearity encryption scheme;
determining a linearity relationship between the linearity ciphertext and a registration linearity ciphertext that represents medical and biometrical information, using a linearity relational secret key;
receiving a proximity ciphertext that represents the medical and biological information processed to the level of randomness and encrypted using a relational proximity encryption scheme;
determining a proximity relationship between the proximity ciphertext and a registration proximity ciphertext that represents medical and biometrical information, using a proximity relational secret key;
determining an approximate similarity between the proximity ciphertext and the registration proximity ciphertext based upon the security parameter, the linearity relationship, and the proximity relationship; and
granting access to a restricted encrypted resource based on determining that there is the approximate similarity between the proximity ciphertext and the registration proximity ciphertext.

14. The method of claim 13, wherein the medical and biological information includes at least one of clinical data, health data, and genome data.

15. A non-transitory computer-readable medium having encoded therein programming code executable by a processor to perform or control performance of operations comprising:
receiving a linearity ciphertext that represents medical and biometric information processed to a level of randomness associated with a security parameter and encrypted using a relational linearity encryption scheme;
determining a linearity relationship between the linearity ciphertext and a registration linearity ciphertext that represents medical and biometrical information, using a linearity relational secret key;
receiving a proximity ciphertext that represents the medical and biometric information processed to the level of randomness and encrypted using a relational proximity encryption scheme;
determining a proximity relationship between the proximity ciphertext and a registration proximity ciphertext that represents medical and biometrical information, using a proximity relational secret key;
determining an approximate similarity between the proximity ciphertext and the registration proximity ciphertext based upon the security parameter, the linearity relationship, and the proximity relationship; and
granting access to a restricted encrypted resource based on determining that there is the approximate similarity between the proximity ciphertext and the registration proximity ciphertext.

16. The non-transitory computer-readable medium of claim 15, wherein the medical and biological information includes at least one of clinical data, health data, and genome data.

17. A method comprising:
receiving medical and biological information;
processing the medical and biological information to a level of randomness as a plaintext vector, the level of randomness associated with a security parameter;
encrypting the plaintext vector using a relational linearity encryption scheme to generate a linearity ciphertext representative of the plaintext vector;
encrypting the plaintext vector using a relational proximity encryption scheme to generate a proximity ciphertext representative of the plaintext vector;
communicating the linearity ciphertext and the proximity ciphertext to an authentication server; and
receiving from the authentication server an authentication signal based on the security parameter indicative of a linearity relationship between the linearity ciphertext and a registration linearity ciphertext determined using a relational linearity key and of a proximity between the proximity ciphertext and a registration proximity ciphertext that represents medical and biometrical information and is determined using a relational proximity key.

18. The method of claim 17, wherein the medical and biological information includes at least one of clinical data, health data, and genome data.

* * * * *